United States Patent
Suzuki et al.

(10) Patent No.: US 8,665,816 B2
(45) Date of Patent: Mar. 4, 2014

(54) WIRELESS COMMUNICATION METHOD IN TRAFFIC SYSTEM, WIRELESS BASE STATION, AND WIRELESS TERMINAL

(75) Inventors: Yusuke Suzuki, Kawasaki (JP); Mamoru Machida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 12/541,295

(22) Filed: Aug. 14, 2009

(65) Prior Publication Data
US 2009/0296680 A1    Dec. 3, 2009

Related U.S. Application Data

(63) Continuation of application No. PCT/JP2007/055732, filed on Mar. 20, 2007.

(51) Int. Cl.
*H04W 4/00* (2009.01)

(52) U.S. Cl.
USPC ........... 370/330; 340/902; 340/905; 455/440; 701/117

(58) Field of Classification Search
USPC ................. 340/902, 905; 455/440; 701/117
See application file for complete search history.

(56) References Cited

U.S. PATENT DOCUMENTS

| | | | |
|---|---|---|---|
| 5,839,071 A * | 11/1998 | Johnson | 455/440 |
| 5,875,183 A | 2/1999 | Nitadori | |
| 6,246,955 B1 * | 6/2001 | Nishikawa et al. | 701/117 |
| 6,791,475 B2 * | 9/2004 | Yamashita | 340/935 |
| 2005/0088318 A1 * | 4/2005 | Liu et al. | 340/902 |
| 2006/0009228 A1 | 1/2006 | Kang et al. | |
| 2006/0153132 A1 | 7/2006 | Saito | |
| 2007/0291713 A1 * | 12/2007 | Machida | 370/338 |
| 2008/0090575 A1 * | 4/2008 | Barak et al. | 455/444 |

FOREIGN PATENT DOCUMENTS

| | | |
|---|---|---|
| JP | 2000-201103 | 7/2000 |
| JP | 2005-65102 | 3/2005 |
| JP | 2005-341290 | 12/2005 |
| JP | 2006-5946 | 1/2006 |
| JP | 2006-196985 | 7/2006 |
| JP | 2008-5004 | 1/2008 |

OTHER PUBLICATIONS 11-06-1826-02-000p, IEEE 802.11 Wireless LANs TGp Submission, Nov. 15, 2006.*
Evensen, IEEE 20802 CALM Tutorial Part 1_v2, Nov. 14, 2006.*
Gupta, IEEE 802.21 Media Independent Handover, Jul. 17, 2006.*

(Continued)

*Primary Examiner* — Joseph Bednash
(74) *Attorney, Agent, or Firm* — Katten Muchin Rosenman LLP

(57) ABSTRACT

An on-vehicle device sends an allocation request for a wireless resource to a roadside device. The roadside device, in response to receiving this allocation request, allocates a roadside-vehicle resource that is a wireless resource for roadside-vehicle communication with the on-vehicle device, and an inter-vehicle resource that is a wireless resource for inter-vehicle communication between on-vehicle devices; and sends the allocation information to the on-vehicle device. The on-vehicle device carries out roadside-vehicle communication with the roadside device using the roadside-vehicle resource identified with the allocation information received from the roadside device, and carries out inter-vehicle communication with other on-vehicle devices using the inter-vehicle resource identified with the allocation information. Thereby, roadside-vehicle communication and inter-vehicle communication can be achieved with higher utilization of wireless resources while avoiding the hidden terminal problem.

14 Claims, 40 Drawing Sheets

(56) References Cited

OTHER PUBLICATIONS

International Search Report dated May 15, 2007, from the corresponding International Application.
"IEEE P802.16e/D12, Draft IEEE Standard for Local and metropolitan area networks, Part 16: Air Interface for Fixed and Mobile Broadband Wireless Access Systems, Amendment for Physical and Medium Access Control Layers for Combined Fixed and Mobile Operation in Licensed Bands" LAN MAN Standards Committee of the IEEE Computer Society and the IEEE Microwave Theory and Techniques Society, Oct. 14, 2005.
"IEEE Std. 802.16, IEEE Standard for Local and metropolitan area networks, Part 16: Air Interface for Fixed Broadband Wireless Access Systems" IEEE Computer Society and the IEEE Microwave Theory and Techniques Society, Oct. 1, 2004.
"IEEE Std. 802.16e, IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.
Supplementary European Search Report dated Nov. 27, 2012, from corresponding European Application No. 07739175.3.

\* cited by examiner

# WIRELESS COMMUNICATION METHOD IN TRAFFIC SYSTEM, WIRELESS BASE STATION, AND WIRELESS TERMINAL

CROSS-REFERENCE TO RELATED APPLICATION

This application is a continuation Application of a PCT international application No. PCT/JP2007/55732 filed on Mar. 20, 2007 in Japan, the entire contents of which are incorporated by reference.

FIELD

The embodiments discussed herein are related to a wireless communication method in a traffic system, a wireless base station, and a wireless terminal.

BACKGROUND

In recent years, intelligent transport systems (ITS) have been developed. One type of ITSs includes wireless base stations (roadside devices) installed in or on traffic lights for roadside-vehicle communication wherein information, such as traffic light information at an intersection (e.g., whether the light is red or green) or whether there is any vehicle turning to the right is sent to a terminal (on-vehicle device) mounted on a vehicle that is a few meters from that intersection.

On the other hand, in recent years, as middle-range high-channel-capacity wireless communication systems, standardization and development of wireless communication systems using the Orthogonal Frequency Domain Multiple Access (OFDMA) scheme which can execute flexible multiplexing into a wireless frame in the frequency domain direction and the time domain direction, namely the Worldwide interoperability for Microwave Access (WiMAX), have been carried out by the IEEE 802.16 Working Group (WG). Note that the IEEE 802.16 WG stipulates two standards: IEEE 802.16d mainly for fixed communication applications (for example, see Non-Patent References 1 and 2 which will be listed below) and IEEE 802.16e for mobile communication applications (or example, see Non-Patent Reference 3 which will be listed below).

The IEEE 802.16d and IEEE 802.16e stipulate communication between a wireless terminal (MS: mobile station) and a wireless base station (BS) wherein the MS carries out communication with the BS according to MAP information contained in a wireless frame sent from the wireless base station. A single frame of a wireless frame compliant with the IEEE 802.16e standard (WiMAX standard) (OFDMA frames) is constructed by time multiplexing a downlink (DL) subframe from the BS to the MS, and an uplink (UL) subframe from the MS to the BS.

A preamble, a frame control header (FCH), downlink MAP information (DL_MAP), uplink MAP information (UL_MAP), and one or more DL bursts (DL bursts) are multiplexed into a downlink subframe, in the two-dimensional area defined by the time domain (symbol time) direction and the frequency (subchannel frequency) direction, and one or more UL bursts (UL bursts) are multiplexed into an uplink subframe.

Here, the preamble is a domain (field) into which frame synchronous information is inserted, and the FCH is the domain in which information on the modulation scheme (e.g., QPSK, 16QAM, 64QAM), the rate code, or the like of bursts (burst profile) is inserted. Furthermore, the MAP information includes information on the identification of communication connection (CID) that is transmitted in the wireless resource used by the MS for communication, i.e., communication domain (i.e., bursts) defined by frequency (subchannel frequency) and time (symbol time (transmission timing)), the location of the burst in the wireless frame for that connection (burst location), the size of the burst (burst size), or the like.

In other words, the MAP information is defined as information (burst allocation information) that specifies (allocates) a wireless frame to be received/sent (reception domain and transmission domain) by the MS. Note that the burst location may be specified by the symbol offset and the subchannel offset from the first symbol in the wireless frame, and the burst size may be specified by the number of symbols and the number of subchannels.

Accordingly, an MS can establish wireless frame synchronization for downlink and uplink by detecting a preamble, and can selectively receive a DL burst specified in the DL_MAP which is directed to the MS by executing demodulation and decode processing on the DL burst using the encode scheme specified in the FCH, and the decode scheme corresponding to the rate code, the decode rate or the like, as well as being able to send date to a BS in a UL burst specified in the UL_MAP.

Note that other existing wireless communication schemes include techniques disclosed in Patent References 1-4 listed below.

The technique of Patent Reference 1 is directed to providing a wireless communication apparatus and an adhoc system that can improve the communication efficiency in the adhoc network and increase the network capacity and transmission speed of the network as a whole. For that purpose, in the technique of Patent Reference 1, setting information (spread codes or time slots) required for communication is provided from a master to slaves by exchanging control signals between them, and transmission/reception of data signals are directly carried out on nodes (slave-slave, and slave-master) based on the setting information within the adhoc network.

The technique of Patent Reference 2 is directed to providing a communication system and a wireless communication apparatus that can realize a seamless integration of a mobile communication network, an adhoc network, and the IP network, thereby increasing the efficiency of the usage and cost efficiency of the networks. For that purpose, in the technique of Patent Reference 2, the TDD-CDMA scheme is used as the communication scheme for both the adhoc network and the mobile communication network to use the same frequency band for the networks, thereby avoiding the complexity of the apparatuses and cost increase while facilitating switching between the networks to be connected.

The technique of Patent Reference 3 is directed to providing a media access control method and a program that enables a subscriber station (SS) outside of a communication area of a wireless base station (BS) to communicate with the wireless base station via a relay station (RS) within the communication area. For that purpose, in the technique of Patent Reference 3, a multicasted polling packet is sent by the relay station, and a wireless base station that receives the packet and the subscriber station that can directly communicate with the wireless base station operate not to receive any data packets during a predetermined time period. At the same time, subscriber stations that belong to the relay station that sends the polling packet (subscriber stations that are located outside the communication area of the wireless base station) transit to contention period with the relay station to operate to send data packets.

The technique of Patent Reference 4 is directed to allocating safety channels to terminals in a broadband wireless access (BWA) communication system. For that purpose, a method of allocating safe channels which can minimize adjacent cell interference signals with terminals located in a border area with adjacent cells in the OFDMA system, and ensuring that handover operations between the safe channels depending on channel conditions, thereby ensuring communication qualities in terminals located in the border area with adjacent cells.

Patent Reference 1: Japanese Laid-open Patent Publication No. 2005-65102
Patent Reference 2: Japanese Laid-open Patent Publication No. 2005-341290
Patent Reference 3: Japanese Laid-open Patent Publication No. 2006-196985
Patent Reference 4: Japanese Laid-open Patent Publication No. 2006-5946
Non-Patent Reference 1: IEEE 802.16-2004
Non-Patent Reference 2: IEEE 802.16-2004/Cor1/D5
Non-Patent Reference 3: IEEE 802.16e/D12

SUMMARY (1) According to an aspect of the embodiments, a method includes a wireless communication method in a traffic system including a wireless base station as a roadside device and a plurality of wireless terminals as on-vehicle devices, the wireless communication method including:

(a) the on-vehicle device sending an allocation request for a wireless resource to the roadside device;

(b) the roadside device, in response to receiving the allocation request, allocating a roadside-vehicle resource that is a wireless resource for roadside-vehicle communication between the roadside device and the on-vehicle device and an inter-vehicle resource that is a wireless resource for inter-vehicle communication between the on-vehicle devices, and sending allocation information on the allocation to the on-vehicle device; and (C) the on-vehicle device carrying out the roadside-vehicle communication with the roadside device using the roadside-vehicle resource identified with the allocation information received from the roadside device, and carrying out inter-vehicle communication with other on-vehicle device using the inter-vehicle resource identified with the allocation information.

(2) According to an aspect of the embodiments, an apparatus includes a wireless base station in a traffic system including the wireless base station as a roadside device and a plurality of mobile terminals as on-vehicle devices, the wireless base station including:

(a) wireless resource allocation means for allocating, in response to receiving an allocation request for a wireless resource from an on-vehicle device, a roadside-vehicle resource that is a wireless resource for roadside-vehicle communication between the roadside device and the on-vehicle device and an inter-vehicle resource that is a wireless resource for inter-vehicle communication between the on-vehicle device; and (b) transmission means for sending allocation information on the wireless resource allocated by the wireless resource allocating means.

(3) According to an aspect of the embodiments, an apparatus includes a mobile terminal in a traffic system including a wireless base station as a roadside device and a plurality of mobile terminals as on-vehicle devices, the mobile terminal including:

(a) transmission means for sending an allocation request for wireless resource to the roadside device;

(b) allocation information reception means for receiving allocation information on a roadside-vehicle resource that is a wireless resource for roadside-vehicle communication between the roadside device and the on-vehicle device and an inter-vehicle resource that is a wireless resource for inter-vehicle communication between the on-vehicle devices determined by the roadside device in response to the allocation request; and (c) communication control means for executing roadside-vehicle communication with the roadside device using the roadside-vehicle resource identified with the allocation information, and executing inter-vehicle communication with other on-vehicle devices using the inter-vehicle resource identified with the allocation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
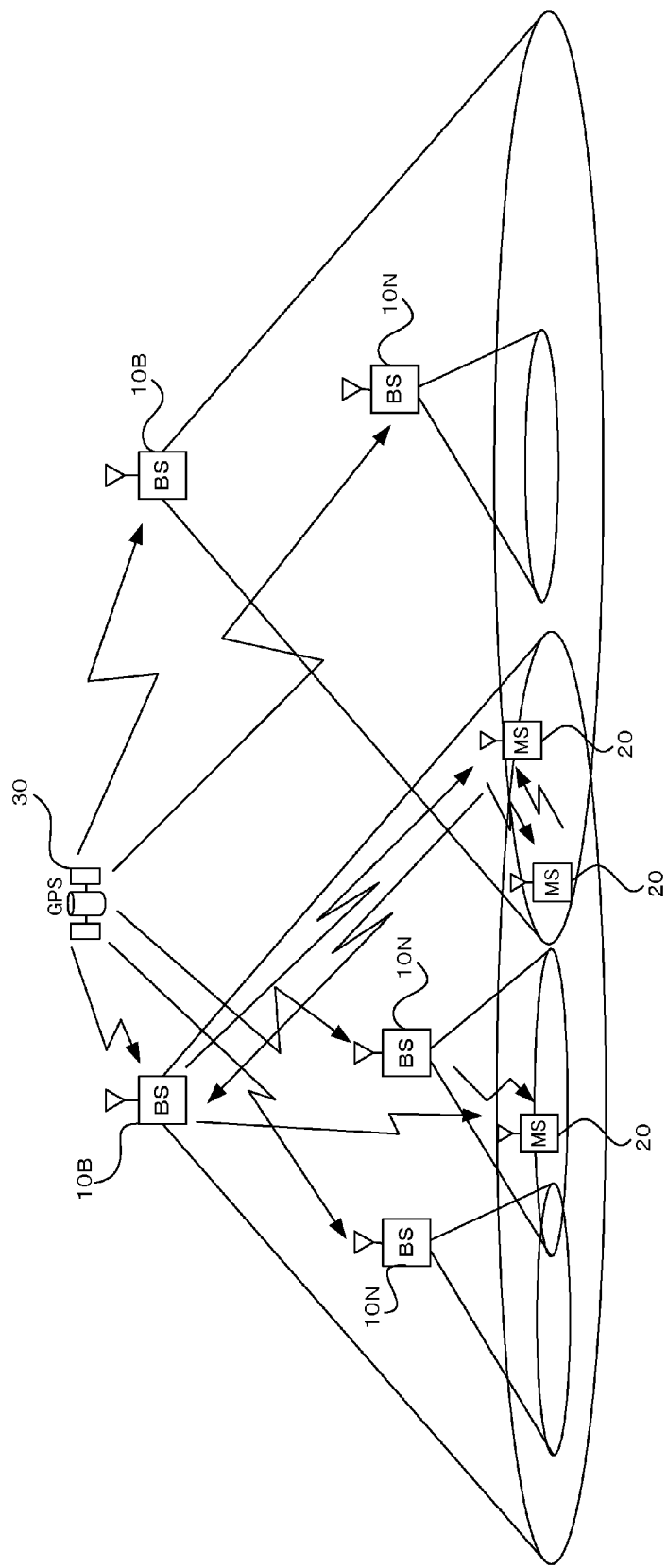
FIG. 1 is a block diagram illustrating a configuration of an ITS as a wireless communication system according to a first embodiment.

The existing ITS techniques suffer from low spectral efficiencies since time-division or frequency-division multiplexing is required for communicating between a roadside device and multiple on-vehicle devices. Furthermore, considering roadside-vehicle communications between multiple roadside devices and on-vehicle devices, and inter-vehicle communications between multiple on-vehicle devices when multiple layers of communication areas are present, allocation of wireless resources (communication domains) to each of the communication areas and each of the on-vehicle devices is frequency-division or time-division multiplexed, which may further reduce spectral efficiencies. Especially, with ITSs, since data such as image data may be required to be sent from a roadside device to on-vehicle devices, a technique that enables flexible multiplexing with a high channel capacity is required.

Furthermore, there is a technique that is being studied by the IEEE 802.11p standard for inter-vehicle communication is. This is one standard of the IEEE 802.11 standard family, typical examples of which include wireless LAN and WAVE, and the IEEE 802.11 standard stipulates communication areas having a cell radius of within a few hundred meters are defined and employs the OFDM scheme as a modulation scheme. Each wireless terminal sends signals while monitoring frequencies that are used using the Carrier Sense Multiple Access (CSMA) technique so that sending signals do not collide. Furthermore, each wireless terminal always waits for receiving data while it is not sending, and searches for beginnings (preambles) of signals being sent by other wireless terminal. This means that wireless terminals are not synchronized.

As described above, since the CSMA scheme is a non-synchronous communication scheme, the time of data transmitted is unknown when a large number of wireless terminals try to send data simultaneously. Furthermore, with the CSMA scheme, inevitable issues, such as the so-called "hidden terminal problem" or the like, are observed, which also make communication unreliable. More specifically, this issue occurs when wireless terminals can communicate with a shared access point, but signals from one wireless terminal cannot reach to another wireless terminal due to a blocking object or a short communication distance (such terminals are called "hidden terminals"), and the wireless terminals try to send/receive data to/from the same access point simultaneously, both sending signals collide with each other and the access point cannot receive the signals correctly.

The embodiments are conceived with the above-identified problems, and an object thereof is to achieve roadside-vehicle communication and inter-vehicle communication with higher utilization of wireless resources by a wide-band and flexible multiplexing (allocation of wireless resources) while avoiding the hidden terminal problem. Note that the Patent References 1-4 do not disclose nor suggest any means to solve the above problems.

Hereinafter, embodiments will be described with reference to the drawings. Note that the embodiments described below are described by way of example only for ease of understanding of the concept of the present invention, and various modifications and technical applications that are not provided explicitly in the following embodiments are not intended to be excluded. That is, any modifications and technical applications without departing from the concept of the present invention are inherently fall within the technical scope of the present invention.

(1) First Embodiment

System Configuration

FIG. 1 is a block diagram illustrating a configuration of an ITS as a wireless communication system according to a first embodiment. In FIG. 1, reference numeral 10N denotes wireless base stations (BSs), 10B denotes wireless base stations (BSs) that cover communication areas of one or more of the BSs 10N, 20 denotes wireless terminals (MSs) that communicate with the BSs 10N or 10B within the communication areas of the BSs 10N or 10B, 30 denotes a global positioning system (GPS) satellite. Each BS 10N covers a communication area having a radius of, for example, about several dozens of meters to several hundreds meters. Each BS 10B may cover a communication area having, for example, a radius of about several kilometers. Furthermore, each MS 20 covers a communication area having a radius of about several dozens of meters to several hundreds meters. Note that the number of BSs 10N and 10B, and the MSs 20 are not limited to those depicted in FIG. 1, as a matter of course.

The BSs 10N and 10B may be installed as roadside devices on or in traffic lights or the like in the road network, and the MSs 20 are installed on or in vehicles or the like as on-vehicle devices. In this manner, an ITS is constructed wherein signal information of a traffic light (whether it is red or green) or information on the traffic conditions in the vicinity of that traffic light can be provided to the on-vehicle devices 20 by means of wireless communications (roadside-vehicle communications) from the roadside devices (middle/narrow-area roadside devices) 10N or roadside devices (wide-area roadside devices) 10B to the MSs 20, or information on vehicles (vehicle information) can be exchanged between the on-vehicle devices 20 by means of wireless communications (inter-vehicle communications).

More specifically, in FIG. 1, there are multiple (two) wide-area roadside devices 10B with their communication areas (wide areas) being overlapped, and there are one or more of middle/narrow-area roadside devices 10N within the wide-areas, with or without their communication area being overlapped. The on-vehicle devices 20 are located in any locations of the communication areas. Roadside-vehicle communications with the roadside devices 10N and/or 10B or inter-vehicle communications between the on-vehicle devices 20 are made possible.

Note that traffic condition information may include, for example, traffic congestions (traffic gridlocks), presence of any emergency vehicles in the vicinity, presence of any road works, road surface conditions (temperature of the road surface, pavement conditions, whether there is any rainfalls, snowfalls, or the road is frozen or not). (Hereinafter, those are referred to as "road traffic information" in addition to the above-described signal information of traffic lights). Furthermore, the road traffic information may include at least one of textual information, sounds, still image or moving images. Furthermore, the vehicle information may include, for example, information on the position, the traveling speed, and the brake operation of a vehicle.

Furthermore, at least roadside devices 10B and 10N (hereinafter, simply referred to as "roadside devices 10" when no distinction among them is significant) receive radio waves from the GPS satellite 30, and may synchronize with other roadside devices 10 based on timing information included in the received signal as GPS information, thereby synchronizing transmission and reception timing of wireless frames among the roadside devices 10.

Basic Configuration of Roadside Device

Figure 2:
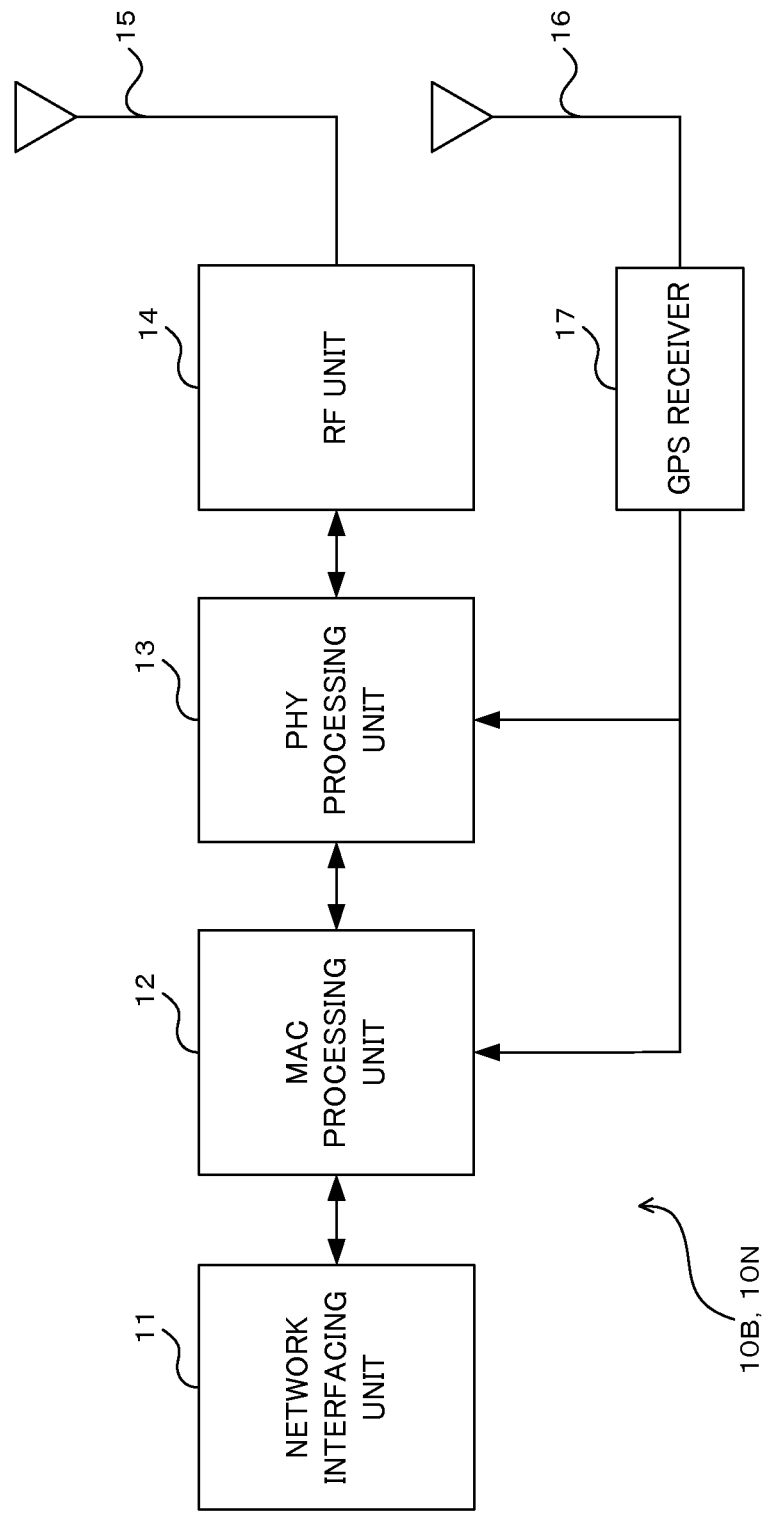
FIG. 2 is a block diagram illustrating a basic configuration common to the roadside device (BS) in the ITS depicted in FIG. 1.

FIG. 2 is a block diagram illustrating a basic configuration common to the roadside devices 10. The roadside device 10 depicted in FIG. 2 includes a network interfacing unit (on-vehicle device managing unit) 11, a media access control (MAC) processing unit 12, a physical layer (PHY) processing unit 13, a radio frequency (RF) unit 14, an antenna 15, a GPS antenna 16, and a GPS receiver 17.

Here, the network interfacing unit 11 includes, for example, a connection interface function with an upper network, a function that tracks (the locations of) on-vehicle devices, and a function that determines whether an on-vehicle device 20 utilizes which communication domain (wireless resource) within a wireless frame and notifies the MAC processing unit 12 of it.

The MAC processing unit 12 includes a signal processing function in a MAC layer compliant with the WiMAX standard, and includes, for example, a function that recognizes an on-vehicle device 20 based on a ranging signal that is a request signal from the on-vehicle device 20, and informs the on-vehicle device managing unit 11 of the on-vehicle device 20, and a function that executes MAC processing compliant with the WiMAX standard on the information from the on-vehicle device managing unit 11.

That is, the on-vehicle device managing unit 11 and the MAC processing unit 12 described above function as wireless resource allocating means that allocates a roadside-vehicle communication domain (roadside-vehicle resource) and an inter-vehicle communication domain (inter-vehicle resource) to an on-vehicle device 20 in response to receiving an allocation request (ranging signal) for a wireless resource (communication domain) from that on-vehicle device 20.

The physical layer processing unit 13 includes a transmission/reception function compliant with the WiMAX standard, and includes, for example, as a transmission function, a function that generates a preamble signal, a broadcast signal, and a burst signal of a wireless frame, and modulates the generated signals, and multiplexes them into a wireless frame, and a function, as a reception function, that demodulates a received signal, and detects a preamble signal, a broadcast signals, and a burst signal described above.

The RF unit 14 includes a transmission function that performs predetermined radio frequency transmission processing on a signal from the physical layer processing unit 13 (baseband signal), including D/A conversion or frequency conversion into an RF signal (upconversion), amplification to a desired transmission power, and sends the processed signal to an on-vehicle device 20 from the antenna 15, and a function that executes predetermined radio frequency reception processing on an RF signal from an on-vehicle device 20 received at the antenna 15, including low-noise amplification, frequency conversion into a baseband signal (downconversion), and A/D conversion, and outputs the processed signal to the physical layer processing unit 13.

That is, the physical layer processing unit 13 and the RF unit 14 described above function as transmission means that sends allocation information of the wireless resource (communication domain) to the on-vehicle device 20.

The GPS antenna 16 receives a signal from the GPS satellite 30, and the GPS receiver 17 obtains timing information contained in the signal received at the GPS antenna 16, and provides the information to at least the MAC processing unit 12 and the physical layer processing unit 13, thereby making the processing units 12 and 13 operate synchronously with each other. That is, since roadside devices 10 are provided with the GPS receiver 17, they can work synchronously with each other (can execute transmission/reception processing on a wireless frame) as described above, by utilizing.

Basic Configuration of On-Vehicle Device

Figure 3:
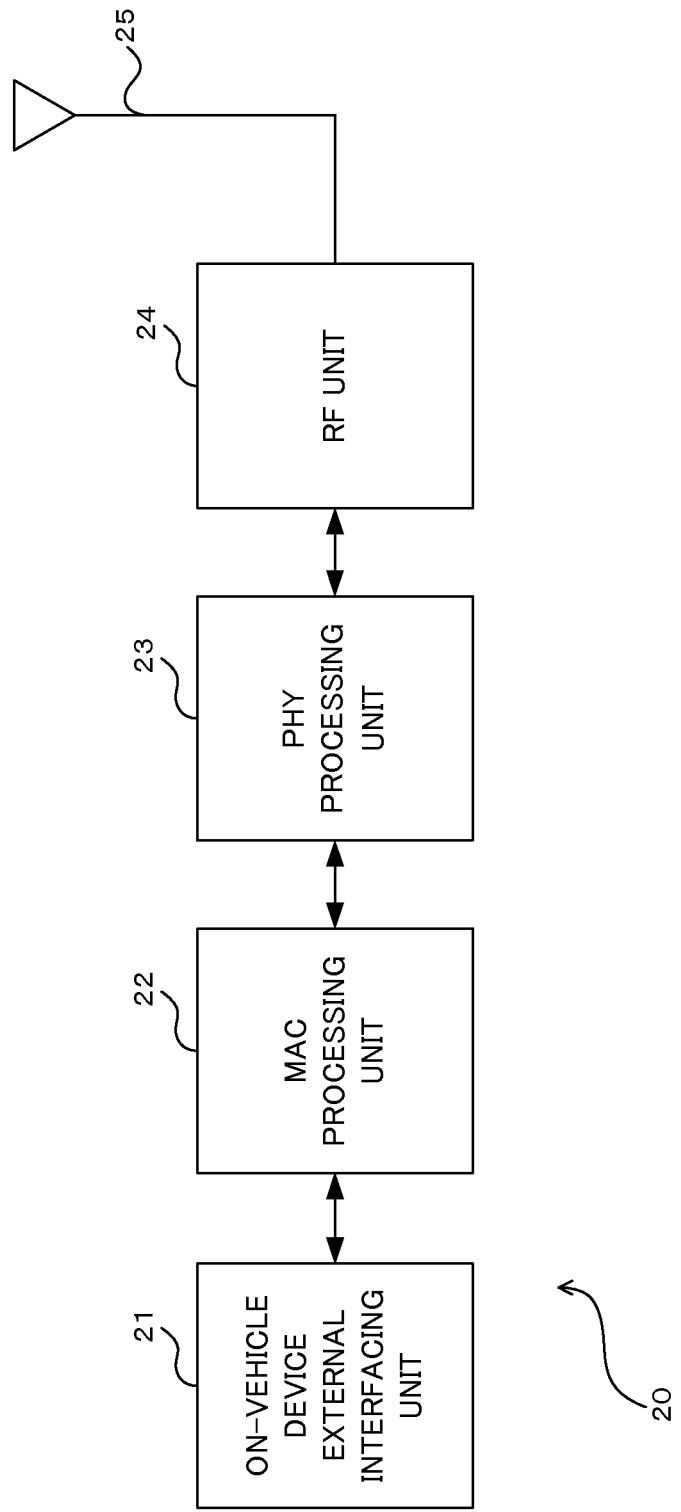
FIG. 3 is a block diagram illustrating a basic configuration common to the on-vehicle device (MS) in the ITS depicted in FIG. 1.

On the other hand, FIG. 3 is a block diagram illustrating a basic configuration common to on-vehicle devices 20. The on-vehicle device 20 depicted in FIG. 3 includes an on-vehicle device external interfacing unit 21, a MAC processing unit 22, a physical layer (PHY) processing unit 23, an RF unit 24, and an antenna 25.

Here, the on-vehicle device external interfacing unit 21 includes a function that receives vehicle information, such as the traveling speed or the brake operation, in case of vehicles (on-vehicle devices), but the information may vary dependent on where the mobile terminal is mounted, such as a pedestrian or a vehicle, from sensors external to the on-vehicle device or the like, and provides it to the MAC processing unit 22, and a function that provides vehicle information on the other vehicles provided by the MAC processing unit 22 to the outside of the on-vehicle device (i.e., on-vehicle appliances such as a car-navigation system).

The MAC processing unit 22 includes a signal processing function in a MAC layer compliant with the WiMAX standard, and includes, for example, a function that recognizes a communication (transmission/reception) domain of the local on-vehicle device 20 based on a broadcast signal (a UL_MAP, a DL_MAP) from a roadside device 10, and notifies the physical layer processing unit 23 of that domain, a function that processes transmission of a signal (local vehicle information) that has been MAC-processed for inter-vehicle communication, and a function that identifies transmission domains allocated to other on-vehicle devices 20 for inter-vehicle communications based on the DL_MAP received from the roadside device 10.

The physical layer processing unit 23 includes a signal processing function in a physical layer compliant with the WiMAX standard, and includes, for example, a function, as a transmission function, that generates a ranging signal, a UL burst signal for roadside-vehicle communication, a DL burst signal for inter-vehicle communication, and modulates the generated signal, and multiplexes the modulated signal into a wireless frame, and a function, as a reception function, that executes reception processing of, for example, a preamble signal, a broadcast signal, and a DL burst signal.

The RF unit 24 includes a function that performs predetermined radio frequency transmission processing on a signal from the physical layer processing unit 23 (baseband signal), including D/A conversion or frequency conversion into an RF signal (upconversion), amplification to a desired transmission power, and sends the processed signal to the roadside device 10 or other on-vehicle devices 20 from the antenna 25, and a function that executes predetermined radio frequency reception processing on an RF signal from the roadside device 10 or other on-vehicle devices 20 received at the antenna 25, including low-noise amplification, frequency conversion into a baseband signal (downconversion), and A/D conversion, and outputs the processed signal to the physical layer processing unit 23.

That is, the RF unit 24 and the physical layer processing unit 23 described above functions as allocation information reception means that receives a broadcast signal containing allocation information on a wireless resource for roadside-vehicle communication (roadside-vehicle resource) and a wireless resource for inter-vehicle communication (inter-vehicle resource) that have been allocated by the roadside device 10 in response to the allocation request (ranging signal). The MAC processing unit 22 includes, a function as communication control means that carries out roadside-vehicle communication with the roadside device 10 using the roadside-vehicle resource identified with the allocation information and carries out inter-vehicle communications with other on-vehicle devices 20 using the inter-vehicle resource identified with the allocation information.

(A1) First Example

Figure 5:
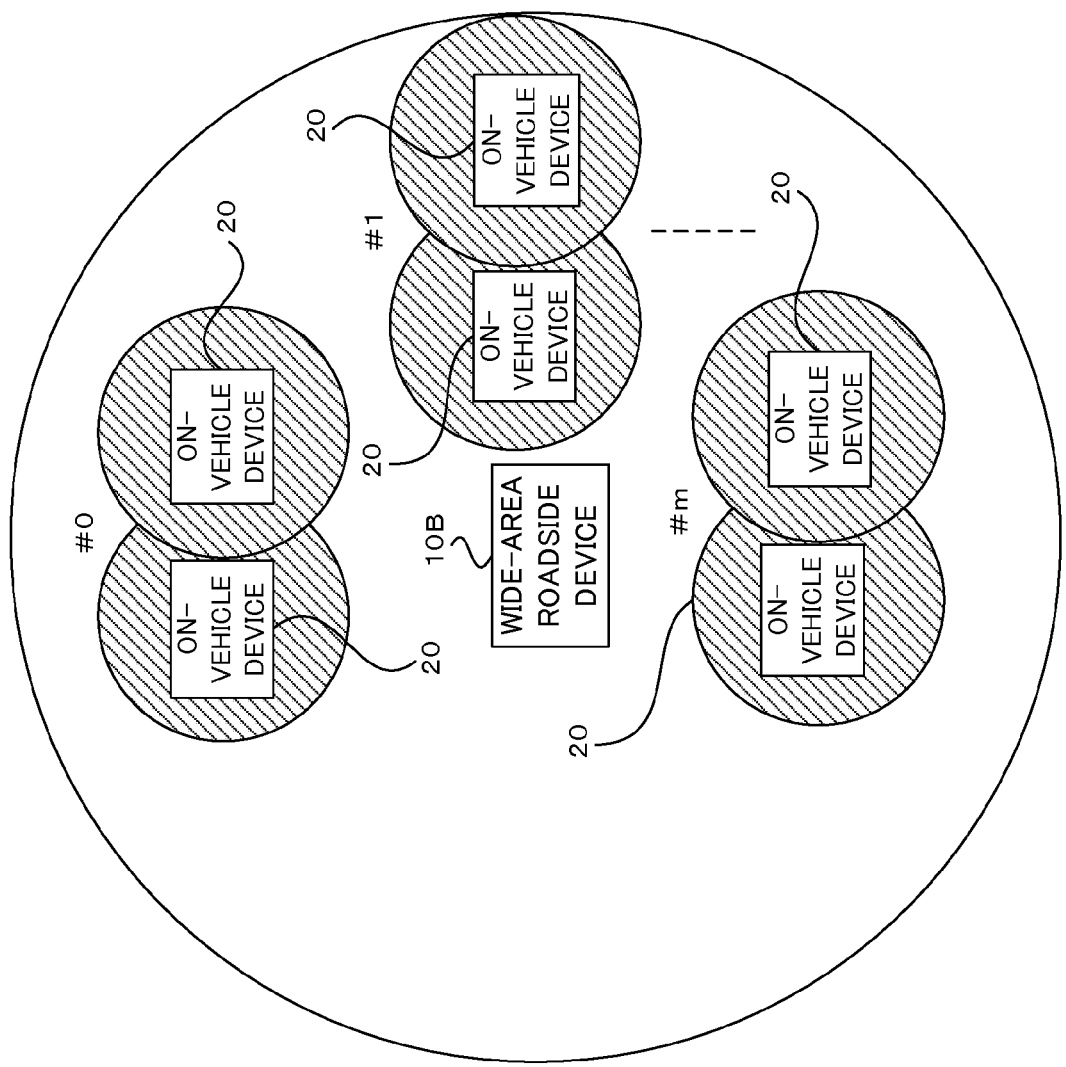
FIG. 5 is a schematic diagram illustrating exemplary locations of communication areas of a roadside device and on-vehicle devices according to the first example.

FIG. 5 illustrates a communication area of a wide-area roadside device 10B wherein multiple communication areas of on-vehicle devices 20 are located (see the hatched regions) and transmissions/receptions of vehicle information (inter-vehicle communication) #i is carried out between the on-vehicle devices 20 having their communication areas overlapped using wireless frames allocated by the wide-area roadside device 10B. Note that middle/narrow-area roadside devices 10N are omitted from the illustration.

Figure 4:
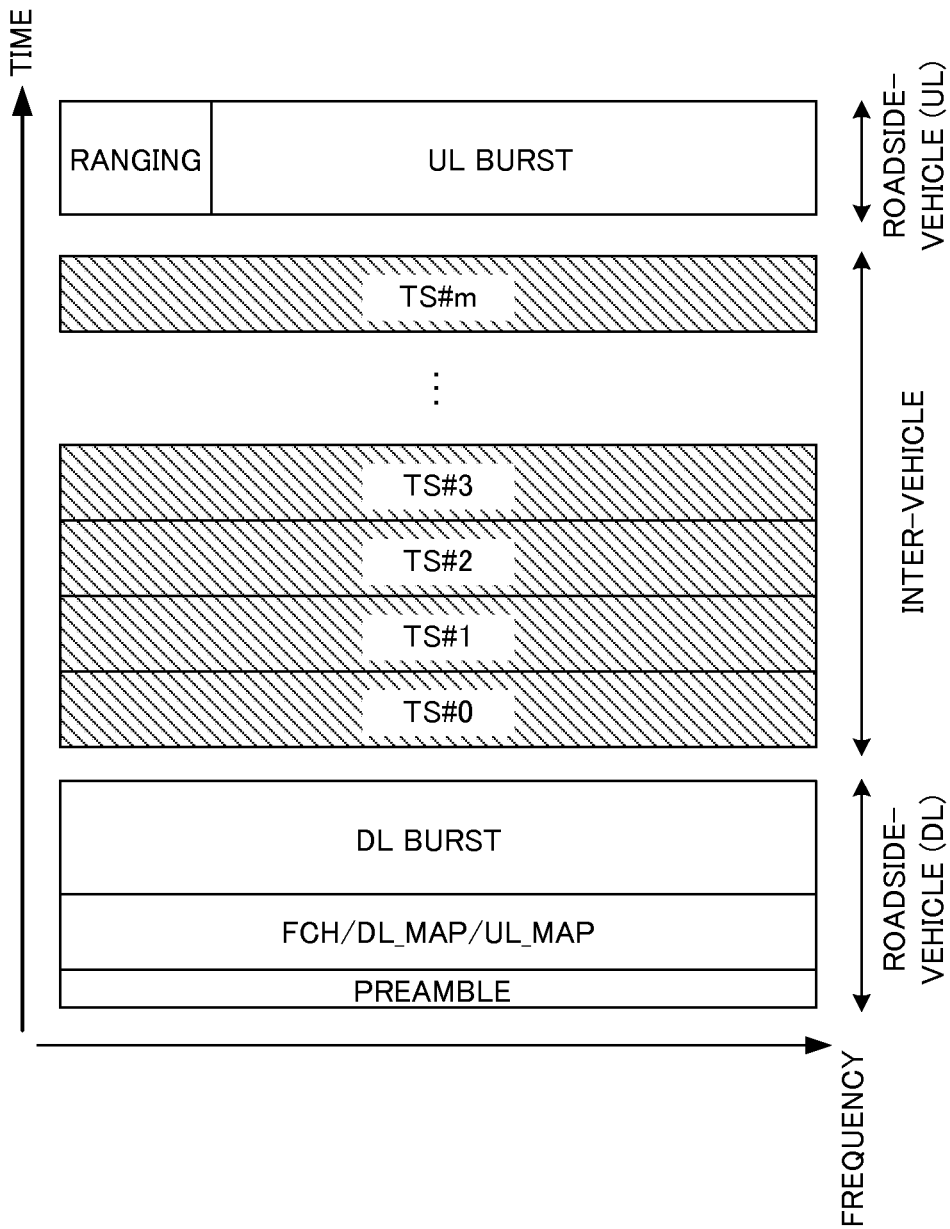
FIG. 4 is a diagram depicting a wireless frame (OFDMA frame) used in the ITS according to a first example of the first embodiment.

The structure of a wireless frame used in wireless communication system (ITS) in this case is illustrated in FIG. 4. The wireless frame depicted in FIG. 4 has the wireless frame format compliant with the WiMAX standard described above (OFDMA frame), wherein the two-dimensional domain represented by the time (symbol time) direction and the frequency (subchannel frequency) direction is divided in the time direction and the divided domains are allocated for the roadside-vehicle communication and the inter-vehicle communication.

More specifically, in first domain of this wireless frame, a preamble signal, a frame control header (FCH), downlink MAP information (DL_MAP), uplink MAP information (UL_MAP), at least one DL burst are time-division multiplexed for the DL roadside-vehicle communication from the roadside device 10 to an on-vehicle device 20. In the hatched sections following the first domain, bursts (time slots: TSs) #0, #1, ... , #m are time-division multiplexed for the inter-vehicle communication. In the next domain, a ranging signal and at least one burst are time-division multiplexed for the UL roadside-vehicle communication from the on-vehicle device 20 to the roadside device 10. Note that the domain for the inter-vehicle communication (inter-vehicle domain) corresponds to the transmission time period of a DL burst in a downlink subframe according to the WiMAX standard, and the domain for the UL roadside-vehicle communication corresponds to the transmission time period of a UL burst in an uplink subframe according to the standard.

Here, the preamble signal is a domain (field) in which frame synchronization information is included, and the FCH is the domain in which information on the modulation scheme (e.g., QPSK, 16QAM, 64QAM), the rate code, or the like of the burst (burst profile) is included. Furthermore, the MAP information includes allocation information on the wireless resource used by the on-vehicle device 20 for the roadside-vehicle and inter-vehicle communications, e.g., the communication domain (burst) defined by frequency and time, the location of that burst in the wireless frame (burst location), and the size of the burst (burst size). Note that the burst location may be specified by the symbol offset and the subchannel offset from the first symbol in the wireless frame, and the burst size may be specified by the number of symbols and the number of subchannels.

Accordingly, an on-vehicle device 20 can synchronize wireless frames by detecting a preamble signal (hereinafter, simply referred to as "preamble") described above, and executes reception processing on a DL burst (broadcast signal) from a roadside device 10 by executing demodulation and decode processing on the DL roadside-vehicle communication domain specified in the DL_MAP using the encode scheme specified in the FCH, and the decode scheme corresponding to the rate code, the decode rate or the like. Furthermore, the on-vehicle device 20 may communicate with another devices 20 using the inter-vehicle communication domain (TS #i (i=0 to m)) specified in the DL_MAP, and executes transmission processing on a request signal (ranging signal) requesting allocation of communication domain and various information to the roadside device 10 in the communication domain specified in the UL_MAP.

Hereinafter, the detailed configurations of a wide-area roadside device 10B and an on-vehicle device 20 when the above wireless frame is used will be described.

Detailed Configuration of Roadside Device

Figure 6:
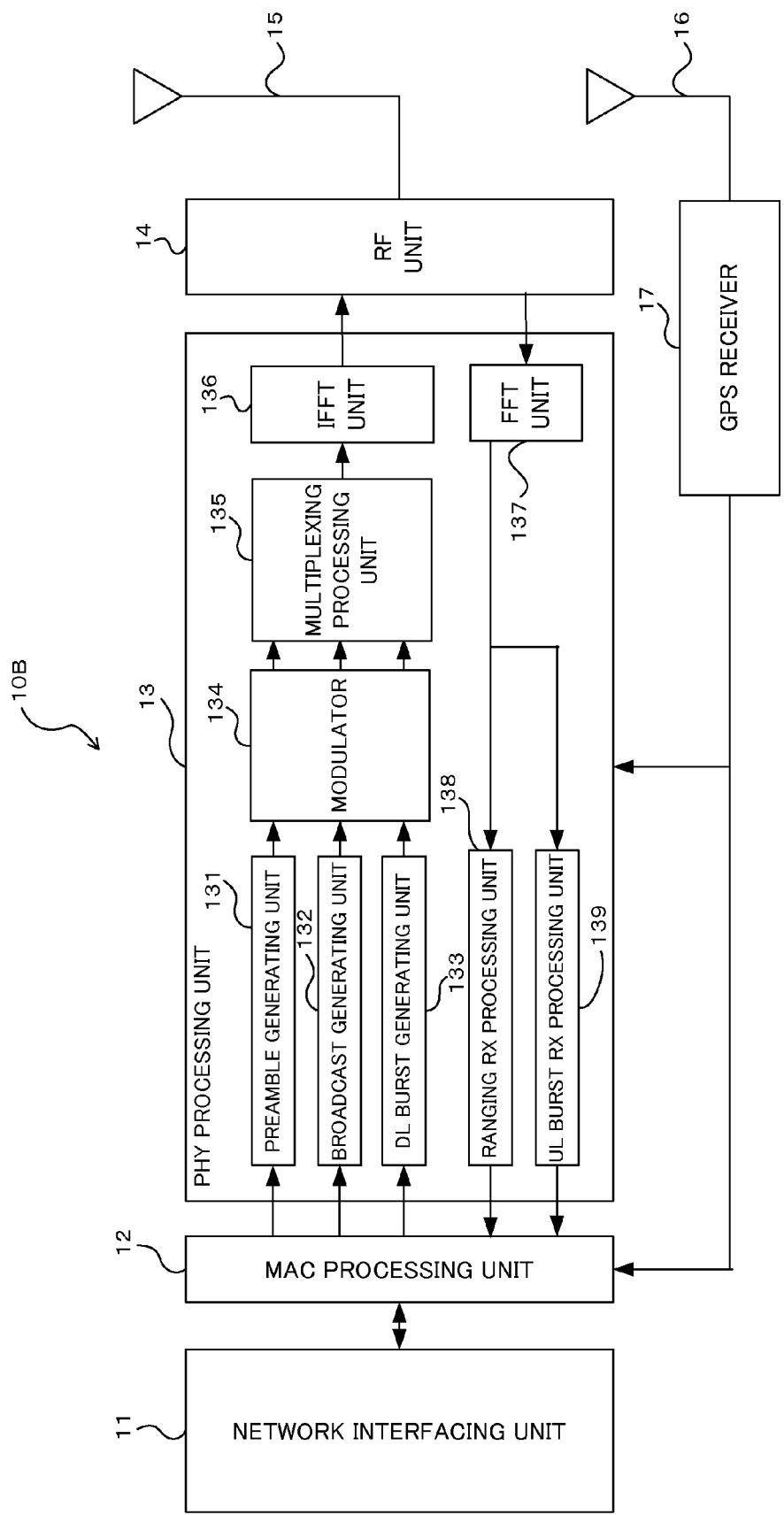
FIG. 6 is a block diagram illustrating a detailed configuration of the roadside device (wide-area roadside device) according to the first example.

FIG. 6 is a block diagram illustrating the detailed configuration of a wide-area roadside device 10B. The wide-area roadside device 10B depicted in FIG. 6 includes, for example, as transmission functions of the above-described the physical layer processing unit 13, a preamble generating unit 131, a broadcast generating unit 132, a DL burst generating unit 133, a modulating unit 134, a multiplexing processing unit 135, and an IFFT unit 136, and includes, as reception functions, an FFT unit 137, a ranging reception processing unit 138, and a UL burst reception processing unit 139.

Here, in the transmission functions, the preamble generating unit 131 includes a function that generates a preamble signal that is to be sent in the first domain of a wireless frame. The broadcast generating unit 132 includes a function that generates a broadcast signal, such as a DL_MAP, a UL_MAP and an FCH, according to the direction from the MAC processing unit 12. The DL burst generating unit 133 includes a function that generates a DL burst containing MAC-processed transmission data.

Furthermore, the modulating unit 134 includes a function that modulates (IQ mapping) the signals from the generating unit 131, 132, or 133 using the modulation scheme, such as QPSK or 16QAM, specified by the MAC processing unit 12. The multiplexing processing unit 135 multiplexes the modulated signal from the modulating unit 134 into a transmission domain for the roadside-vehicle communication (orthogonal frequency multiplexing). The IFFT unit 136 converts the multiplexed signal from the multiplexing processing unit 135 into a time domain signal by executing IFFT processing.

On the other hand, in the reception functions, the FFT unit 137 executes FFT processing on a baseband signal from the RF unit 14 into a frequency domain signal. The ranging reception processing unit 138 includes a function that identifies a ranging signal component, which is an allocation request for a wireless resource (communication domain), in the frequency domain signal from the FFT unit 137 to establish synchronization. The UL burst reception processing unit 139 includes a function that identifies a UL burst component of the domain specified in the UL_MAP (roadside-vehicle communication domain) from the frequency domain signal from the FFT unit for reception processing 137 after establishing synchronization.

Detailed Configuration of On-Vehicle Device

Figure 7:
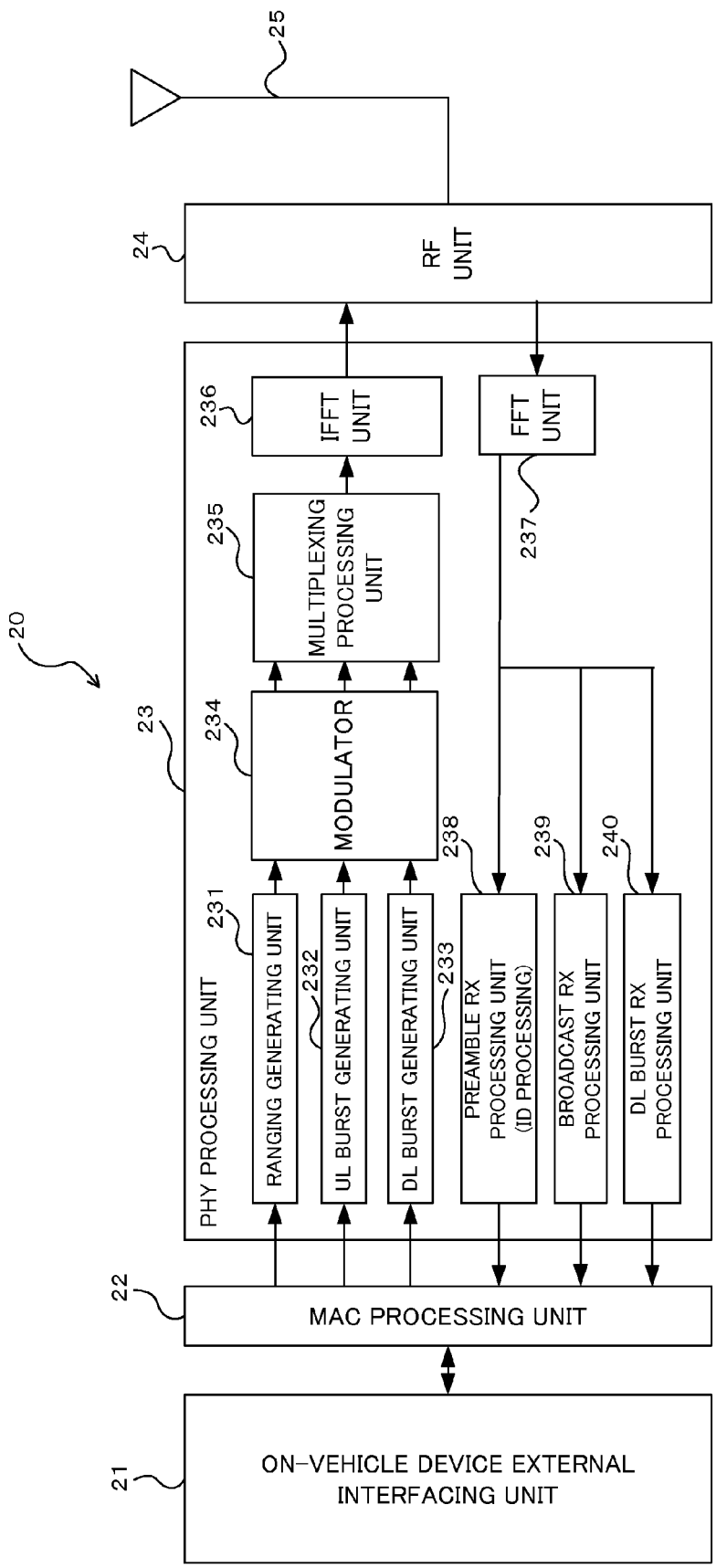
FIG. 7 is a block diagram illustrating a detailed configuration of the on-vehicle device according to the first example.

Now, FIG. 7 is a block diagram illustrating the detailed configuration of an on-vehicle device 20. The on-vehicle device 20 depicted in FIG. 7 includes, for example, as transmission functions in the physical layer processing unit 23, a ranging generating unit 231, a UL burst generating unit 232, a DL burst generating unit 233, a modulating unit 234, a multiplexing processing unit 235, and an IFFT unit 236, and includes, as reception functions, for example, an FFT unit 237, a preamble reception processing unit 238, a broadcast reception processing unit 239, and a DL burst reception processing unit 240.

Here, in the transmission functions, the ranging generating unit 231 includes a function that generates a ranging signal to be sent to the wide-area roadside device 10B. The UL burst generating unit 232 includes a function that generates a UL burst containing MAC-processed transmission data for roadside-vehicle communication. The DL burst generating unit 233 includes a function that generates a DL burst containing MAC-processed transmission data (local vehicle information) for inter-vehicle communication.

The modulating unit 234 includes a function that modulates a signal from the generating units using the modulation scheme (e.g., QPSK, 16QAM, or 64QAM), according to the direction from the MAC processing unit 22, the multiplexing processing unit 235 multiplexes the modulated signal from the modulating unit 234 into a transmission domain allocated from the wide-area roadside device 10B in the DL_MAP (the transmission domain for the roadside-vehicle communication and the transmission domain for the inter-vehicle communication) (orthogonal frequency multiplexing), and the IFFT unit 236 converts the multiplexed signal from the multiplexing processing unit 235 into a time domain signal by executing IFFT processing.

That is, the block including the ranging generating unit 231, the modulating unit 234, multiplexing processing unit 235, the IFFT unit 236, the RF unit 24, and the antenna 25 functions as transmission means that sends an allocation request for a wireless resource (communication domain) to the roadside device 10.

In contrast, in the reception function, the FFT unit 237 converts a baseband signal from the RF unit 24 into a frequency domain signal by executing FFT processing. The preamble reception processing unit 238 includes a function that identifies a preamble signal component from the frequency domain signal from the FFT unit 237 to establish synchronization.

Furthermore, the broadcast reception processing unit 239 includes a function that identifies a broadcast signal component from the frequency domain signal from the FFT unit 237 for reception processing after establishing synchronization by the preamble reception processing unit 238. The DL burst reception processing unit 240 includes a function that identifies a DL burst component of the domain (the reception domain for roadside-vehicle communication and the reception domain for inter-vehicle communications with other on-vehicle devices 20) specified in the DL_MAP in the frequency domain signal from the FFT unit 237 for reception processing after establishing synchronization.

Operation of Roadside-Vehicle Communication and Inter-Vehicle Communication

Figure 8:
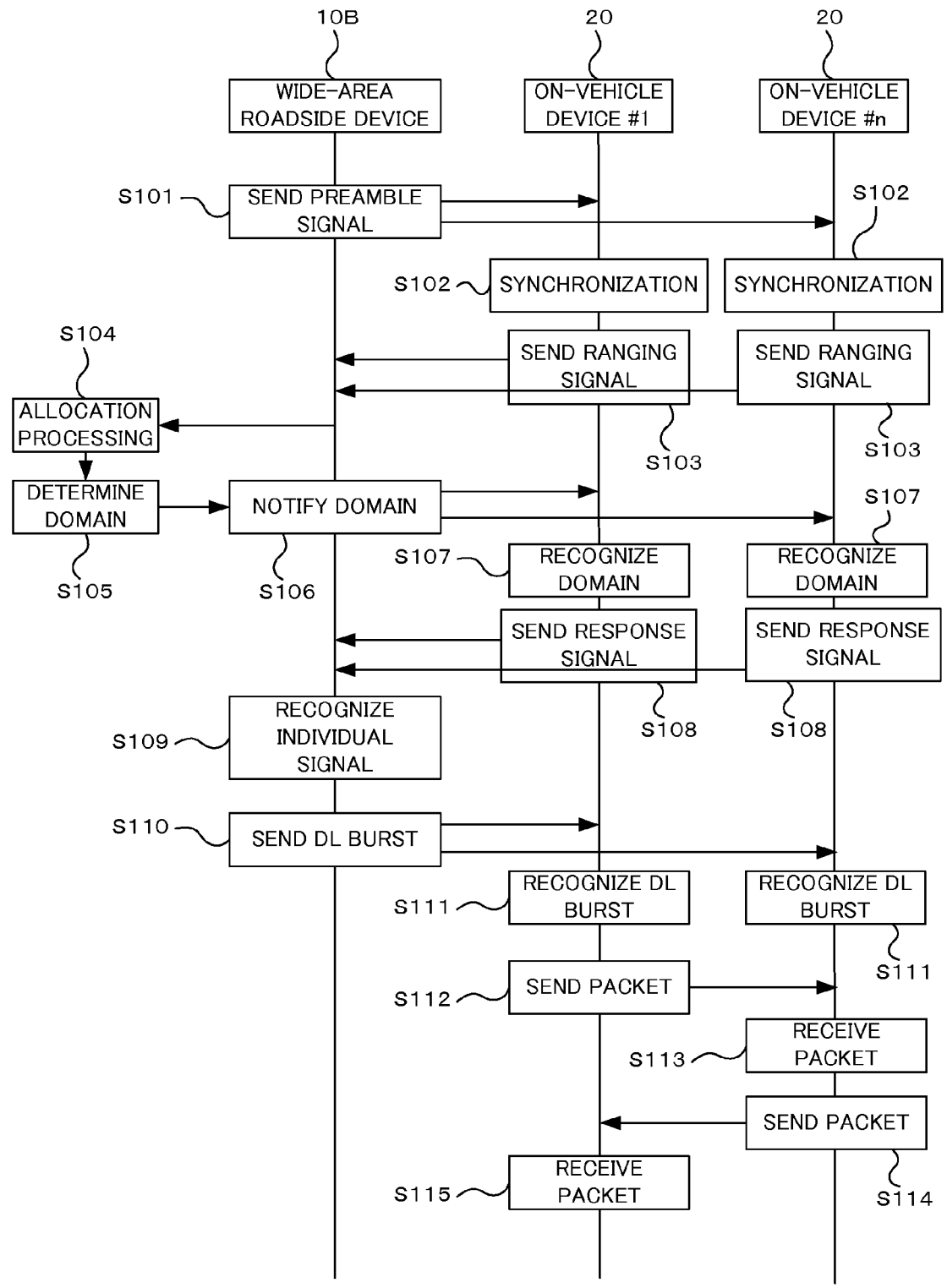
FIG. 8 is a sequence diagram illustrating roadside-vehicle communication and inter-vehicle communication in the ITS of the first example.

Hereinafter, operations of roadside-vehicle communication and inter-vehicle communication in the wireless communication system that are configured as described above will be described with reference to the sequence diagram depicted in FIG. 8.

More specifically, the wide-area roadside device 10B sends a preamble signal in the wireless frame format depicted in FIG. 4 at regular time intervals (Step S11). The on-vehicle devices 20 receive the preamble signal and establish synchronization of a wireless frame at the timing of the reception (Step S102). Once synchronization is established, an on-vehicle devices 20 sends a ranging signal to the wide-area roadside device 10B (Step S103).

The wide-area roadside device 10B recognizes the on-vehicle device 20 by receiving the ranging signal, and executes allocation processing of UL and DL communication domains for roadside-vehicle communication (roadside-vehicle communication domains) and a downlink communication domain for inter-vehicle communication (inter-vehicle communication domain) (Step S104), and notifies about the allocated communication domains in a broadcast signal (a DL_MAP and a UL_MAP for the downlink and UL roadside-vehicle communication domains, and a DL_MAP for the inter-vehicle communication domain) (Steps S105 and S106).

Each on-vehicle device 20 can identify the roadside-vehicle communication domain, the inter-vehicle communication domain allocated for that on-vehicle device 20 (local on-vehicle device transmission domain) and the inter-vehicle communication domains allocated for other on-vehicle devices 20 (other on-vehicle device transmission domains) upon receiving the broadcast signal (Steps S107 and S108).

Then, each on-vehicle device 20 generates a response signal, and sends the response signal to the roadside device in a UL burst (Step S108), and the wide-area roadside device 10B can confirm that the allocations of the domains for the roadside-vehicle communication and the inter-vehicle communication are successfully performed when the wide-area roadside device 10B receives the UL burst.

Thereafter, when the wide-area roadside device 10B identifies an individual signal to one of the on-vehicle devices 20 (Step S109), the wide-area roadside device 10B sends the signal in a DL burst (Step S110). Then the on-vehicle device 20 identifies the individual signal when it executes reception processing on the DL burst (Step S111).

Furthermore, each of the on-vehicle devices 20 generates local vehicle information (transmission packet) where necessary, and sends the local vehicle information in the identified (allocated) local on-vehicle device transmission domain (TS) (Steps S112 and S114). On the other hand, each of the on-vehicle devices 20 receives vehicle information (packet) sent by another on-vehicle device 20 in an inter-vehicle communication domain (TS) other than the local on-vehicle device transmission domain (Steps S113 and S115).

As described above, according to this example, since the roadside device 10 allocates, in the centralized manner, wireless resources for roadside-vehicle communications (roadside-vehicle communication domains) and wireless resources for inter-vehicle communications (inter-vehicle communication domains) based on the OFDMA scheme, and on-vehicle devices 20, in turn, communicate with the roadside device 10 and other on-vehicle devices 20 according to the allocation, roadside-vehicle communications and inter-vehicle communications can be achieved with higher spectrum efficiency while avoiding the hidden terminal problem.

Accordingly, an ITS system that can foresee risks of head-on collisions, right turn collisions or the like, which may be communicated to the driver can be achieved by ensuing that information on the locations, the traveling directions, the speeds, or the like of vehicles are exchanged via inter-vehicle communications.

Especially, as in this example, since allocating communication domains defined by frequency and time according to the OFDMA scheme enables allocation of wide-band and flexible wireless resources, it is possible to improve the utilization of wireless resources.

(A2) Second Example

Figure 10:
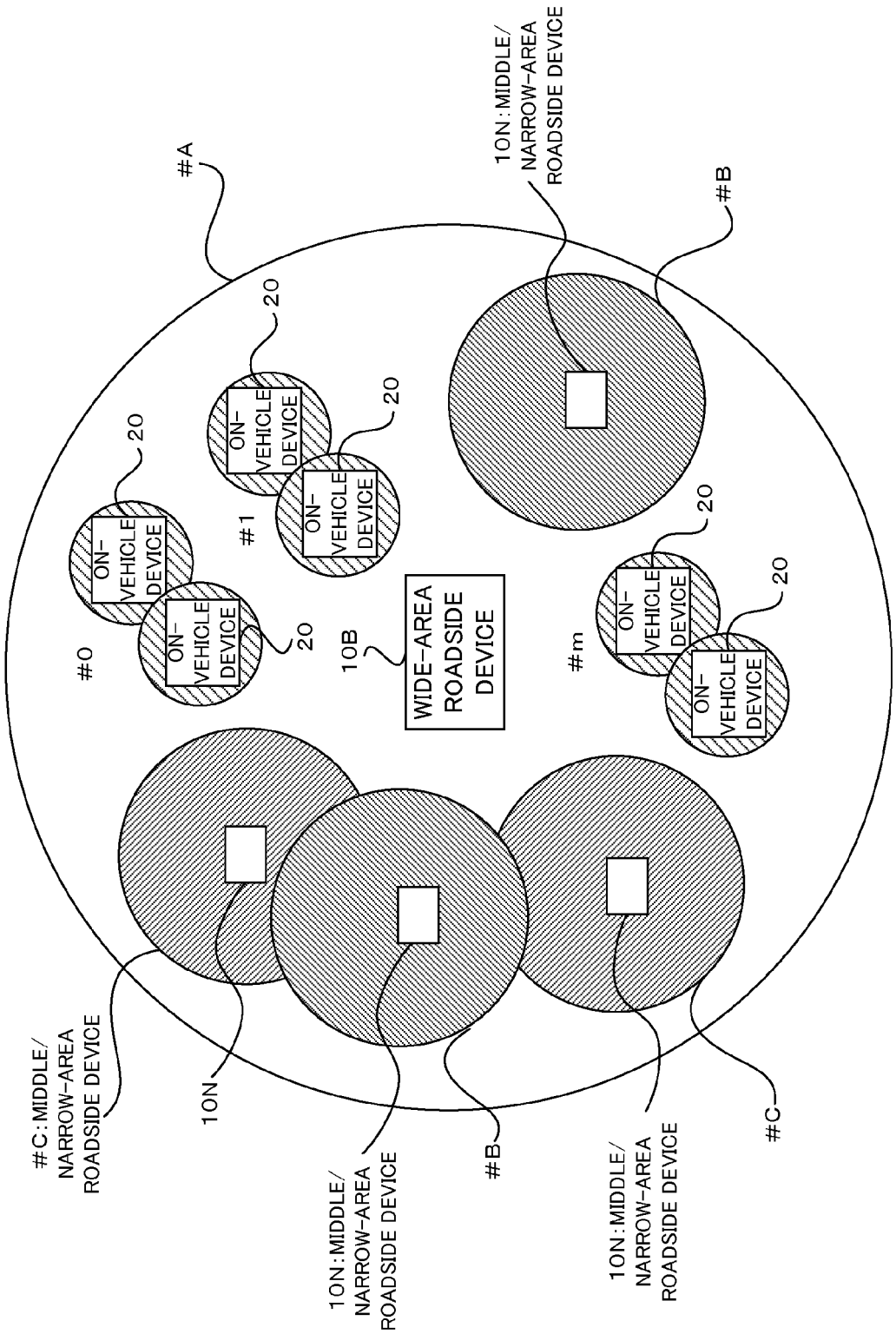
FIG. 10 is a schematic diagram illustrating exemplary locations of communication areas of roadside devices and on-vehicle devices according to the second example.

Next, FIG. 10 illustrated multiple (four) middle/narrow-area roadside devices 10N within a communication area (#A) of the wide-area roadside device 10B, wherein communication areas (#B and #C) are partially overlapped and are partially not. Note that roadside-vehicle communication between middle/narrow-area roadside devices 10N and the on-vehicle device 20 are downlink only (broadcast communication).

In this case, crosstalk may occur if the same frequency for the roadside-vehicle communication is allocated to middle/narrow-area roadside devices 10N having their communication areas overlapped each other. Thus, middle/narrow-area roadside devices 10N having non-overlapped communication areas are grouped together, and a unique frequency is allocated to each group, while allocating the same frequency to the same single group.

Figure 9:
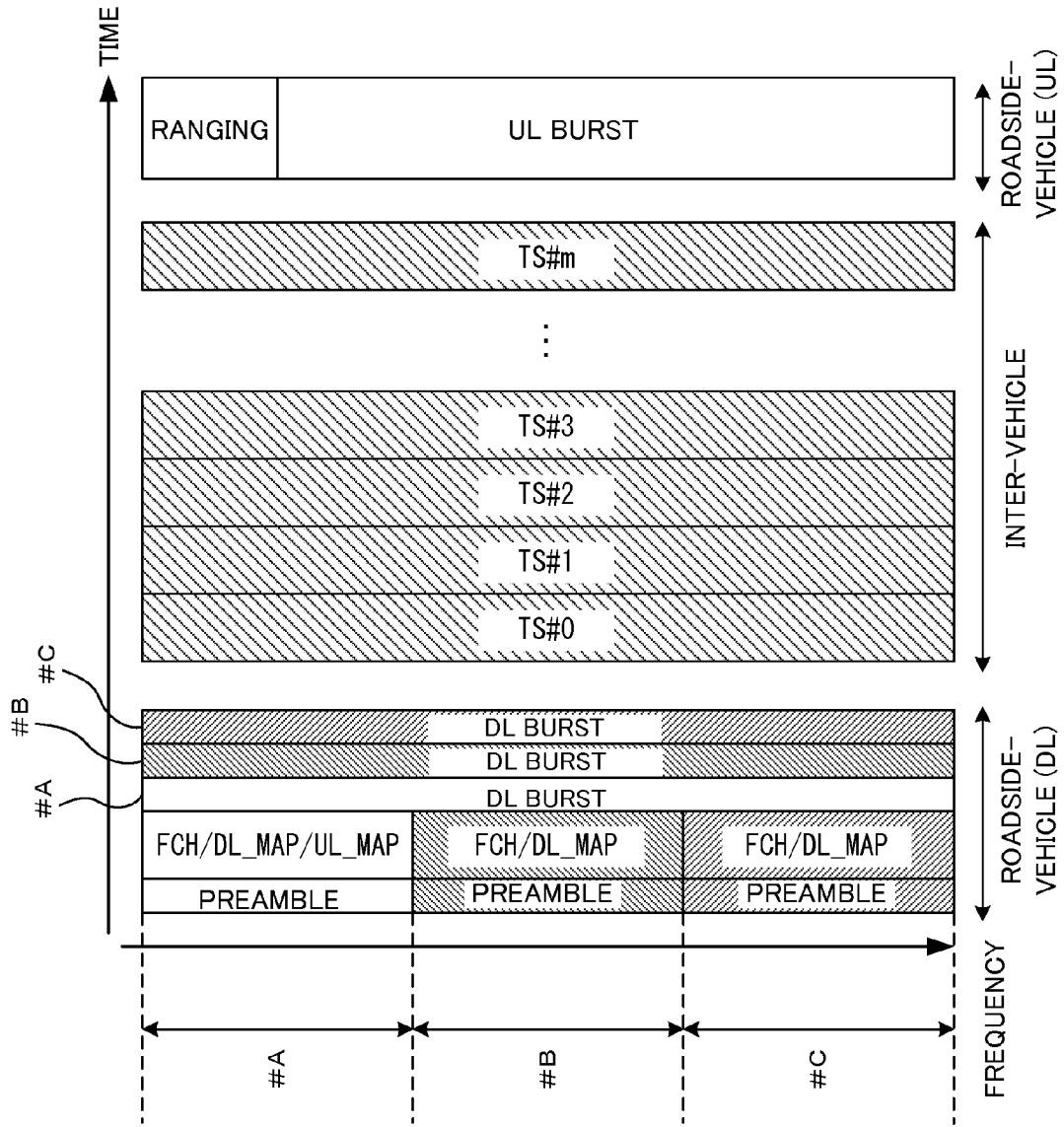
FIG. 9 is a diagram depicting a wireless frame (OFDMA frame) used in the ITS according to a second example of the first embodiment.

More specifically, in the case illustrated in FIG. 10, middle/narrow-area roadside devices 10N having non-overlapped communication areas are divided into roadside device groups #B or #C. As depicted in FIG. 9, the subchannel frequency in the wireless frame depicted in FIG. 4 is divided into three subchannel groups #A, #B, and #C. The subchannel group #A is allocated for transmission of a preamble signal, an FCH and a DL_MAP/UL_MAP for DL roadside-vehicle communication by the wide-area roadside device 10B. The other two subchannel groups #B and #C are allocated for transmission of a preamble signal, a FCH and a DL_MAP/UL_MAPs of DL roadside-vehicle communications by the roadside device groups #B and #C, respectively. Furthermore, as for a DL burst for each DL roadside-vehicle communication between the wide-area roadside device 10B, and the first roadside device group #A or the second roadside device group #B, the DL bursts #A, #B, and #C are time-division multiplexed and the transmission timing is set to a certain timing. Note that other communication domains are similar to or the same as those depicted in FIG. 4.

By allocating communication domains in this manner, hierarchical roadside-vehicle communications between multiple roadside devices 10 and on-vehicle devices 20 can be realized while preventing crosstalk from occurring.

Configuration of Middle/Narrow-Area Roadside Device

Figure 11:
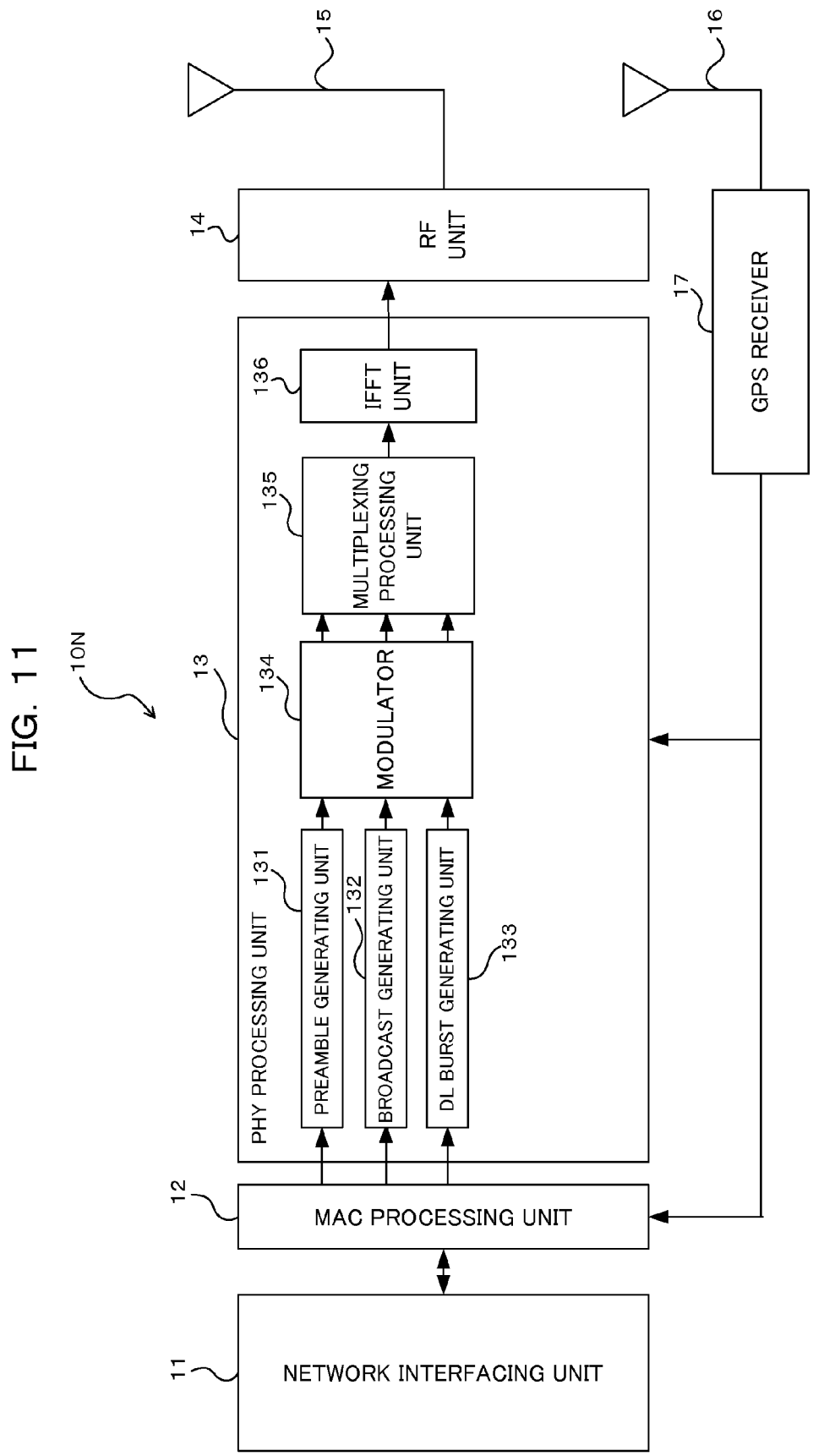
FIG. 11 is a block diagram illustrating a detailed configuration of the roadside device (middle/narrow-area roadside device) according to the second example.

The detailed configuration of a middle/narrow-area roadside device 10N is illustrated in FIG. 11. The middle/narrow-area roadside device 10N depicted in FIG. 11 includes, as transmission functions in the physical layer processing unit 13, a preamble generating unit 131, a broadcast generating unit 132, a DL burst generating unit 133, a modulating unit 135, and an IFFT unit 136. Note that in this example, since only downlink (broadcast communication) is carried out for roadside-vehicle communication between the middle/narrow-area roadside device 10N and an on-vehicle device 20, no reception function is required. It should be noted that, however, the middle/narrow-area roadside device 10N may include reception functions as those in the wide-area roadside device 10B.

Here, the preamble generating unit 131 includes a function that generates a preamble signal that are to be sent in the first domain in the wireless frame. The broadcast generating unit 132 includes a function that generates a broadcast signal, such as a DL_MAP, a UL_MAP and an FCH, according to the direction from the MAC processing unit 12. The DL burst generating unit 133 includes a function that generates a DL burst containing MAC-processed transmission data.

Furthermore, the modulating unit 134 includes a function that modulates a signal from the generating unit 131, 132, and 133 using the modulation scheme, such as QPSK, 16QAM, or 64QAM, etc. specified by the MAC processing unit 12. The multiplexing processing unit 135 multiplexes the modulated signal from the modulating unit 134 into a transmission domain for the roadside-vehicle communication in the wireless frame described above with reference to FIG. 9 (orthogonal frequency multiplexing). The IFFT unit 136 converts the multiplexed signal from the multiplexing processing unit 135 into a time domain signal by executing IFFT processing.

Note that the configurations of each of the wide-area roadside device 10B and the on-vehicle device 20 are basically similar to those described with reference to FIGS. 6 and 7, respectively. However, the wide-area roadside device 10B multiplexes the signal generated by the preamble generating unit 131, the broadcast generating unit 132, and the DL burst generating unit 133 into a transmission domain for roadside-vehicle communication in the wireless frame which has been described with reference to FIG. 9 in the multiplexing processing unit 135 in the physical layer processing unit 13.

Operations of Roadside-Vehicle Communication and Inter-Vehicle Communication

Figure 12:
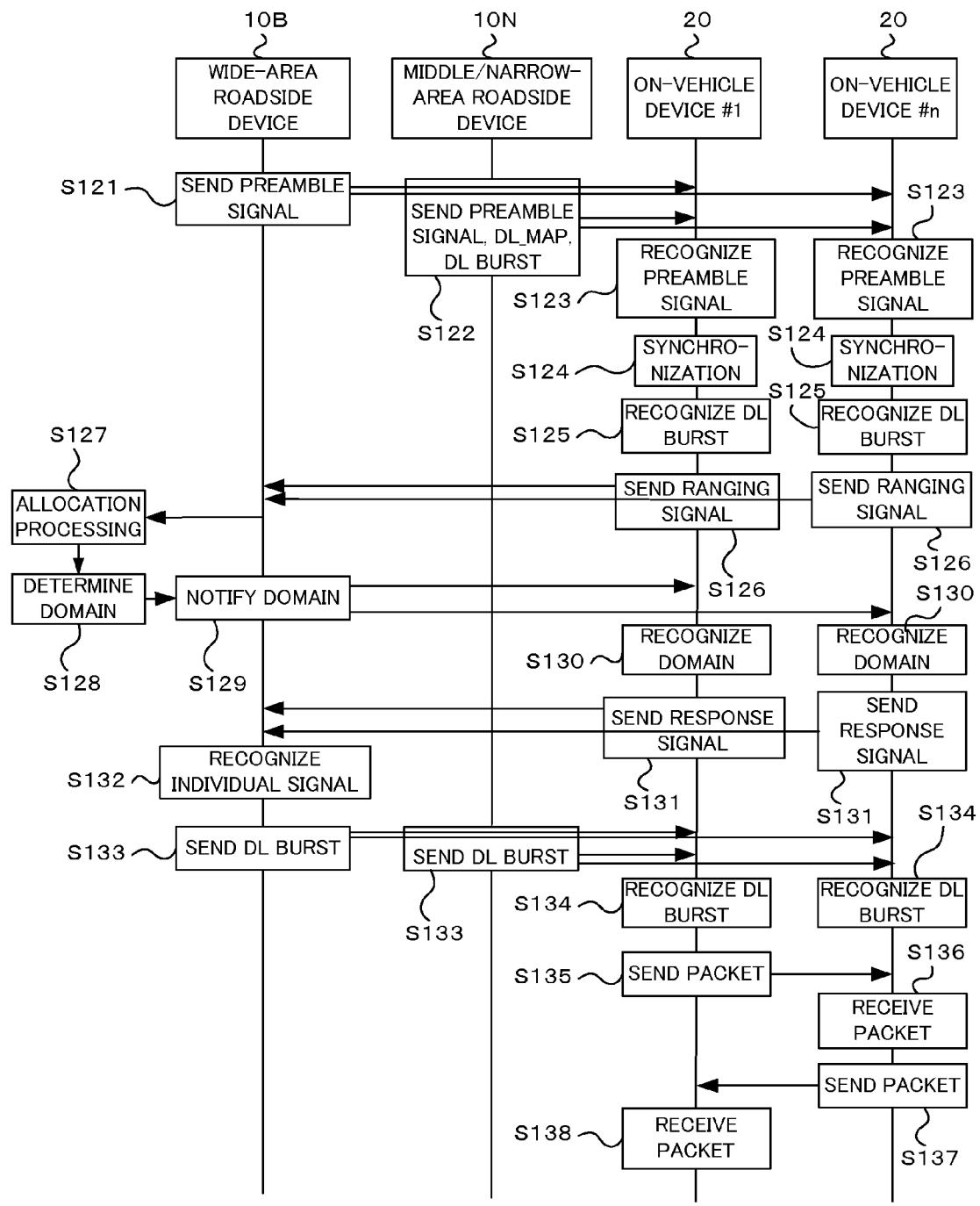
FIG. 12 is a sequence diagram illustrating roadside-vehicle communication and inter-vehicle communication in the ITS of the second example.

Hereinafter, operations of roadside-vehicle communication and inter-vehicle communication in the wireless communication system of a second example that is configured as described above will be described with reference to the sequence diagram depicted in FIG. 12.

More specifically, the wide-area roadside device 10B sends a preamble signal using the subchannel group #A in the wireless frame depicted in FIG. 9 at regular time intervals (Step S121). The middle/narrow-area roadside device 10N sends a preamble signal and a DL_MAP using the subchannel group #B or #C of the wireless frame depicted in FIG. 9, as well as sending a DL burst at the transmission timing #B or #C (Step S122). Note that the DL_MAP sent by the middle/narrow-area roadside device 10N includes at least allocation information on the DL burst #B or #C of that local roadside device 10N as depicted in FIG. 9, allocation information on the DL burst #A of the wide-area roadside device 10B, and allocation information on the communication domain for UL roadside-vehicle communication.

Upon receiving and identifying a preamble signal from the wide-area roadside device 10B or the middle/narrow-area roadside device 10N, on-vehicle devices 20 establish synchronization of a wireless frame at the timing of the reception (Steps S123 and S124). Once synchronization is established, if the on-vehicle device 20 is located within the communication area of the middle/narrow-area roadside device 10N, it can receive a DL burst sent by that middle/narrow-area roadside device 10N. Upon identifying this DL burst (Step S125), the on-vehicle device 20 sends a ranging signal in the transmission domain for UL roadside-vehicle communication (Step S126).

Once the wide-area roadside device 10B receives this ranging signal, the wide-area roadside device 10B recognize the on-vehicle device 20 and executes allocation processing of UL and DL communication domains for roadside-vehicle communication (roadside-vehicle communication domains) (Step S127), and notifies about the allocated communication domains in a broadcast signal (DL_MAP) (Steps S128 and S129).

Each on-vehicle device 20 can identify the inter-vehicle communication domain allocated for that on-vehicle device 20 (local on-vehicle device transmission domain) and the inter-vehicle communication domains allocated for other on-vehicle devices 20 (other on-vehicle device transmission domains) upon receiving the broadcast signal (Step S130).

Then, each on-vehicle device 20 generates a response signal, and sends the response signal to the wide-area roadside device 10B in a UL burst (Step S131), and the wide-area roadside device 10B can confirm that the allocations of the domains for the inter-vehicle communication are successfully performed when the wide-area roadside device 10B receives the UL burst.

Thereafter, when the wide-area roadside device 10B identifies an individual signal to one of the on-vehicle devices 20 (Step S132), the wide-area roadside device 10B sends the individual signal in a DL burst (Step S133). Then the on-vehicle device 20 identifies the individual signal when it executes reception processing on the DL burst (Step S134).

Furthermore, each of the on-vehicle devices 20 generates local vehicle information (transmission packet) where necessary, and sends the local vehicle information in the identified (allocated) local on-vehicle device transmission domain (TS) (Steps S135 and S137). On the other hand, each of the on-vehicle devices 20 receives vehicle information (packet) sent by another on-vehicle device 20 in an inter-vehicle communication domain (TS) other than the local on-vehicle device transmission domain (Steps S136 and S138).

As described above, according to this example, since subchannel frequencies can be divided and allocated as roadside-vehicle communication domains to multiple roadside devices 10 having overlapped communication areas on the different layers or on the same layer in the hierarchy (in other words, the roadside-vehicle communication domains of the roadside devices 10 are frequency-division multiplexed), roadside-vehicle communication and inter-vehicle communication can be successfully achieved even if overlapping communication areas are present.

(A3) Third Example

Figure 13:
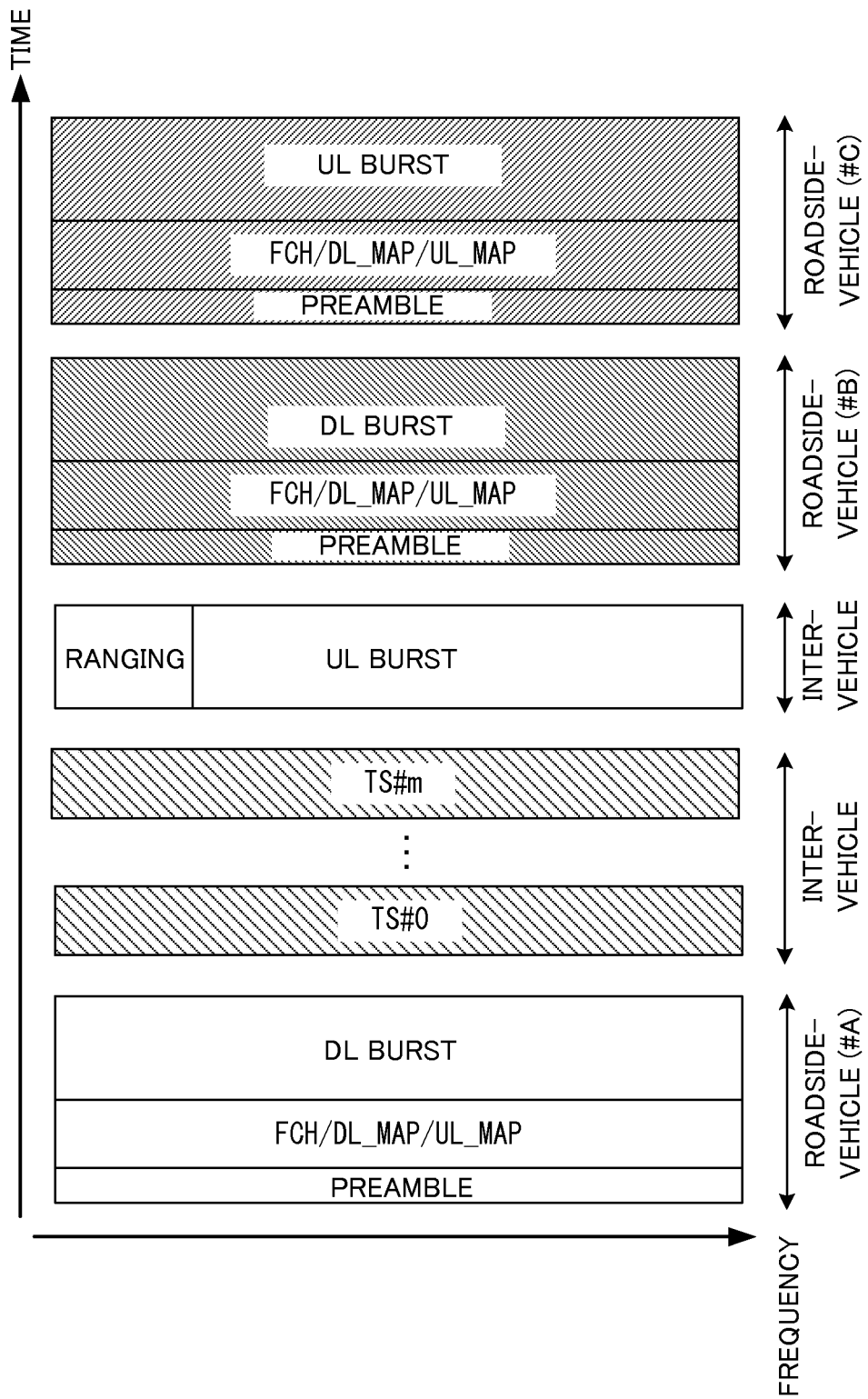
FIG. 13 is a diagram depicting the configuration of a wireless frame used in the ITS according to a third example of the first embodiment.

In the communication area situation depicted in FIG. 10, although a DL roadside-vehicle communication domain are divided in the subchannel frequency direction in the second example described above, it may be divided in the time direction as depicted in FIG. 13. More specifically, the time of the wireless frame depicted in FIG. 4 is divided into three time slots (TSs) #A, #B, and #C. TS #A is allocated for DL roadside-vehicle communication by the wide-area roadside device 10B (for transmission of a preamble signal, an FCH, a DL_MAP/UL_MAP, a DL burst), TS #B is allocated for DL roadside-vehicle communication by the group #B of the middle/narrow-area roadside devices 10N having non-overlapping communication areas (for transmission of a preamble signal, an FCH, the DL_MAP/UL_MAP, a DL burst). Similarly, TS #C is allocated for DL roadside-vehicle communication by the group #C of the middle/narrow-area roadside devices 10N having non-overlapping communication areas (for transmission of a preamble signal, an FCH, the DL_MAP/UL_MAP, a DL burst).

Note that other communication domains are similar to or the same as those depicted in FIG. 4. Furthermore, the configurations of the wide-area roadside device 10B, the middle/narrow-area roadside device 10N, and the on-vehicle devices 20 are the same as or similar to those of the above-described configurations, except that multiplexing processing in the physical layer processing unit 13 (the multiplexing processing unit 135) in the wide-area roadside device 10B and the middle/narrow-area roadside device 10N is executed according to the wireless frame format depicted in FIG. 13, unless otherwise stated.

Operations of Roadside-Vehicle Communication and Inter-Vehicle Communication

Figure 14:
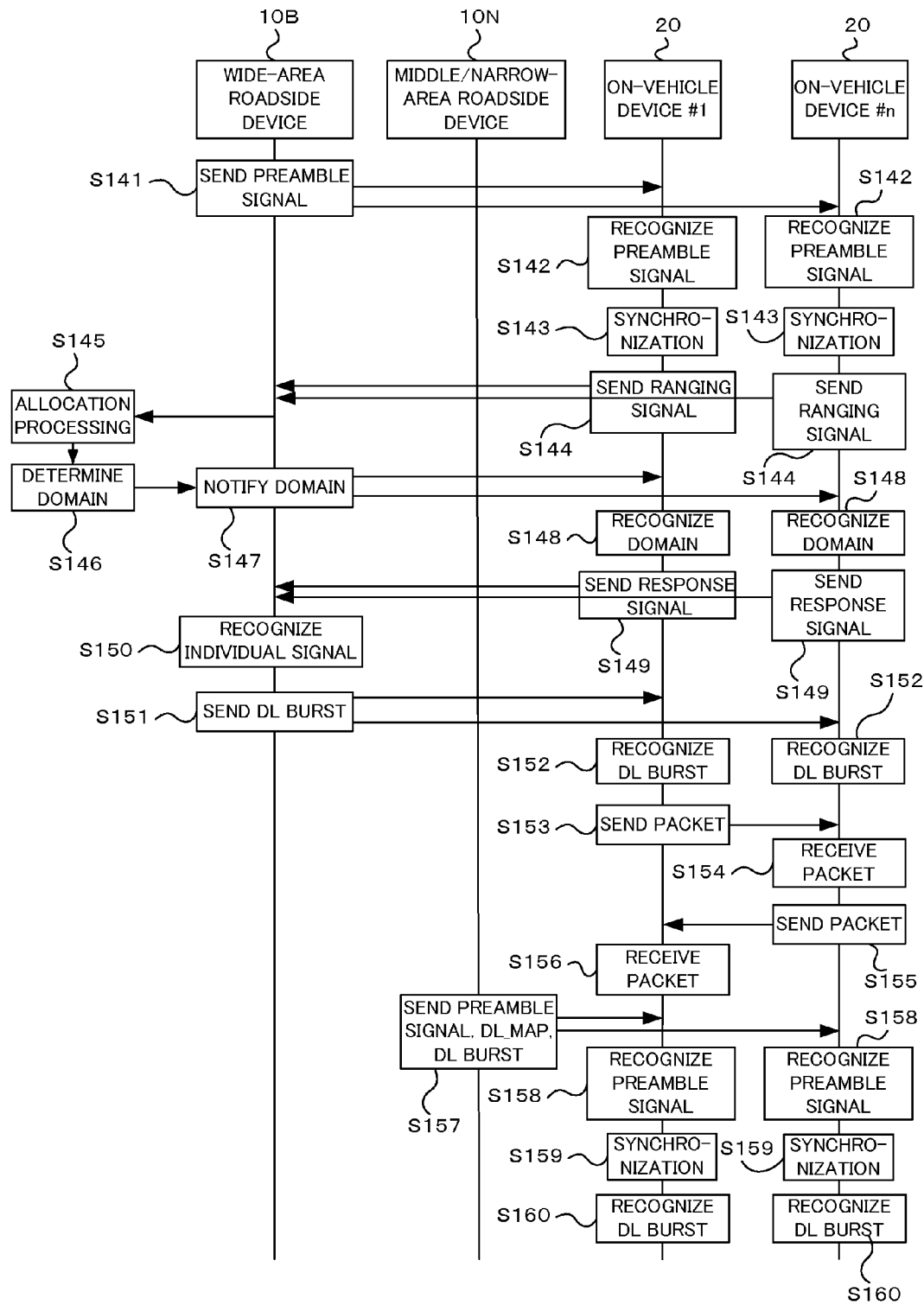
FIG. 14 is a sequence diagram illustrating roadside-vehicle communication and inter-vehicle communication in the ITS of the third example.

Hereinafter, operations of roadside-vehicle communication and inter-vehicle communication in the radio frequency communication system of a third example that is configured as described above will be described with reference to the sequence diagram depicted in FIG. 14.

More specifically, the wide-area roadside device 10B sends a preamble signal at regular time intervals using TS #A of the wireless frame depicted in FIG. 13 (Step S141). The on-vehicle device 20 can receive and identify that preamble signal if it is within the communication area of the wide-area roadside device 10B but outside the communication area of the middle/narrow-area roadside device 10N (Step S142). The on-vehicle device 20 then establishes wireless frame synchronization based on the received preamble signal (Step S143), and sends a ranging signal in the transmission domain for UL roadside-vehicle communication (Step S144).

When the wide-area roadside device 10B receives the ranging signal, the wide-area roadside device 10B executes allocation processing of UL and DL communication domains for roadside-vehicle communication (roadside-vehicle communication domains) and a downlink communication domain for inter-vehicle communication (inter-vehicle communication domain) (Step S145), and notifies about the allocated communication domains in a broadcast signal (a DL_MAP and a UL_MAP for the downlink and UL roadside-vehicle communication domains, and a DL_MAP for the inter-vehicle communication domain) (Steps S146 and S147).

Each on-vehicle device 20 can identify the roadside-vehicle communication domain, the inter-vehicle communication domain allocated for that on-vehicle device 20 (local on-vehicle device transmission domain) and the inter-vehicle communication domains allocated for other on-vehicle devices 20 (other on-vehicle device transmission domains) upon receiving the broadcast signal (Step S148).

Then, each on-vehicle device 20 generates a response signal, and sends the response signal to the wide-area roadside device 10B in a UL burst (Step S149), and the wide-area roadside device 10B can confirm that the allocations of the domains for the roadside-vehicle communication and the inter-vehicle communication are successfully performed when the wide-area roadside device 10B receives the UL burst.

Thereafter, when the wide-area roadside device 10B identifies an individual signal to one of the on-vehicle devices 20 (Step S150), the wide-area roadside device 10B sends the individual signal in a DL burst (Step S151). Then the on-vehicle device 20 identifies the individual signal when the on-vehicle device 20 executes reception processing on the DL burst (Step S152).

Furthermore, each of the on-vehicle devices 20 generates local vehicle information (transmission packet) where necessary, and sends that packet (local vehicle information) in the identified (allocated) local on-vehicle device transmission domain (TS) (Steps S153 and S155). On the other hand, each of the on-vehicle devices 20 receives vehicle information (packet) sent by another on-vehicle device 20 in an inter-vehicle communication domain (TS) other than the local on-vehicle device transmission domain (Steps S154 and S156).

In contrast, the middle/narrow-area roadside device 10N sends a preamble signal, a DL_MAP and a DL burst at regular time intervals using TS #B or #C in the wireless frame depicted in FIG. 13 (Step S157), and each of such signals is received by the on-vehicle device 20 located within the communication area of the middle/narrow-area roadside device 10N.

More specifically, when the on-vehicle device 20 receives and identifies the preamble signal within the communication area of the middle/narrow-area roadside device 10N (Step S158), the on-vehicle device 20 establishes wireless frame synchronization based on that preamble signal (Step S159). The on-vehicle device 20 then receives a DL_MAP, and is able to identify the DL roadside-vehicle communication domain (DL burst) with that middle/narrow-area roadside device 10N and the inter-vehicle communication domains using the DL_MAP for receiving and identifying DL bursts (Step S160).

As described above, according to this example, it is possible to allocate roadside-vehicle communication domains to multiple roadside devices 10 having overlapped communication areas on the different layers or on the same layer in the hierarchy without dividing subchannel frequencies (in other words, roadside-vehicle communication domains of each roadside device 10 are time-division multiplexed). Thus, it is possible to realize roadside-vehicle communication and inter-vehicle communication comparable to those achieved in the second example without sharing the same frequency among the roadside devices 10 for DL roadside-vehicle communications (particularly, broadcast signals, such as preambles, FCHs, DL_MAP/UL_MAP), without increasing types of information required for establishing synchronization or identifying domains by on-vehicle devices 20.

(A4) Fourth Example

Figure 16:
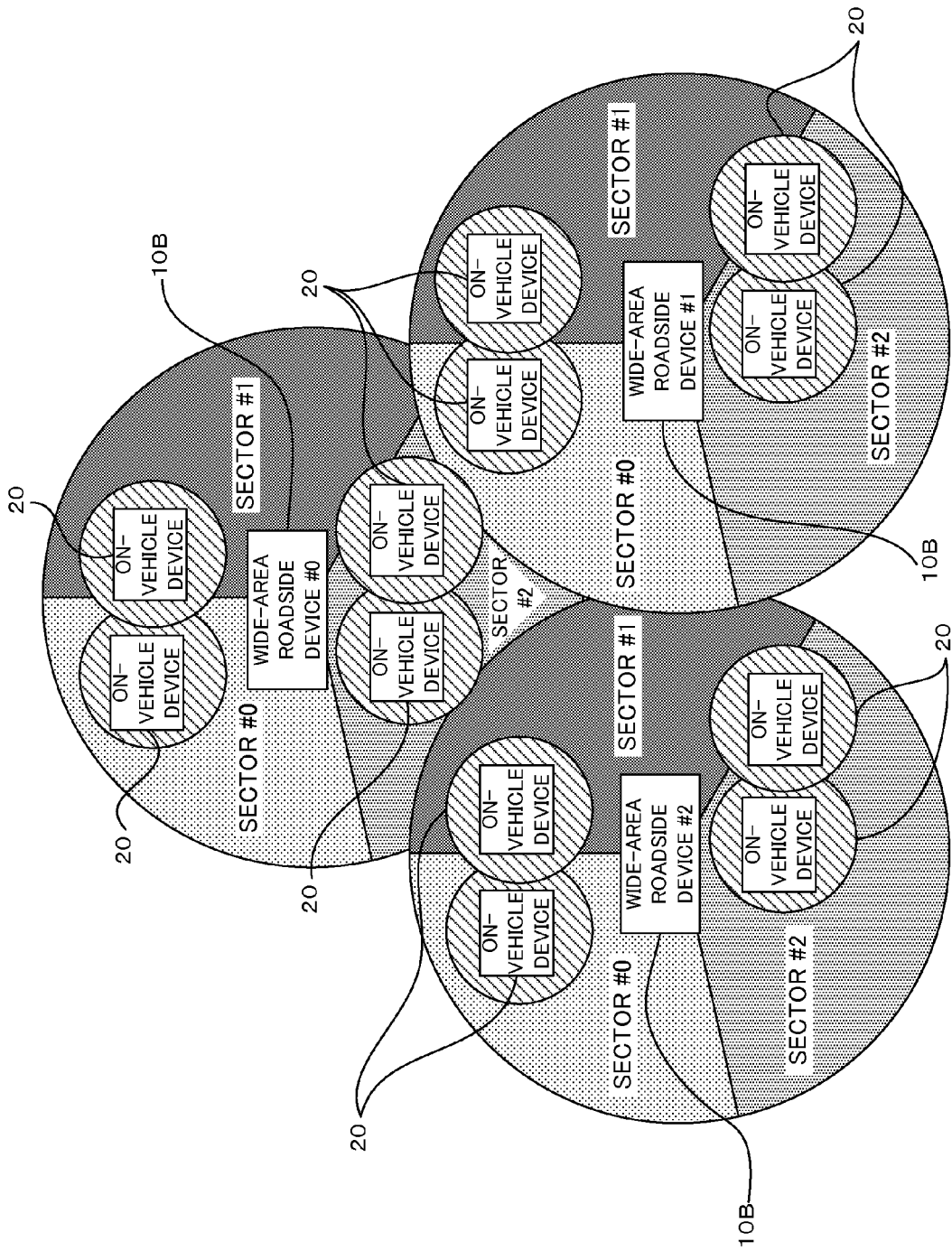
FIG. 16 is a schematic diagram illustrating exemplary locations of communication areas of roadside devices and on-vehicle devices according to the fourth example.

FIG. 16 illustrates multiple (three) wide-area roadside devices 10B having their communication areas (wide areas) overlapped. In this case, a communication area of each wide-area roadside device 10B is divided into multiple (i.e., three) sectors #0, #1, and #2, and sectors #i (i=0, 1, 2) having non-overlapped communication areas are grouped into sector groups #i, then different frequencies are allocated to different sector groups #i for roadside-vehicle communication.

Figure 15:
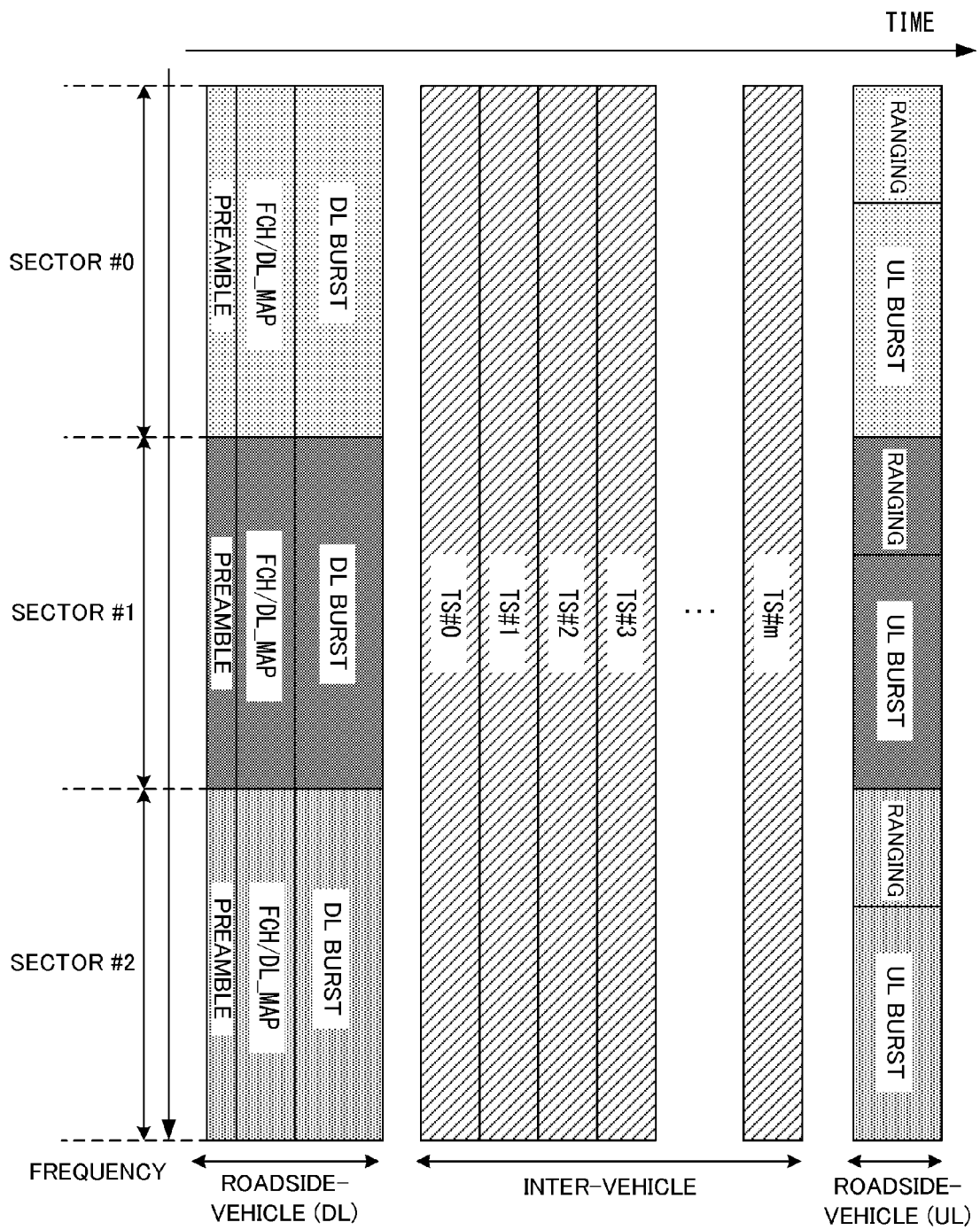
FIG. 15 is a diagram depicting the configuration of a wireless frame used in the ITS according to a fourth example of the first embodiment.

More specifically, as depicted in FIG. 15, a subchannel frequency in a wireless frame is divided (grouped) into sector groups #i, which are allocated for downlink and UL roadside-vehicle communications. However, as the format for the communication domains of inter-vehicle communications (TS), all subchannel frequencies are used for time-division multiplexing for each wide-area roadside device 10B.

Note that, also in this example, the configurations of the wide-area roadside device 10B, the middle/narrow-area roadside device 10N, and the on-vehicle devices 20 are the same as or similar to those of the above-described configurations, except the multiplexing processing in the physical layer processing unit 13 (the multiplexing processing unit 135) in the wide-area roadside device 10B and the middle/narrow-area roadside device 10N is executed according to the wireless frame format depicted in FIG. 13, unless otherwise stated.

Operations of Roadside-Vehicle Communication and Inter-Vehicle Communication

Figure 17:
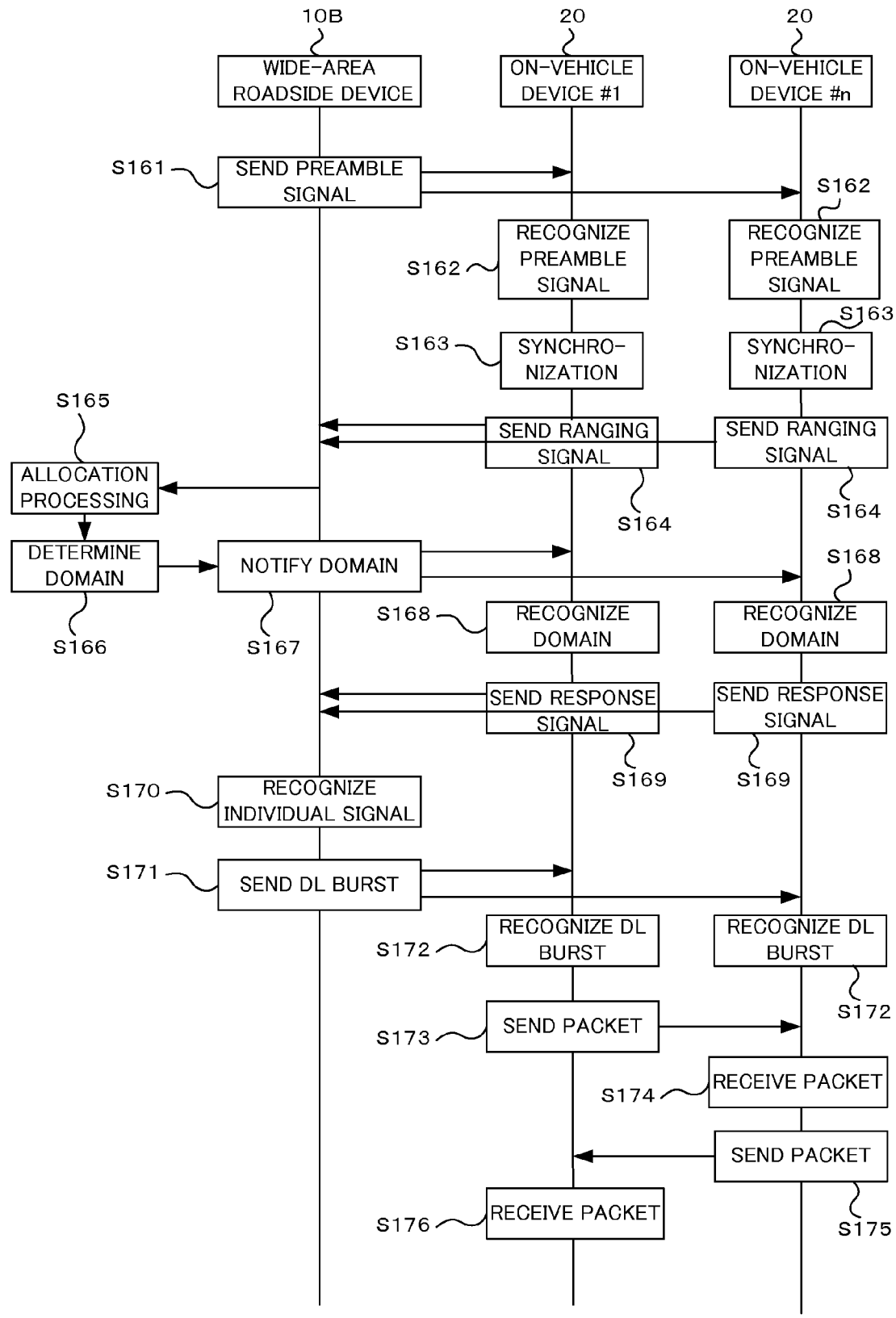
FIG. 17 is a sequence diagram illustrating roadside-vehicle communication and inter-vehicle communication in the ITS of the fourth example.

Hereinafter, operations of roadside-vehicle communication and inter-vehicle communication in the wireless communication system of a fourth example that is configured as described above will be described with reference to the sequence diagram depicted in FIG. 17.

More specifically, each wide-area roadside device 10B sends a preamble signal at regular time intervals using the subchannel group #i in the wireless frame depicted in FIG. 15 (Step S161). A on-vehicle device 20 may receive multiple preamble signals when it is located where communication areas of wide-area roadside devices 10B are overlapped. In such a case, it calculates, for example, correlation of each preamble signal with its replica signal, and identifies (detects) a signal having the highest result (Step S162). It establishes wireless frame synchronization based on the identified preamble signal (Step S163).

Once synchronization is established, the on-vehicle device 20 sends a ranging signal using a transmission domain for UL roadside-vehicle communication of the subchannel group #i to which the subchannel frequency of the received preamble signal belongs (Step S164).

When the wide-area roadside device 10B corresponding to that subchannel group #i receives this ranging signal, that wide-area roadside device 10B recognizes the on-vehicle device 20 and executes allocation processing of UL and DL communication domains (UL burst and DL burst) for roadside-vehicle communication and a communication domain for inter-vehicle communication (TS) (Step S165), and notifies about the allocated communication domains in a broadcast signal (DL_MAP) (Steps S166 and S167). At this time, the wide-area roadside device 10B are communicably connected each other by their desired networks, and they all know about TSs that are not used for inter-vehicle communication (vacant TSs), and execute allocation processing of a vacant TS for inter-vehicle communication.

Each on-vehicle device 20 can identify the UL and DL communication domains (UL burst and DL burst) for roadside-vehicle communication and the communication domain for inter-vehicle communication (TS: local on-vehicle device transmission domain) allocated for that on-vehicle device 20, and the inter-vehicle communication domains allocated for other on-vehicle device 20 (local on-vehicle device transmission regions: TS) upon receiving the broadcast signal (Step S168).

Then, each on-vehicle device 20 generates a response signal, and sends the response signal to the wide-area roadside device 10B in the identified UL burst (Step S169), and the wide-area roadside device 10B can confirm that the allocations of the domains for the roadside-vehicle communication and the inter-vehicle communication are successfully performed when the wide-area roadside device 10B receives the UL burst.

Thereafter, when the wide-area roadside device 10B identifies an individual signal to one of the on-vehicle devices 20 (Step S170), the wide-area roadside device 10B sends the individual signal in the allocated DL burst (Step S171) and then the on-vehicle device 20 identifies the individual signal when the on-vehicle device 20 executes reception processing on the DL burst (Step S172).

Furthermore, each of the on-vehicle devices 20 generates local vehicle information (transmission packet) where necessary, and sends the local vehicle information in the identified (allocated) local on-vehicle device transmission domain (TS) (Steps S173 and S175). On the other hand, each of the on-vehicle devices 20 receives vehicle information (packet) sent by another on-vehicle device 20 in an inter-vehicle communication domain (TS) other than the local on-vehicle device transmission domain (Steps S174 and S176).

As described above, according to this example, a communication area (wide area) of a roadside device 10B is divided into multiple sectors, and different subchannel frequencies are allocated for roadside-vehicle communication in a sector in which communication areas overlap. (In other words, communication areas of multiple roadside devices 10B are divided into multiple sectors, and downlink and UL roadside-vehicle communication domains are frequency-division multiplexed for sectors overlapped with other roadside devices 10B. Thus, communication collisions within an area where wide areas overlap can be avoided.

(A5) Fifth Example

Figure 19:
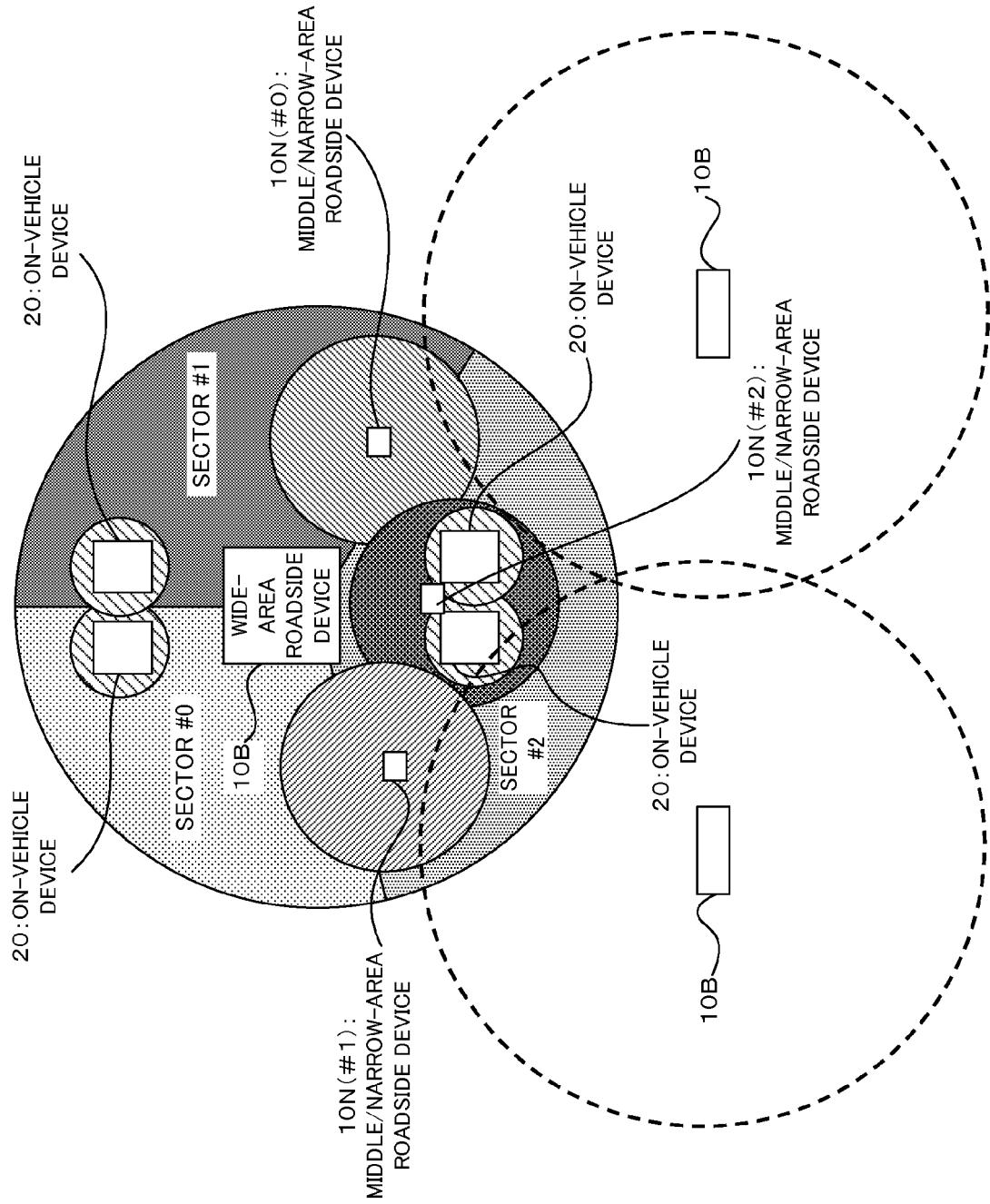
FIG. 19 is a schematic diagram illustrating exemplary locations of communication areas of roadside devices and on-vehicle devices according to the fifth example.

FIG. 19 depicts that multiple (three) wide-area roadside devices 10B are present with their communication areas (wide area) are overlapped, and multiple (three) communication areas of the middle/narrow-area roadside devices 10N are present and overlapped within at least one of the wide-areas of the wide-area roadside devices 10B. In this case, communication domains should be allocated considering overlapping wide areas and overlapping middle/narrow areas in order to avoid crosstalk. Subchannel frequencies should be divided into more than there segments when considering division of subchannel frequencies.

Figure 18:
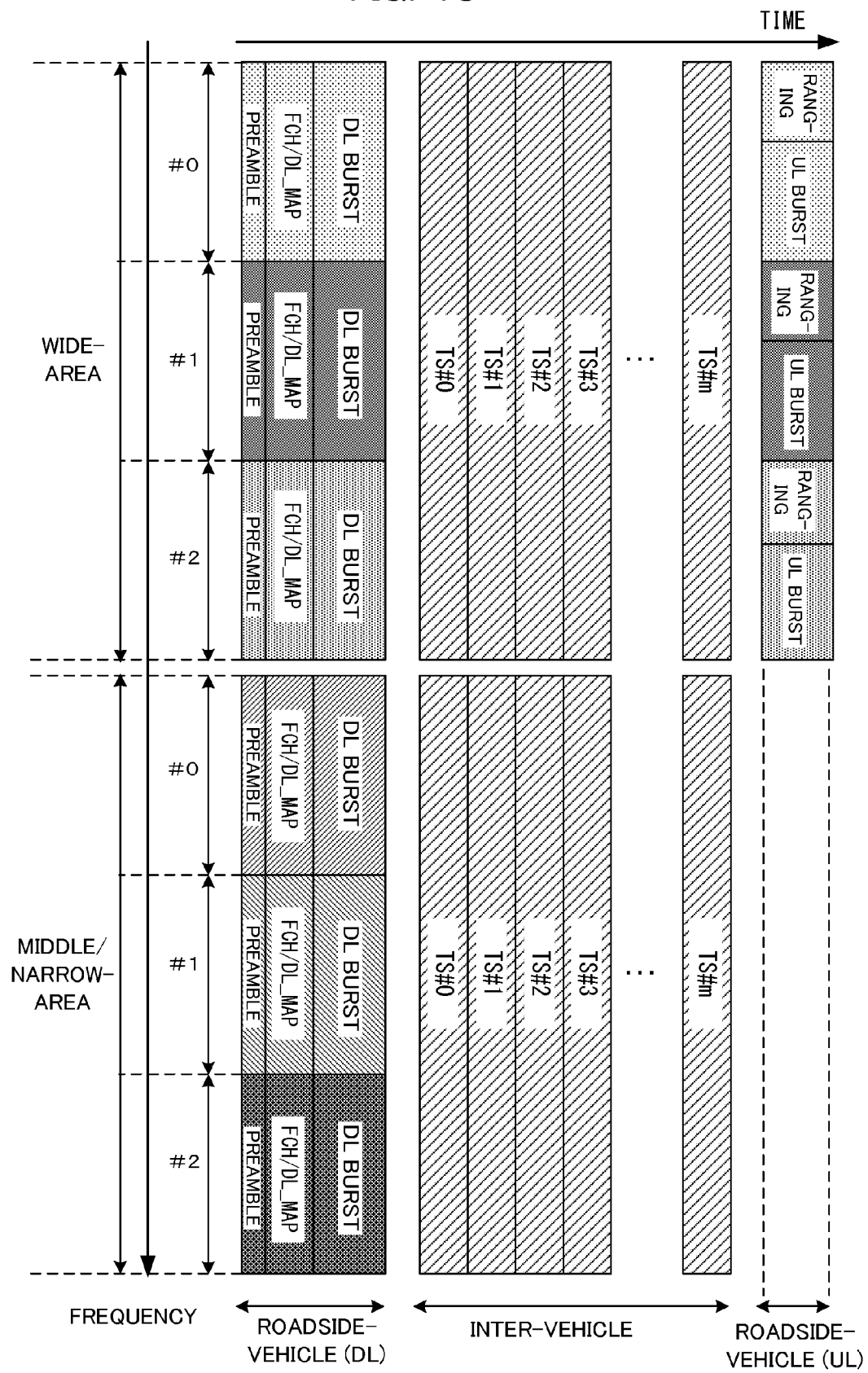
FIG. 18 is a diagram depicting the configuration of a wireless frame used in the ITS according to a fifth example of the first embodiment.

For this purpose, as depicted in FIG. 18, the system frequency band is divided into two, and the subchannel frequency of the first frequency band is divided to sectors #0, #1, and #2 for wide areas as in FIG. 15, and the subchannel frequency of the second frequency band is divided to allocate to middle/narrow-area roadside devices 10N (#0, #1, and #2) for middle/narrow areas (i.e., the system frequency band is divided into six segments in total for allocating them).

Also in this example, when downlink (broadcast communication) is assumed for roadside-vehicle communication between a middle/narrow-area roadside device 10N and an on-vehicle device 20, allocation of an UL roadside-vehicle communication domain in the second frequency band for a middle/narrow area (transmission domain for a ranging signal and a UL burst for the on-vehicle device 20) is not required.

As described above, the system frequency band is divided into two for the wide areas and the middle/narrow areas, and the divided frequency band for the wide areas are further divided into three sectors and the divided frequency band for the middle/narrow areas is further divided into three (in other words, the system frequency band is divided into six segments in total), thereby allocating them for roadside-vehicle communication by each roadside device 10. (In other words, DL roadside-vehicle communication domains of the same sector of roadside devices 10B are frequency-division multiplexed, and overlapping communication areas of multiple roadside devices 10N located in a commutation area of a roadside device 10B are frequency-division multiplexed with respect to other communication areas of other roadside devices 10B). Thus, even when wide areas of multiple roadside devices 10B overlap and communication areas of multiple roadside devices 10N overlap in a wide area, roadside-vehicle communication and inter-vehicle communication can be successfully achieved.

Figure 20:
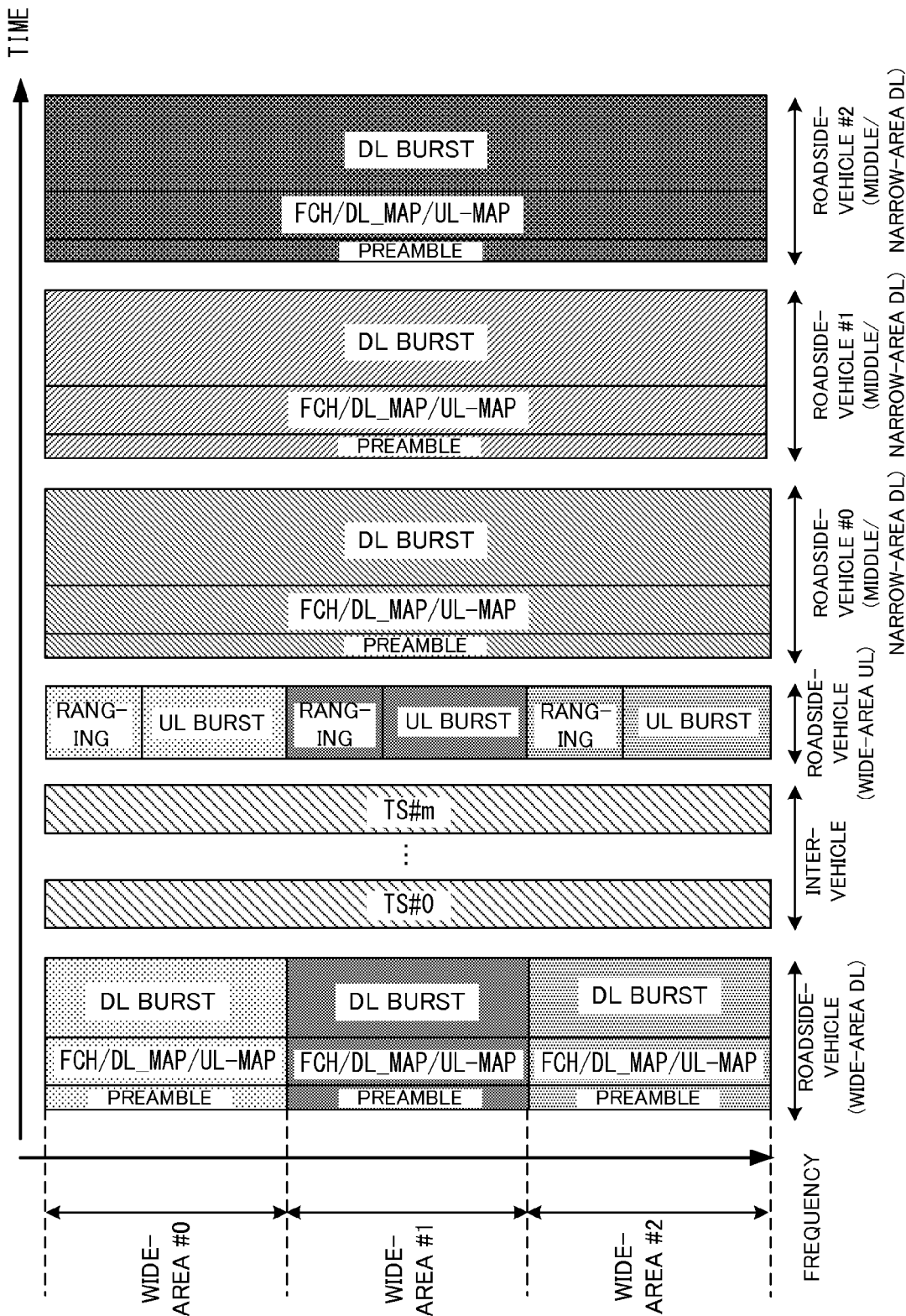
FIG. 20 is a diagram depicting another configuration of a wireless frame used in the ITS according to the fifth example.

Note that DL roadside-vehicle communication domains for middle/narrow areas can be time-division multiplexed by allocating TSs #0, #1, and #2 for each of the middle/narrow-area roadside devices, as depicted in FIG. 20. By using time-division multiplexing of the TSs for allocating to the middle/ narrow-area roadside devices 10N, division of the system frequency band into small sections, as in the case of FIG. 18, is not required.

Accordingly, since a frequency for DL roadside-vehicle communication (particularly, broadcast signals, such as a preamble, an FCH, a DL_MAP/UL_MAP) is shared between roadside devices 10, roadside-vehicle communication and inter-vehicle communication comparable with the case depicted in FIG. 18 can be achieved without increasing types of information required for establishing synchronization or identifying domains by on-vehicle devices.

Note that, in the case of either of the wireless frame formats depicted in FIGS. 18 and 20, the configurations of the wide-area roadside device 10B, the middle/narrow-area roadside device 10N, and the on-vehicle devices 20 are the same as or similar to those of the above-described configurations, except that multiplexing processing in the physical layer processing unit 13 (the multiplexing processing unit 135) in the wide-area roadside device 10B and the middle/narrow-area roadside device 10N is executed according to the wireless frame formats depicted in FIG. 18 or 20, respectively.

(2) Second Embodiment

Overview

Although the above first embodiment has been described focusing on allocation of wireless resources (communication domains) used for roadside-vehicle and inter-vehicle communications, a second embodiment will be described by focusing on allocation of wireless resources for inter-vehicle communication.

Figure 21:
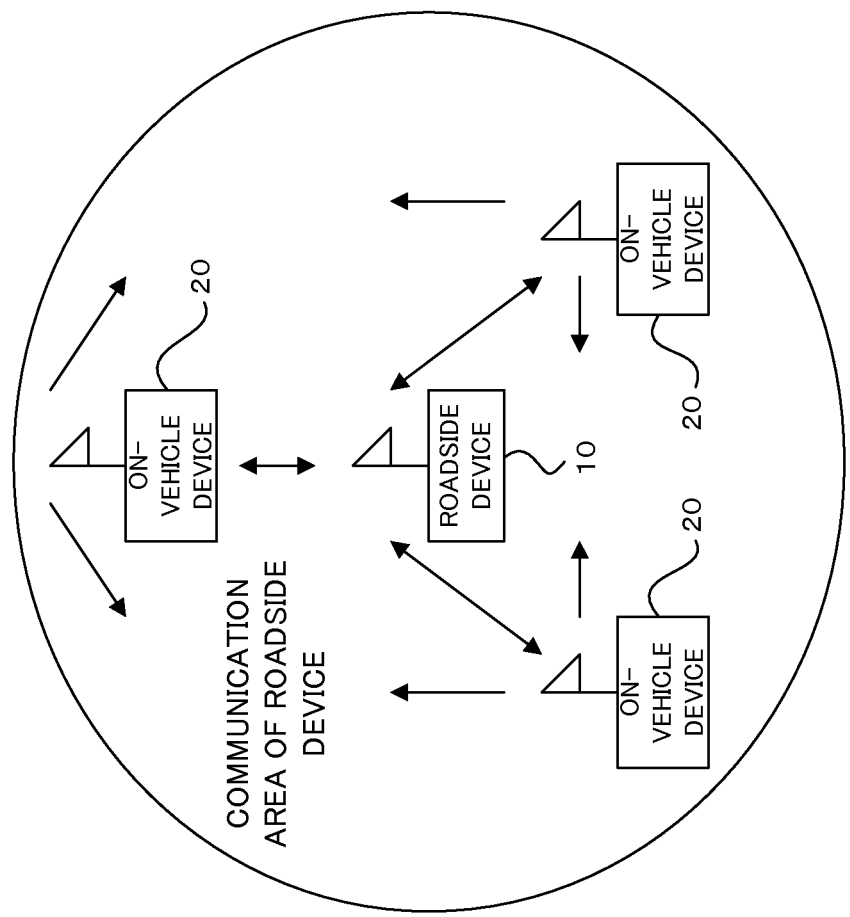
FIG. 21 is a block diagram illustrating a configuration of an ITS as a wireless communication system according to a second embodiment.

FIG. 21 is a block diagram illustrating a configuration of an ITS as a wireless communication system according to the second embodiment. The system depicted in FIG. 21 includes a roadside device (BS) 10, and a plurality of (three in FIG. 21) on-vehicle devices (MS) 20 that are located within the communication area of the roadside device 10 and are capable of communicating with the roadside device 10. Each of the on-vehicle devices 20 is capable of executing roadside-vehicle communication with the roadside device 10 and inter-vehicle communications with other on-vehicle devices 20 using a wireless resource (communication domain) allocated by the roadside device 10. That is, the roadside device 10 manages, in the centralized manner, wireless resources used for roadside-vehicle communications with the respective on-vehicle devices 20 and inter-vehicle communications between the on-vehicle devices 20. In FIG. 21, the roadside-vehicle communications are shown as bi-directional individual communications, and the inter-vehicle communications are shown as unidirectional broadcast-type communications.

Figure 22:
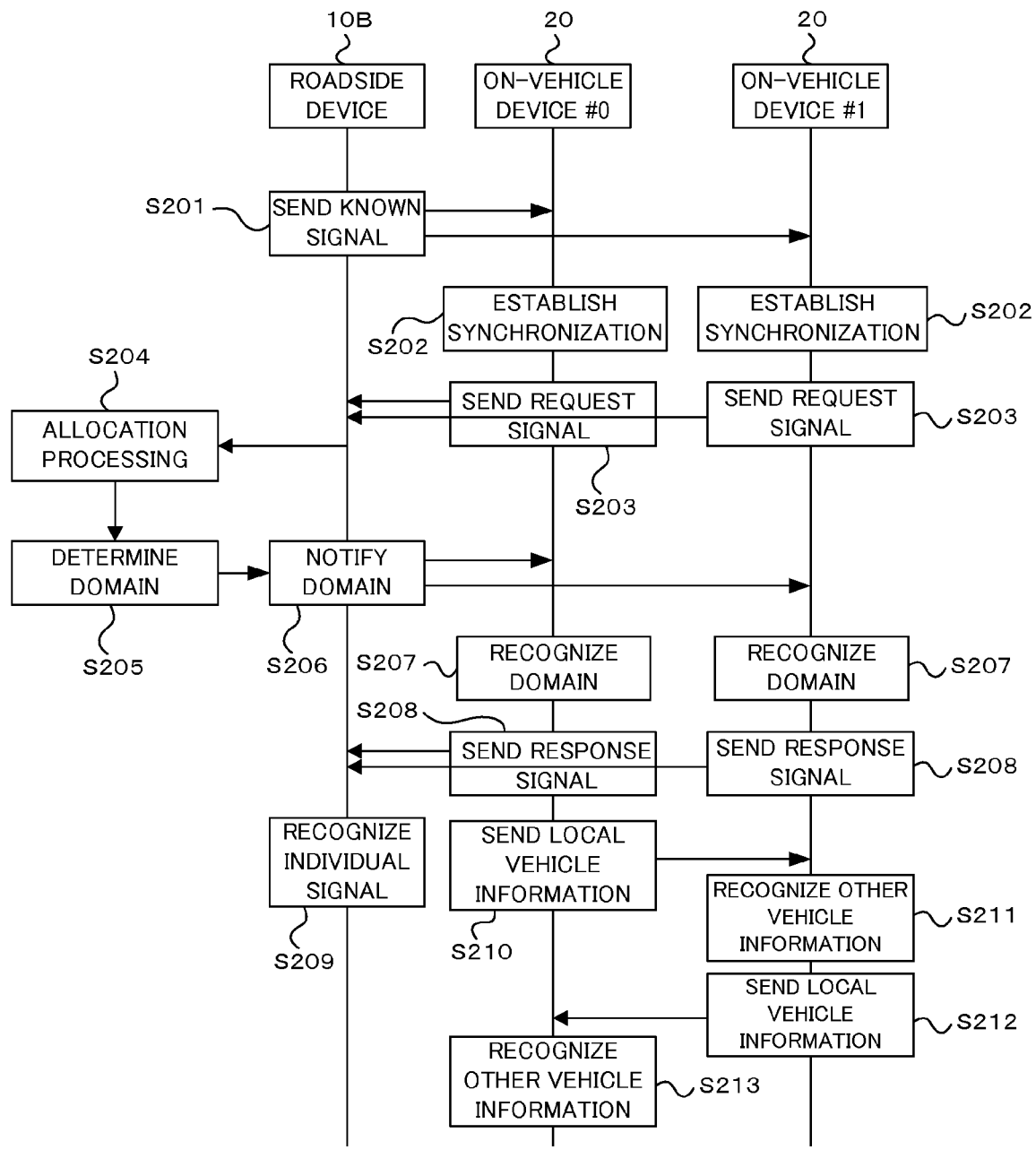
FIG. 22 is a sequence diagram of a generalized illustration of roadside-vehicle communication and inter-vehicle communication in the ITS depicted in FIG. 21.

One example of a communication sequence of roadside-vehicle communication and inter-vehicle communication in this system is depicted in FIG. 22. As depicted in FIG. 22, the roadside device 10 sends (broadcasts) a known signal, such as a pilot signal and a preamble signal, to each of the on-vehicle devices 20 (Step S201) in the communication area thereof, and each of the on-vehicle devices 20 establishes synchronization by detecting reception of the known signal (Step S202).

Once synchronization is established, each of the on-vehicle devices 20 sends a request signal requesting allocation of a wireless resource (communication domain) to be used for roadside-vehicle communication and inter-vehicle communication to the roadside device 10 in a certain communication domain (Step S203). Such a wireless resource includes a communication domain (burst) defined by the frequency (subchannel frequency) and time (symbol time) for the OFDMA scheme, or a channelization code for the CDMA scheme, or time (time slot) for the TDMA scheme, or a frequency (channel) for the FDMA scheme.

Upon receiving the request signal, the roadside device 10 determines a wireless resource to be allocated for downlink and UL roadside-vehicle communication with an on-vehicle device 20 and a wireless resource to be allocated for inter-vehicle communication (Steps S204 and S205), and notifies (broadcasts) the on-vehicle devices 20 of allocation information of the wireless resources using the wireless resource allocate for the DL roadside-vehicle communication (Step S206).

By receiving this notification, the on-vehicle device 20 is informed of the wireless resource to be used for the uplink and DL roadside-vehicle communication and the wireless resource to be used for the inter-vehicle communication (the wireless resource used by the local on-vehicle device 20 for transmission and the wireless resource used by other on-vehicle devices 20 for transmission) (Step S207), and notify the roadside device 10 of it by means of a response signal (Step S208).

Then, when there is a signal directed only to one of on-vehicle device 20, the roadside device 10 sends the signal to that on-vehicle device 20 using the wireless resource allocated for the DL roadside-vehicle communication (Step S209). Irrespective of this, each of the on-vehicle devices 20 exchanges information on the particular local on-vehicle device 20 (vehicle information) using the identified wireless resource for inter-vehicle communication (Steps S210 and S212), thereby identifying vehicle information of other on-vehicle devices 20 by receiving vehicle information from other on-vehicle devices 20 (Steps S211 and S213).

In this manner, since the roadside device 10 manages, in the centralized manner, wireless resources (communication domains) allocated for both roadside-vehicle communication and inter-vehicle communication, it is ensured that collision in communication among the on-vehicle devices 20 (above-described "hidden terminal problem"), as well as collision in roadside-vehicle communication, is avoided. Accordingly, an ITS system that can foresee risks of head-on collisions, right turn collisions or the like, which may be communicated to the driver can be achieved by ensuing that information on the locations, the traveling directions, the speeds, or the like of vehicles are exchanged via inter-vehicle communications.

(B1) OFDMA Scheme-Based

Figure 23:
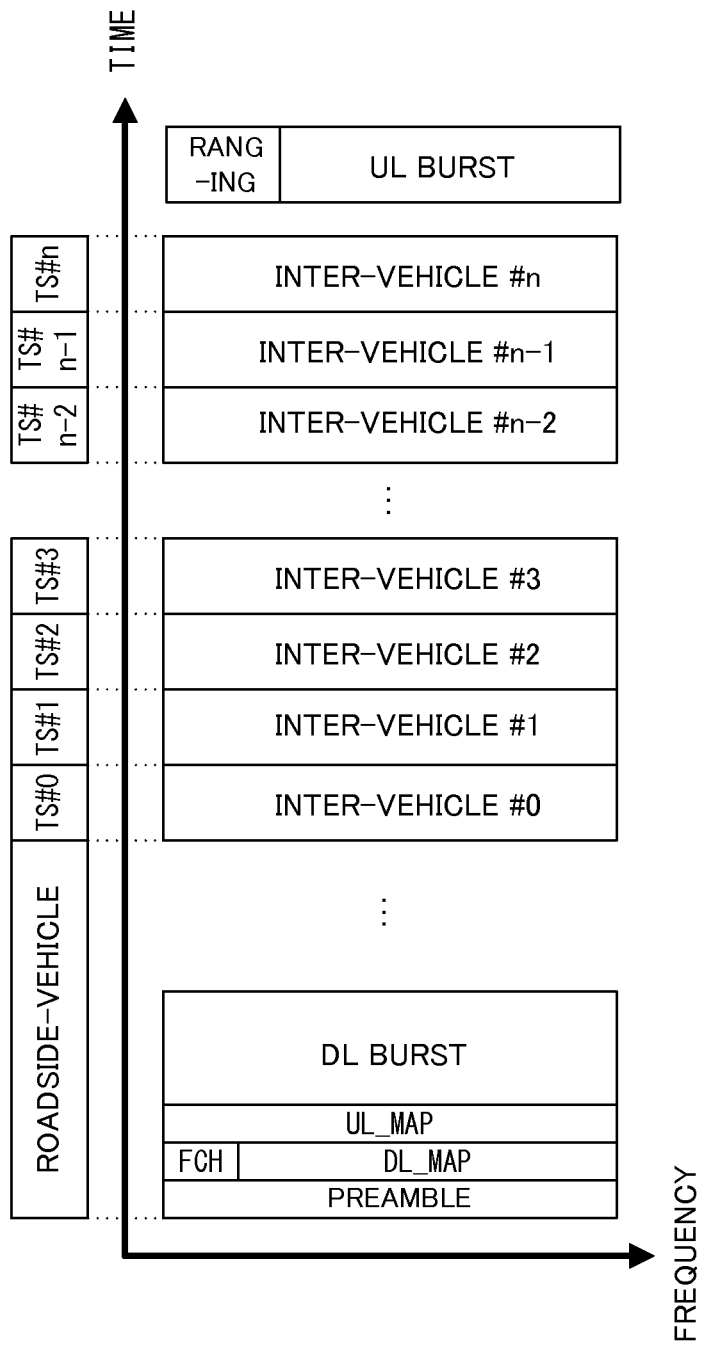
FIG. 23 is a diagram illustrating one example of a wireless frame format used in roadside-vehicle communication and inter-vehicle communication when the ITS depicted in FIG. 21 is embodied by an OFDMA system.

One example of a wireless frame format used for roadside-vehicle communication and inter-vehicle communication in the above ITS is depicted in FIG. 23. The wireless frame depicted in FIG. 23 has the same format as that of above-described wireless frame compliant with the WiMAX standard (OFDMA frame) illustrated in FIG. 4, wherein a domain which are used for each of roadside-vehicle communication and inter-vehicle communication, i.e., a burst (wireless resource) defined by time (symbol time) and frequency (subchannel frequency) is divided in the time (symbol time) direction.

Hereinafter, functions required for the roadside device 10 and the on-vehicle devices 20 in the wireless communication system based on this wireless frame format compliant with the OFDMA will be described.

Figure 24:
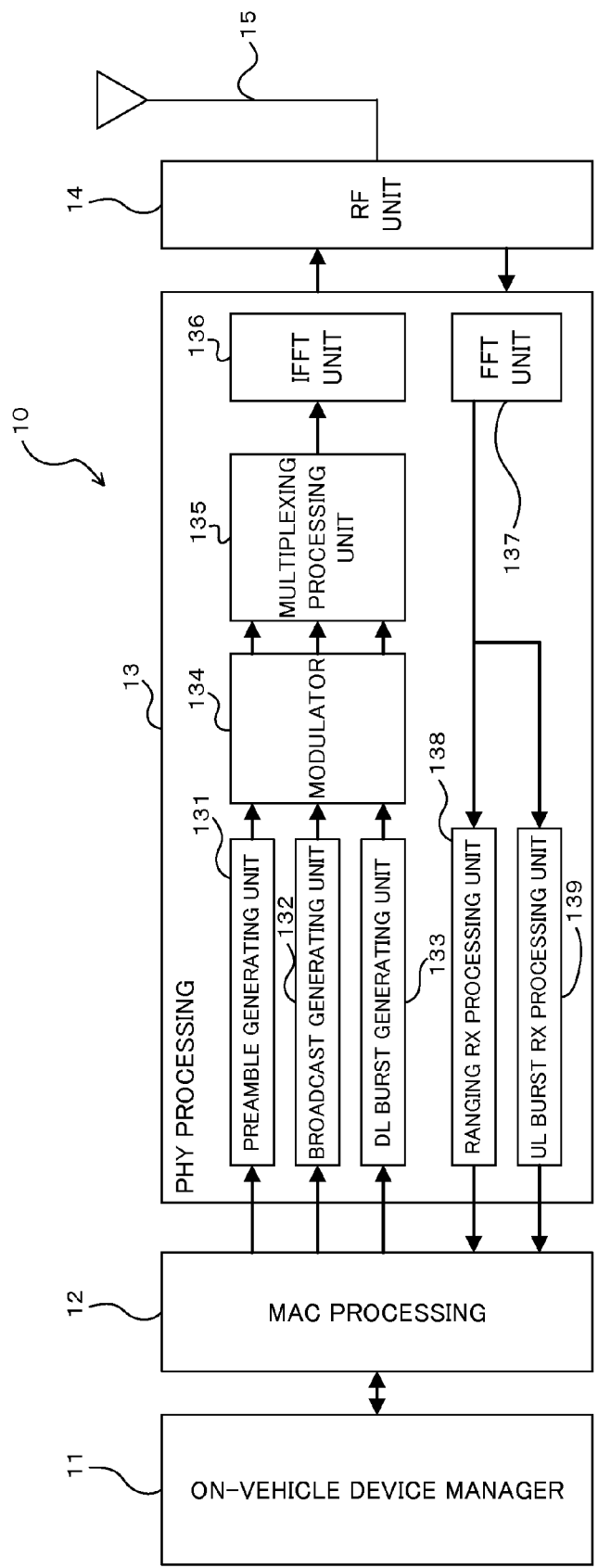
FIG. 24 is a block diagram illustrating a detailed configuration of the roadside device when the wireless frame depicted in FIG. 23 is used.
Figure 25:
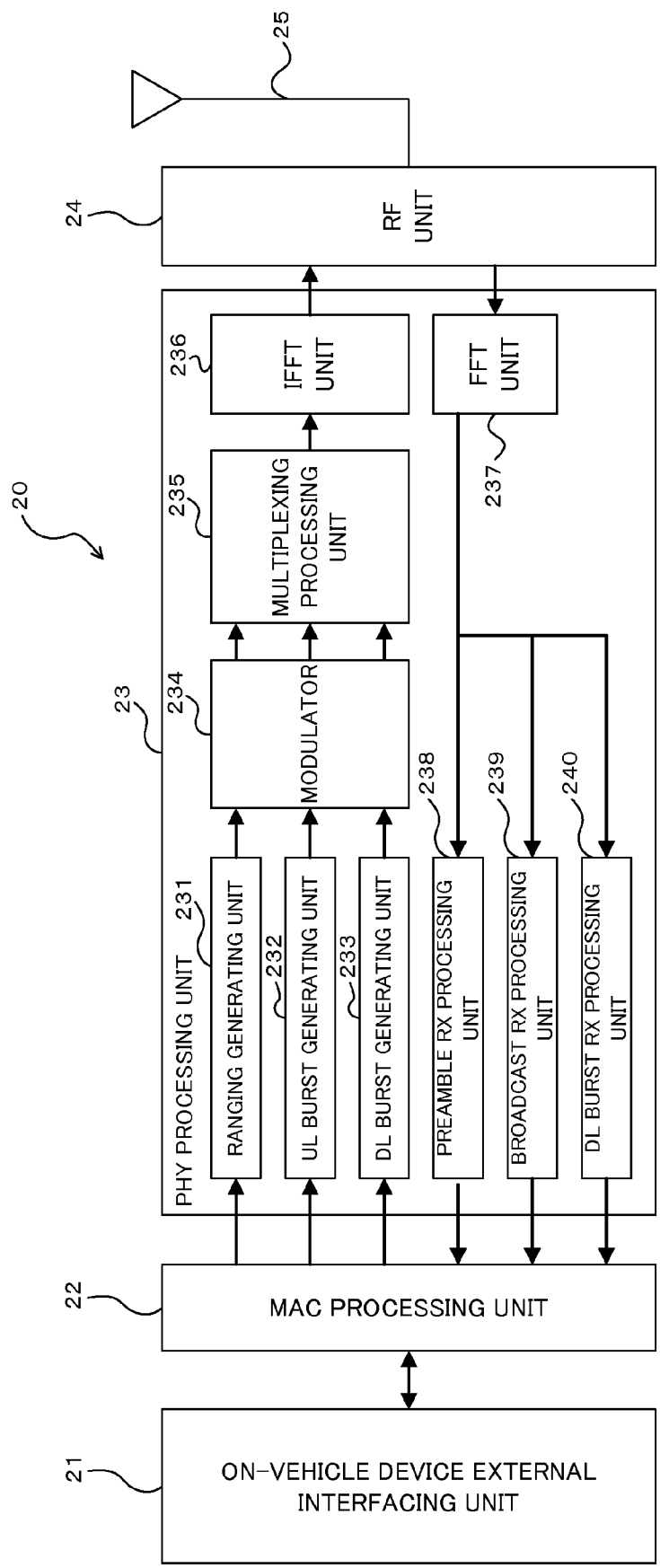
FIG. 25 is a block diagram illustrating a detailed configuration of the on-vehicle device when the wireless frame depicted in FIG. 23 is used.

FIG. 24 is a functional block focusing on the configuration of the main portion of the roadside device 10. FIG. 25 is a functional block focusing on the configuration of the main portion of an on-vehicle device 20.

Configuration of Roadside Device

In the second embodiment, the roadside device 10 depicted in FIG. 24 has the same configuration as that depicted in FIG. 6, and includes, for example, an on-vehicle device managing unit 11, a MAC processing unit 12, a physical layer (PHY) processing unit 13, a radio frequency (RF) unit 14, and an antenna 15. A GPS antenna 16 and a GPS receiver 17 are omitted from the illustration.

More specifically, the on-vehicle device managing unit 11 includes, for example, a connection interface function with an upper network, a function that tracks the presences (locations) of on-vehicle devices, and a function that determines whether an on-vehicle device 20 utilizes which communication domain (wireless resource) within a wireless frame and notifies the MAC processing unit 12 of it.

The MAC processing unit 12 includes a signal processing function in a MAC layer compliant with the WiMAX standard, and includes, for example, a function that recognizes an on-vehicle device 20 based on a ranging signal, which is the request signal, and notifies the on-vehicle device processing unit 11 of the on-vehicle device 20, and a function that executes MAC processing compliant with the WiMAX standard on the information from the on-vehicle device processing unit 11.

That is, in this example, the on-vehicle device processing unit 11 and MAC processing unit 12 also functions as wireless resource allocating means that allocates a roadside-vehicle communication domain (roadside-vehicle resource) and an inter-vehicle communication domain (inter-vehicle resource) to the on-vehicle device 20 in response to receiving an allocation request (ranging signal) for a wireless resource (communication domain) from the on-vehicle device 20.

The physical layer processing unit 23 includes a signal processing function in a physical layer compliant with the WiMAX standard, and includes, for example, as transmission functions, a preamble generating unit 131, a broadcast generating unit 132, a DL burst generating unit 133, a modulating unit 134, a multiplexing processing unit 135, and an IFFT unit 136, and includes, as reception functions, an FFT unit 137, a ranging reception processing unit 138, and a UL burst reception processing unit 139.

Here, in the transmission functions, the preamble generating unit 131 includes a function that generates a preamble signal that is to be sent in the first domain in the wireless frame of the OFDMA. The broadcast generating unit 132 includes a function that generates a broadcast signal, such as a DL_MAP, a UL_MAP and a frame control header (FCH), in accordance with the direction by the MAC processing unit 12. The DL burst generating unit 133 includes a function that generates DL bursts from MAC-processed transmission data.

Furthermore, the modulating unit 134 includes a function that modulates a signal from the generating unit 131, 132, and 133 using the modulation scheme, such as QPSK, 16QAM, or 64 QAM, etc. specified by the MAC processing unit 12. The multiplexing processing unit 135 multiplexes the modulated signal from the modulating unit 134 into a transmission domain for the roadside-vehicle communication (orthogonal frequency multiplexing) defined by frequency (subchannel frequency) and time (symbol time). The IFFT unit 136 converts the multiplexed signal from the multiplexing processing unit 135 into a time domain signal by executing IFFT processing.

On the other hand, in the reception functions, the FFT unit 137 executes FFT processing on a baseband signal from the RF unit 14 into a frequency domain signal. The ranging reception processing unit 138 includes a function that identifies a ranging signal component from an on-vehicle device 20, in frequency domain signals from the FFT unit 137 to establish UL synchronization with that on-vehicle device 20. The UL burst reception processing unit 139 includes a function that identifies a UL burst component of the UL roadside-vehicle communication domain specified in the UL_MAP (UL burst) from the frequency domain signal from the FFT unit 137 after establishing synchronization by the ranging reception processing unit 138, and processes reception.

The RF unit 14 includes a transmission function that performs predetermined radio frequency transmission processing on a signal (digital baseband signal) from the physical layer processing unit 13 (the IFFT unit 136), including D/A conversion or frequency conversion into an RF signal (upconversion), amplification to a desired transmission power, and sends the processed signal to on-vehicle device 20 from the antenna 15, and a function that executes predetermined radio frequency reception processing on an RF signal from the on-vehicle device 20 received at that antenna 15, including low-noise amplification, frequency conversion into a baseband signal (downconversion), and A/D conversion, and outputs the processed signal to the physical layer processing unit 23 (the FFT unit 237).

More specifically, the physical layer processing unit 13 and the RF unit 14 described above functions as transmission means that sends allocation information of the wireless resources (roadside-vehicle communication domain and inter-vehicle communication domain) allocated by the on-vehicle device managing unit 11 and the MAC processing unit 12 to the on-vehicle devices 20 using a broadcast signal (UL/DL_MAP).

Configuration of On-Vehicle Device

On the other hand, the roadside device 20 depicted in FIG. 25 has the same configuration as that depicted in FIG. 7, and includes, for example, an on-vehicle device external interfacing unit 21, a MAC processing unit 22, a physical layer (PHY) processing unit 23, an RF unit 24, and an antenna 15.

More specifically, the on-vehicle device external interfacing unit 21 includes a function that receives vehicle information, such as speed information, in the case of vehicle (on-vehicle device), but the information may vary dependent on where the mobile terminal is mounted, such as a pedestrian or a vehicle, from the outside of the on-vehicle device or the like, and provides it to the MAC processing unit 22, and a function that notifies the outside of the on-vehicle device (i.e., on-vehicle appliances such as a car-navigation system) of the vehicle information on the other vehicles provided by the MAC processing unit 22.

The MAC processing unit 22 includes a signal processing function in a MAC layer compliant with the WiMAX standard. Also in this example, the MAC processing unit 22 includes, for example, a function that recognizes a communication (transmission/reception) domain of the local on-vehicle device from a broadcast signal, and notifies the physical layer processing unit 23 of it, a function that processes transmission of a signal (local vehicle information) that has been MAC-processed for inter-vehicle communication, and a function that recognizes transmission domains (TSs) allocated to other on-vehicle devices for inter-vehicle communication based on the DL_MAP received from the roadside device.

The physical layer processing unit 23 includes a signal processing function in a physical layer compliant with the WiMAX standard, and includes, as depicted in FIG. 25, for example, as transmission function, a ranging generating unit 231, a UL burst generating unit 232, a DL burst generating unit 233, a modulating unit 234, a multiplexing processing unit 235, and an IFFT unit 236, and includes, as reception functions, for example, an FFT unit 237, a preamble reception processing unit 238, a broadcast reception processing unit 239, and a DL burst reception processing unit 240.

Here, in the transmission functions, the ranging generating unit 231 includes a function that generates a ranging signal that is a request to the wide-area roadside device 10. The UL burst generating unit 232 includes a function that generates UL bursts containing MAC-processed transmission information for roadside-vehicle communication. The DL burst generating unit 233 includes a function that generates DL bursts containing MAC-processed transmission information for inter-vehicle communication (local vehicle information).

The modulating unit 234 includes a function that modulates a signal from the generating units using the modulation scheme (e.g., QPSK, 16QAM, or 64QAM), according to the direction from the MAC processing unit 22, the multiplexing processing unit 235 multiplexes the modulated signal from the modulating unit 234 into a transmission domain allocated by the roadside device 10 (the transmission domain for the roadside-vehicle communication (UL burst) and the transmission domain for the inter-vehicle communication (TS)) (orthogonal frequency multiplexing), and the IFFT unit 237 converts multiplexed signals from the multiplexing processing unit 235 into time domain signals by executing IFFT processing.

In contrast, in the reception function, the FFT unit 237 converts a baseband signal from the RF unit 24 into a frequency domain signal by executing FFT processing. The preamble reception processing unit 238 includes a function that identifies a preamble signal component from the frequency domain signal from the FFT unit 237 to establish synchronization of wireless frames.

Furthermore, the broadcast reception processing unit 239 includes a function that identifies a broadcast signal component from the frequency domain signal from the FFT unit 237 for reception processing after establishing synchronization by the preamble reception processing unit 238. The DL burst reception processing unit 240 includes a function that identifies a DL burst component specified in the DL_MAP (the reception domain for roadside-vehicle communication (DL burst) and the reception domain for inter-vehicle communications with other on-vehicle devices 20 (TS)) from the frequency domain signal from the FFT unit 237 for reception processing after establishing synchronization.

The RF unit 24 includes a transmission function that performs predetermined radio frequency transmission processing on a signal (digital baseband signal) from the physical layer processing unit 23 (the IFFT unit 236), including D/A conversion or frequency conversion into an RF signal (upconversion), amplification to a desired transmission power, and sends the processed signal to the roadside device 10 or other on-vehicle devices 20 from the antenna 25, and a function that executes predetermined radio frequency reception processing on an RF signal from the roadside device 10 or other on-vehicle devices 20 received at that antenna 25, including low-noise amplification, frequency conversion into a baseband signal (downconversion), and A/D conversion, and outputs the processed signal to the physical layer processing unit 23 (the FFT unit 237).

That is, the RF unit 24 and the physical layer processing unit 23 described above functions as allocation information reception means that receives a broadcast signal containing allocation information on a wireless resource for roadside-vehicle communication (roadside-vehicle resource) and a wireless resource for inter-vehicle communication (inter-vehicle resource) that have been allocated by the roadside device 10 in response to the allocation request (ranging signal). The MAC processing unit 22 includes, a function as communication control means that carries out roadside-vehicle communication with the roadside device 10 using the roadside-vehicle resource identified with the allocation information and carries out inter-vehicle communications with other on-vehicle devices 20 using the inter-vehicle resource identified with the allocation information.

Operations of Roadside-Vehicle Communication and Inter-Vehicle Communication

Figure 26:
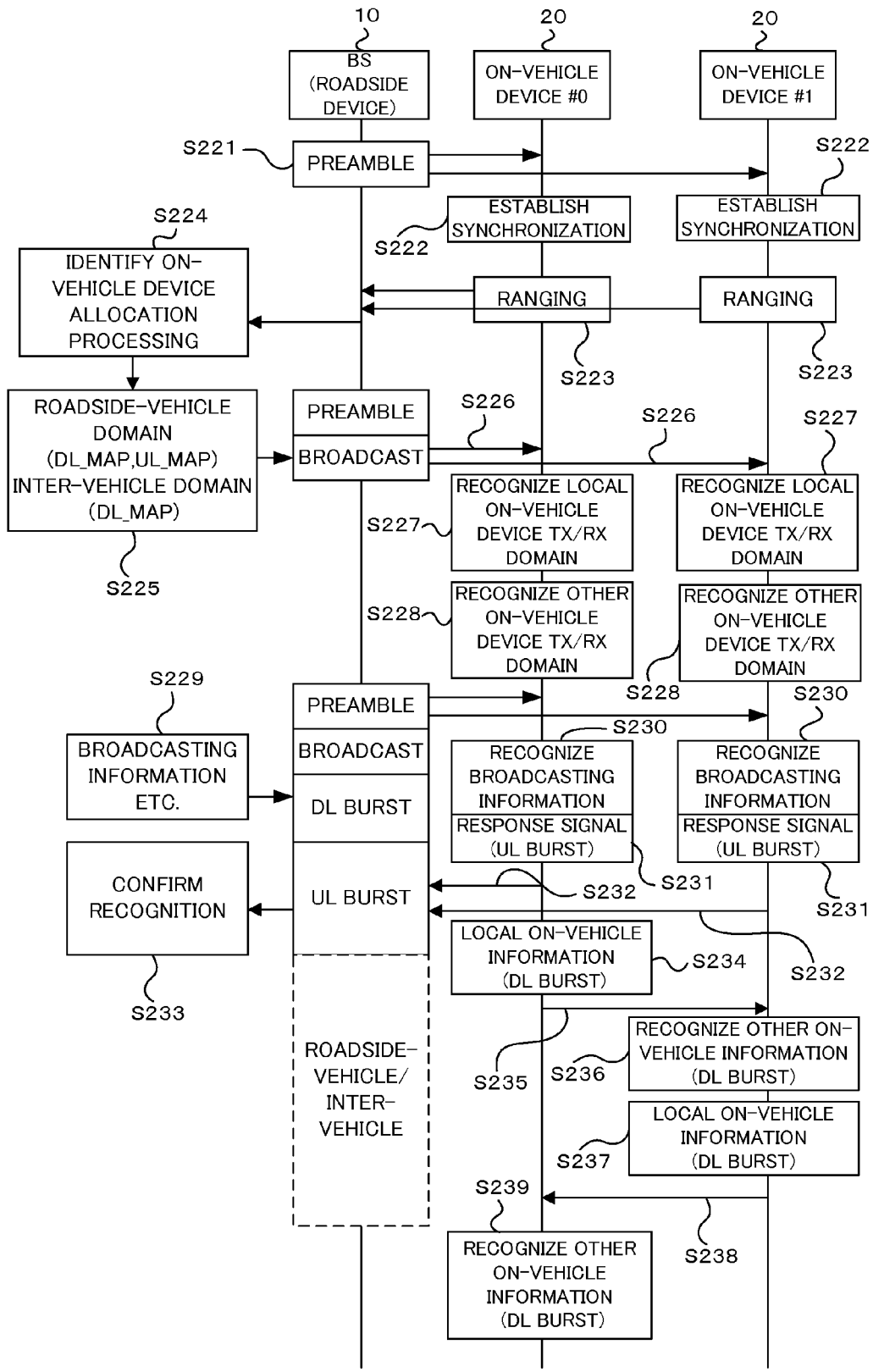
FIG. 26 is a sequence diagram illustrating roadside-vehicle communication and inter-vehicle communication in the ITS that uses the wireless frame depicted in FIG. 23.

Hereinafter, operations of roadside-vehicle communication and inter-vehicle communication in the wireless communication system of this embodiment that is configured as described above will be described with reference to the sequence diagram depicted in FIG. 26.

More specifically, the roadside device 10 sends a preamble signal in the wireless frame format depicted in FIG. 23 at regular time intervals (Step S221). In response to receiving this preamble signal, the on-vehicle devices 20 establish synchronization of a wireless frame at the timing of the reception (Step S222). Once synchronization is established, the on-vehicle devices 20 send ranging signals to the roadside device 10 in the predetermined transmission domains (ranging domains) (Step S223).

The roadside device 10 recognizes the on-vehicle devices 20 by receiving the ranging signals, and executes allocation processing of UL and DL communication domains for roadside-vehicle communication and a communication domain for inter-vehicle communication (TS) (Step S224), and notifies about the allocated communication domains in a broadcast signal (a DL_MAP and a UL_MAP for the roadside-vehicle communication domains, and a DL_MAP for the inter-vehicle communication domain) (Steps S225 and S226).

Each on-vehicle device 20 can identify the roadside-vehicle communication domain, the inter-vehicle communication domain allocated for that on-vehicle device 20 (local on-vehicle device transmission domain) and the inter-vehicle communication domains allocated for other on-vehicle devices 20 (other on-vehicle device transmission domains) upon receiving the broadcast signal (Steps S227 and and S228).

Thereafter, if the roadside device 10 desires to send any notification information to the on-vehicle devices 20, the roadside device 10 sends the information using the allocated DL burst (Step S229). The on-vehicle devices 20 recognize the notification information by receiving the DL burst (Step S230). Then, each on-vehicle device 20 generates a response signal, and sends it to the roadside device 10 in the allocated UL burst (Steps S231 and S232), and the roadside device 10 can confirm that the allocations of the domains for the roadside-vehicle communication and the inter-vehicle communication are successfully performed when the roadside device 10 receives the UL burst (Step S233).

Then, each on-vehicle device 20 generates local vehicle information where necessary (Steps S234 and S237), and sends the local vehicle information using identified (allocated) local on-vehicle device transmission domain (TS) (Steps S235 and S238). Furthermore, each of the on-vehicle devices 20, for inter-vehicle communication domains (TS) other than the transmission domain (TSs) of local on-vehicle device, receives and recognizes vehicle information sent by other on-vehicle devices 20 by receiving only other on-vehicle device transmission domains (TSs) notified in this broadcast signal or receiving all of other on-vehicle device transmission domains (TSs) all the time (Step S236 and S239).

As described above, in this example, since the roadside device 10 allocates, in the centralized manner, wireless resources for roadside-vehicle communications (roadside-vehicle communication domains) and wireless resources for inter-vehicle communications (inter-vehicle communication domains) based on the OFDMA scheme, and on-vehicle devices 20, in turn, communicate with the roadside device 10 and other on-vehicle devices 20 according to the allocation, roadside-vehicle communications and inter-vehicle communications can be achieved with higher spectrum efficiency while avoiding the hidden terminal problem, thereby obtaining the same effects or advantages as those of the first embodiment.

(B2) CDMA Scheme-Based

Figure 27:
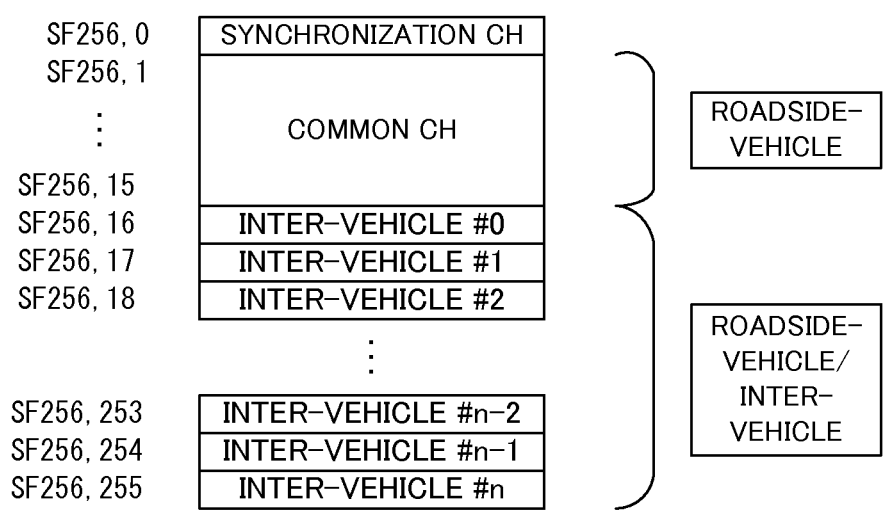
FIG. 27 is a diagram illustrating one example of a wireless frame format used in roadside-vehicle communication and inter-vehicle communication when the ITS depicted in FIG. 21 is embodied by a CDMA system.

The above-described wireless communication system can be embodied based on the CDMA scheme. In this case, the allocation of wireless resources for roadside-vehicle communication and inter-vehicle communication is carried out according to code division multiplexing compliant with the CDMA standard. More specifically, for example, as depicted in FIG. 27, when the spreading factor (SF) is 256 and the number of multiplexing code is 256, channelization code (sometimes, hereinafter, simply referred to as "code") #0 is allocated for the synchronous channel (perch channel), and codes #1-#15 are allocated for the common channels for roadside-vehicle communications, and codes #16-#255 are allocated as dedicated channels for roadside-vehicle and inter-vehicle communications.

Figure 28:
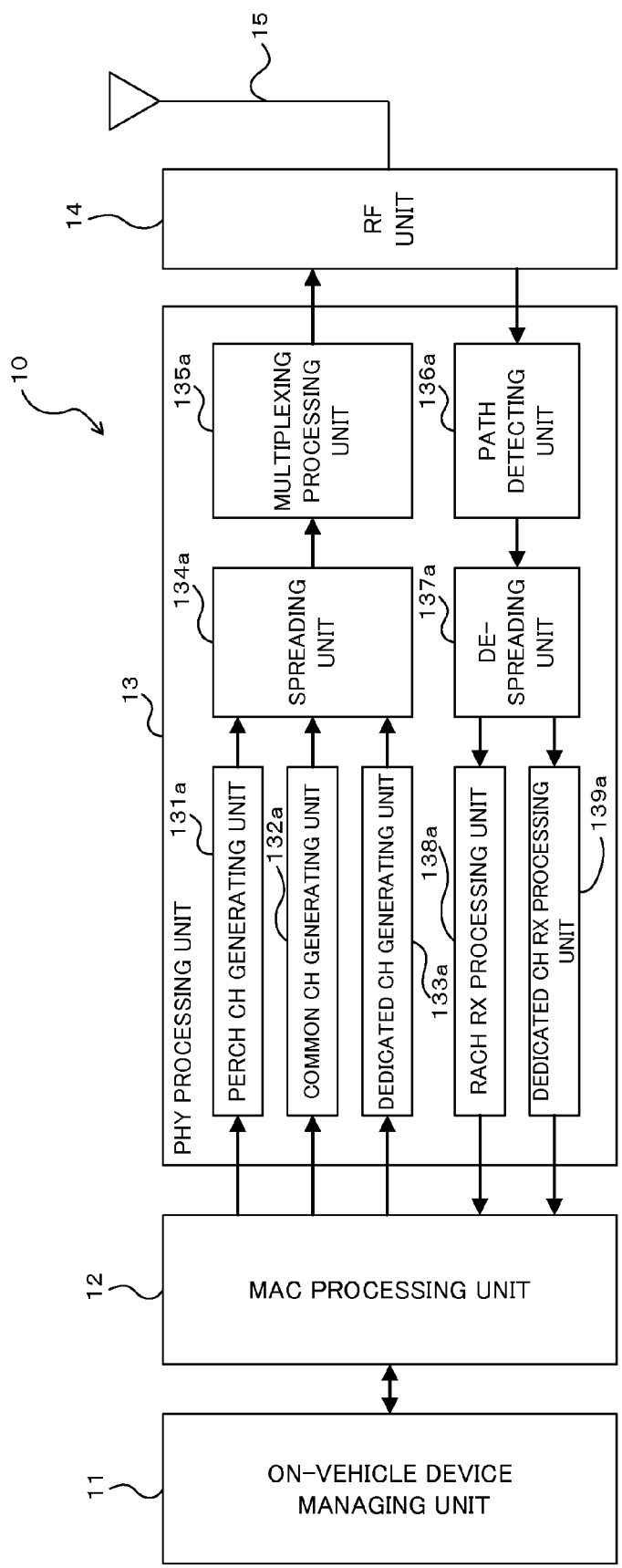
FIG. 28 is a block diagram illustrating a detailed configuration of the roadside device when the wireless frame depicted in FIG. 27 is used.
Figure 29:
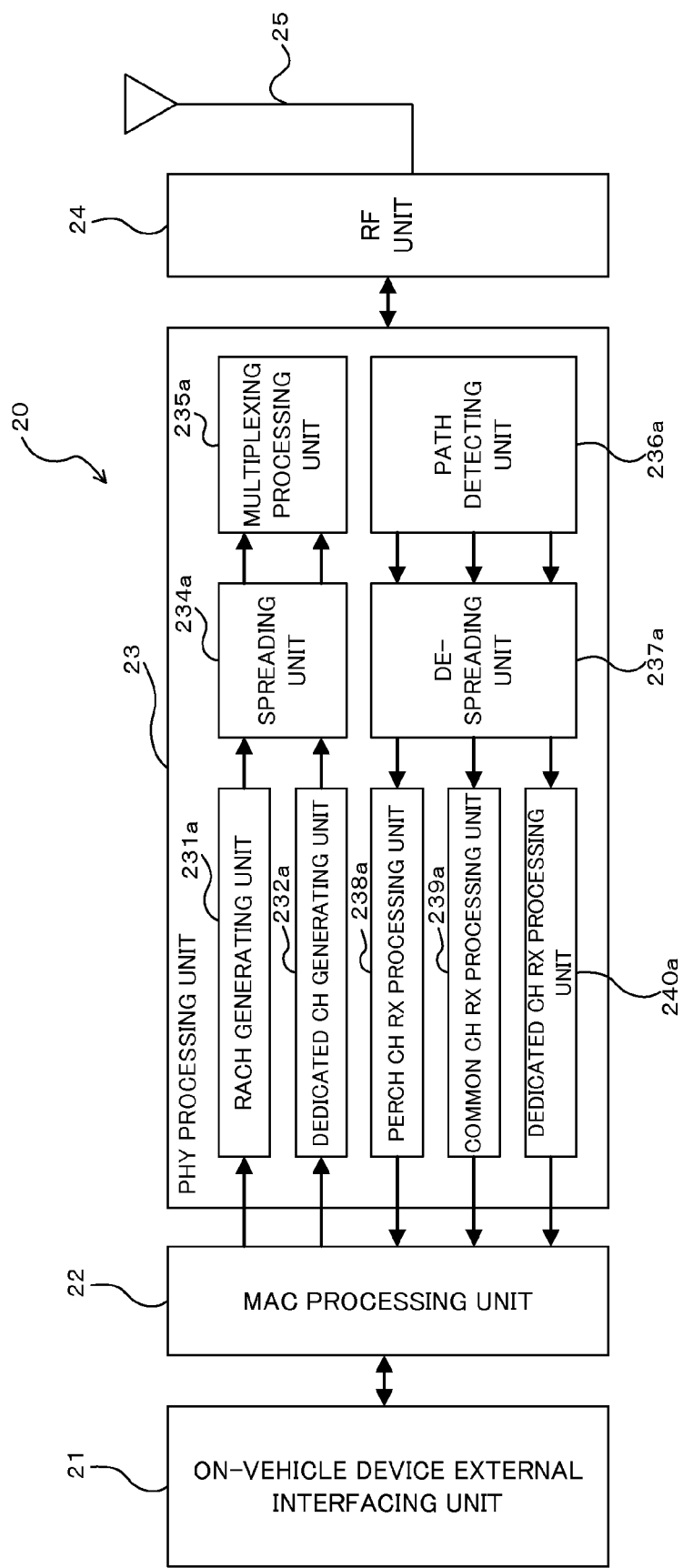
FIG. 29 is a block diagram illustrating a detailed configuration of the on-vehicle device when the wireless frame depicted in FIG. 27 is used.

The configurations of the main portion of the roadside device 10 and the on-vehicle device 20 of this example are depicted in FIGS. 28 and 29, respectively.

Configuration of Roadside Device

The roadside device 10 depicted in FIG. 28 also includes, for example, an on-vehicle device managing unit 11, a MAC processing unit 12, a physical layer (PHY) processing unit 13, an RF unit 14, and an antenna 15.

Here, the on-vehicle device managing unit 11 of this example includes a connection interface function with an upper network, a function that tracks the presence of on-vehicle devices 20, and a function that determines the code #i (i=0 to 255) to be used by the on-vehicle device 20 and notifies the MAC processing unit 13 of it.

The MAC processing unit 12 includes a signal processing function in a MAC layer compliant with the CDMA standard, and includes, for example, a function that identifies an on-vehicle device 20 based on a preamble signal of the random access channel (RACH), and notifies the on-vehicle device processing unit 11 of the on-vehicle device 20, and a function that executes MAC processing compliant with the CDMA standard on the information from the on-vehicle device processing unit 11.

More specifically, the on-vehicle device managing unit 11 and MAC processing unit 12 functions as wireless resource allocating means that allocates a wireless resource (code) for roadside-vehicle communication and a wireless resource (code) for inter-vehicle communication to the on-vehicle device 20 in response to receiving an allocation request (RACH signal) of wireless resource (code) from the on-vehicle device 20.

The physical layer processing unit 13 includes a signal processing function in a physical layer compliant with the CDMA standard, and includes, as transmission functions, a perch channel generating unit 131a, a common channel generating unit 132a, an dedicated physical channel generating unit 133a, a spreading unit 134a, and a multiplexing processing unit 135a, and includes, as reception functions, a path detecting unit 136a, a de-spreading unit 137a, a RACH reception processing unit 138a, and a dedicated physical channel reception processing unit 139a.

The perch channel generating unit 131a includes a function that generates a downlink signal (known signal), such as a signal of perch (synchronization) channel (SCH: Synchronization Channel) used for frames in accordance with the direction by the MAC processing unit 12 (slot synchronization), or a signal for the common pilot channel (CPICH) which is the phase reference for channel estimation processing.

The common channel generating unit 132a includes a function that generates a signal of a common channel (for example, a control channel, such as primary common control physical channel (P-CCPCH), secondary common control physical channel (S-CCPCH)) used to notify the on-vehicle device 20 of the code number or the like for inter-vehicle communication in accordance with the direction by the MAC processing unit 12. The dedicated physical channel generating unit 133a includes a function that generates a signal of the dedicated physical channel (DPCH) including transmission data that is MAC-processed at the MAC processing unit 12.

The spreading unit 134a includes a function that modulates (IQ mapping) the signals generated by the above-described generating unit 131a, 132a, or 133a using a predetermined modulation scheme, such as QPSK or 16QAM according to the direction from the MAC processing unit 12, and executes spreading processing wherein a signal in each channel is spread using the code #i corresponding to that channel, as depicted in FIG. 27.

The multiplexing processing unit 135a includes a function that multiplexes signals from the spreading unit 134a (i.e., code division multiplexing).

On the other hand, in the reception functions, the path detecting unit 136a includes a function that detects path timing (i.e., path searching) by carrying out correlation computation on signals received from the RF unit 14, especially pilot signals (baseband signals) using a matched filter or the like.

The de-spreading unit 137a demodulates received signals (baseband signals on the RACH or the dedicated physical channel) using the corresponding code #i by executing de-spreading processing at the path timing detected by the path detecting unit 136a.

The RACH reception processing unit 138a executes synchronization establishing processing by identifying an RACH signal (code allocation request) from the de-spread result provided by the de-spreading unit 137a to identify the on-vehicle device 20. The dedicated physical channel reception processing unit 139a executes reception processing of signals on the dedicated physical channel from the de-spreading results of the received signals after establishing synchronization.

The RF unit 14 includes a transmission function that performs predetermined radio frequency transmission processing on a signal (digital baseband signal) from the physical layer processing unit 13 (the multiplexing processing unit 135a), including D/A conversion or frequency conversion into an RF signal (upconversion), amplification to a desired transmission power, and sends the processed signal to on-vehicle device 20 from the antenna 15, and a function that executes predetermined radio frequency reception processing on an RF signal from the on-vehicle device 20 received at that antenna 15, including low-noise amplification, frequency conversion into a baseband signal (downconversion), and A/D conversion, and outputs the processed signal to the physical layer processing unit 13 (the path detecting unit 136a).

More specifically, the physical layer processing unit 13 and the RF unit 14 described above functions as transmission means that sends allocation information of the wireless resources (code for roadside-vehicle communication and code for inter-vehicle communication) allocated by the on-vehicle device managing unit 11 and the MAC processing unit 12 to the on-vehicle devices 20 using signals on the common channel.

Configuration of On-Vehicle Device

On the other hand, the roadside device depicted in FIG. 29 includes, for example, an on-vehicle device external interfacing unit 21, a MAC processing unit 22, a physical layer processing unit 23, an RF unit 24, and an antenna 25.

More specifically, the on-vehicle device external interfacing unit 21 includes a function that receives vehicle information, such as speed information, in the case of vehicle (on-vehicle device), but the information may vary dependent on where the mobile terminal is mounted, such as a pedestrian or a vehicle, from the outside of the on-vehicle device or the like, and provides it to the MAC processing unit 22, and a function that notifies the outside of the on-vehicle device 20 (i.e., on-vehicle appliances such as a car-navigation system) of the vehicle information on the other on-vehicle devices 20 notified by the MAC processing unit 22.

The MAC processing unit 22 includes a signal processing function in a MAC layer compliant with the CDMA standard, and, in this example, includes a function that identifies the code #i allocated for the local on-vehicle device, and the codes #j allocated for other on-vehicle devices 20 (j=0 to 255 and j≠i) and notifies the physical layer processing unit 23 of the codes.

The physical layer processing unit 23 includes a signal processing function in a physical layer compliant with the CDMA standard, and includes, as transmission functions, for example, a RACH generating unit 231a, a dedicated physical channel generating unit 232a, a spreading unit 234a, and a multiplexing processing unit 235a, and includes, as reception functions, a path detecting unit 236a, a de-spreading unit 237a, a perch channel reception processing unit 238a, a common channel reception processing unit 239a, and a dedicated physical channel reception processing unit 240a.

Here, in the transmission functions, the RACH generating unit 231a includes a function that generates a signal for RACH (code allocation request) according to the direction by the MAC processing unit 22. The dedicated physical channel generating unit 232a generates a signal for the dedicated physical channel (DPCH) including transmission data for inter-vehicle communication which is MAC-processed at the MAC processing unit 22. The spreading unit 234a includes a function that modulate signals generated by the above-described channel generating units 231a and 232a using the modulation scheme specified by the MAC processing unit, and executes spreading processing using the code #i allocated from the roadside device 10 to the local on-vehicle device 20. The multiplexing processing unit 235a includes a function that multiplexes a signal on each channel spread by the above-described spreading unit 234a (i.e., code division multiplexing).

On the other hand, in the reception functions, the path detecting unit 236a includes a function that detects path timing (i.e., path searching) by carrying out correlation computation on signals received from the RF unit 24, especially pilot signals (baseband signals of CPICH) using a matched filter or the like. The de-spreading unit 237a demodulates received signals (baseband signals on a common channel, such as P-CCPCH, S-CCPCH, or the RACH or the dedicated physical channel (DPCH)) using the corresponding code #i allocated to the local on-vehicle device 20 by executing de-spreading processing at the path timing detected by the path detecting unit 236a.

The perch channel reception processing unit 238a executes synchronization establishing processing by detecting signals on the perch channel from the de-spread result provided by the de-spreading unit 237a. The common channel reception processing unit 239a executes reception processing of signals on the common channel from the de-spreading results of the received signals after establishing synchronization. The dedicated physical channel reception processing unit 240a similarly executes reception processing of signals on the dedicated physical channel from the de-spreading results of the received signals after establishing synchronization.

The RF unit 24 includes a transmission function that performs predetermined radio frequency transmission processing on a signal (digital baseband signal) from the physical layer processing unit 23 (the multiplexing processing unit 235a), including D/A conversion or frequency conversion into an RF signal (upconversion), amplification to a desired transmission power, and sends the processed signal to the roadside device 10 or other on-vehicle devices 20 from the send/receive antenna, and a function that executes predetermined radio frequency reception processing on an RF signal from the roadside device 10 or other on-vehicle devices 20 received at that antenna 15, including low-noise amplification, frequency conversion into a baseband signal (downconversion), and A/D conversion, and outputs the processed signal to the physical layer processing unit 23 (the path detecting unit 236a).

That is, the RF unit 24 and the physical layer processing unit 23 described above functions as allocation information reception means that receives common channel signals containing allocation information on a wireless resource (code) for roadside-vehicle communication and a wireless resource (code) for inter-vehicle communication that have been allocated at the roadside device 10 in response to the code allocation request (RACH signal). The MAC processing unit 22 includes, a function as communication control means that carries out roadside-vehicle communication with the roadside device 10 using the code for the roadside-vehicle communication recognized with the allocation information and carries out inter-vehicle communications with other on-vehicle devices 20 using the code for the inter-vehicle communication recognized with the allocation information.

Operations of Roadside-Vehicle Communication and Inter-Vehicle Communication

Figure 30:
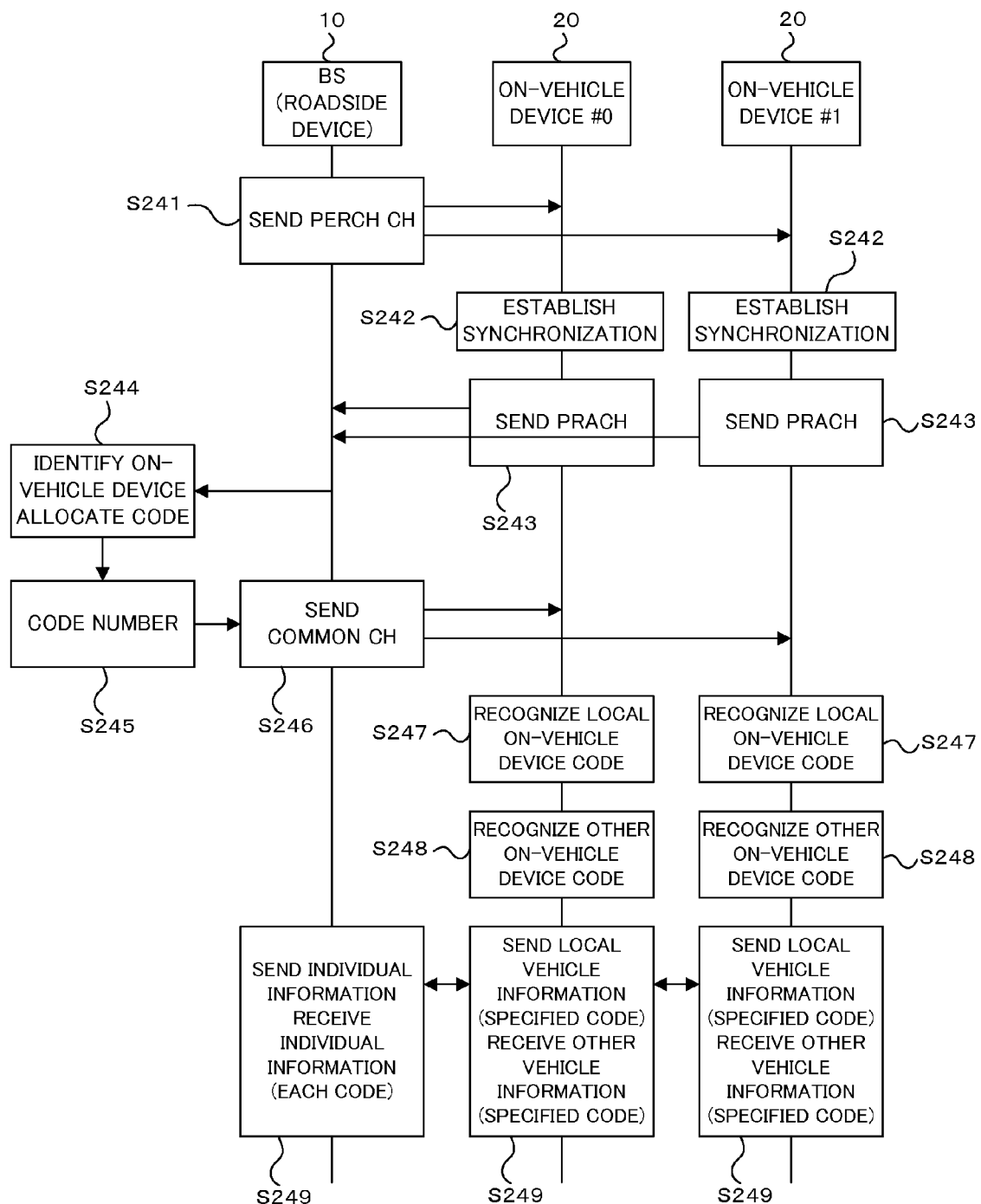
FIG. 30 is a sequence diagram illustrating roadside-vehicle communication and inter-vehicle communication in the ITS that uses the wireless frame depicted in FIG. 27.

Hereinafter, operations of roadside-vehicle communication and inter-vehicle communication in the wireless communication system of this embodiment that is configured as described above will be described with reference to the sequence diagram depicted in FIG. 30.

More specifically, the roadside device 10 sends a signal of the perch channel at regular time intervals (Step S241). The on-vehicle devices 20 receive this signal of the perch channel and establish synchronization of a wireless frame at the timing of the reception (Step S242). Once synchronization is established, the on-vehicle devices 20 send a signal on the PRACH (code allocation request) to the roadside device 10 (Step S243).

The roadside device 10 identifies the on-vehicle devices 20 by receiving the PRACH signal, executes allocation processing of codes #i for roadside-vehicle communication and inter-vehicle communication (Step S244), and notifies the allocated codes #i in a signal on the common channel (Steps S245 and S246).

Each on-vehicle device 20 can identify both the code #i for the local on-vehicle device 20 and the codes #j for the on-vehicle devices 20 by receiving the signal on the common channel (Steps S247 and S248).

After identifying codes #i and #j, each on-vehicle device 20 sends a response signal to the roadside device 10 via the common channel, and sends local vehicle information using dedicated physical channel by spreading the information with the allocated specified code #i. In addition, the on-vehicle device 20 receives signals (other vehicles information) on the dedicated physical channel by de-spreading the signals with the codes #j allocated to the other on-vehicle devices 20. Furthermore, the on-vehicle device 20 communicates with the roadside device 10 via the common channel (Step S249).

As described above, according to this example, since the roadside device 10 manages in the centralized manner wireless resources (codes) for roadside-vehicle communications and wireless resources (codes) for inter-vehicle communications based on the CDMA scheme and on-vehicle devices 20, in turn, communicate with the roadside device 10 and other on-vehicle devices 20 according to the allocation, roadside-vehicle communications and inter-vehicle communications can be achieved with higher spectral efficiency while avoiding the hidden terminal problem.

Especially, as in this example, by allocating codes according to the CDMA scheme for roadside-vehicle communication and inter-vehicle communication, utilization of wireless resources (frequencies) can be improved. Furthermore, since it is possible to effectively utilize existing facilities for cellular system of the CDMA scheme, the system cost can be reduced.

(B3) TDMA Scheme-Based

The above-described wireless communication system can be embodied based on the TDMA scheme. In this case, allocation of wireless resources for roadside-vehicle communication and inter-vehicle communication is carried out, for example, according to time-division multiplexing compliant with the TDMA standard (TS allocation), as depicted in FIG. 31.

Figure 31:
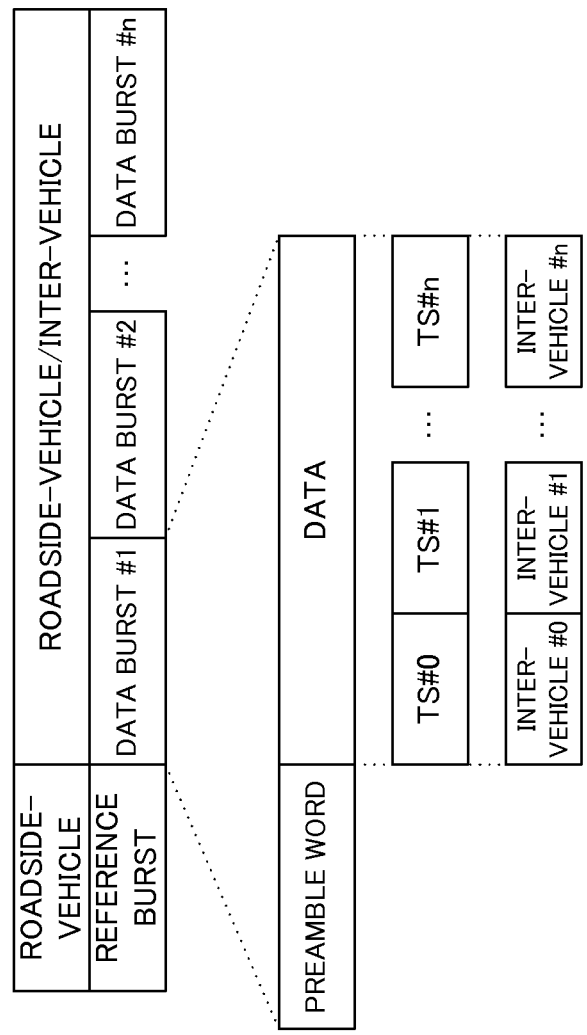
FIG. 31 is a diagram illustrating one example of a wireless frame format used in roadside-vehicle communication and inter-vehicle communication when the ITS depicted in FIG. 21 is embodied by a TDMA system.

More specifically, as depicted in FIG. 31, one wireless frame is constructed with the reference burst that is a known signal for roadside-vehicle communication, and a plurality of data bursts #1-#m that correspond to dedicated physical channel signals for roadside-vehicle communications and/or inter-vehicle communications, and respective data bursts #k (k=1 to m) are constructing by time-division multiplexing a preamble word and a plurality of time slots (TSs #i: i=0 to n) for the inter-vehicle communications.

Figure 32:
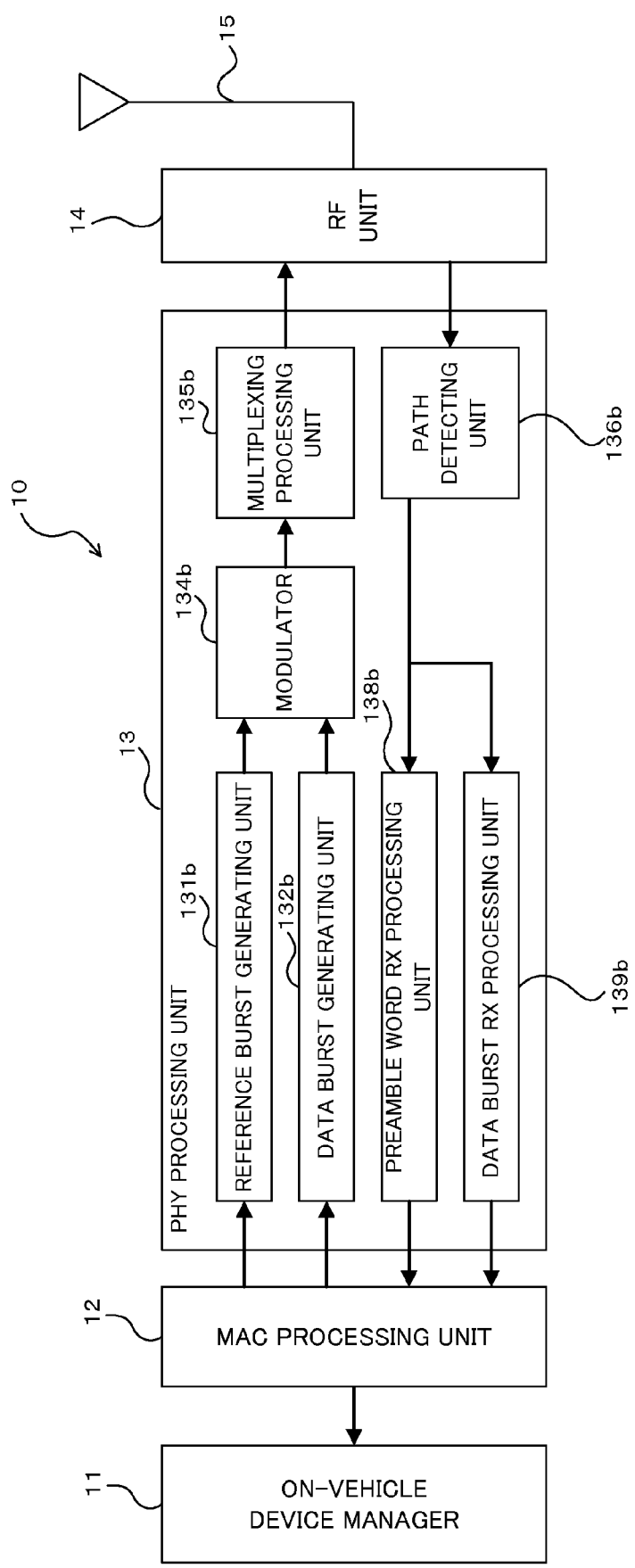
FIG. 32 is a block diagram illustrating a detailed configuration of the roadside device when the wireless frame depicted in FIG. 31 is used.
Figure 33:
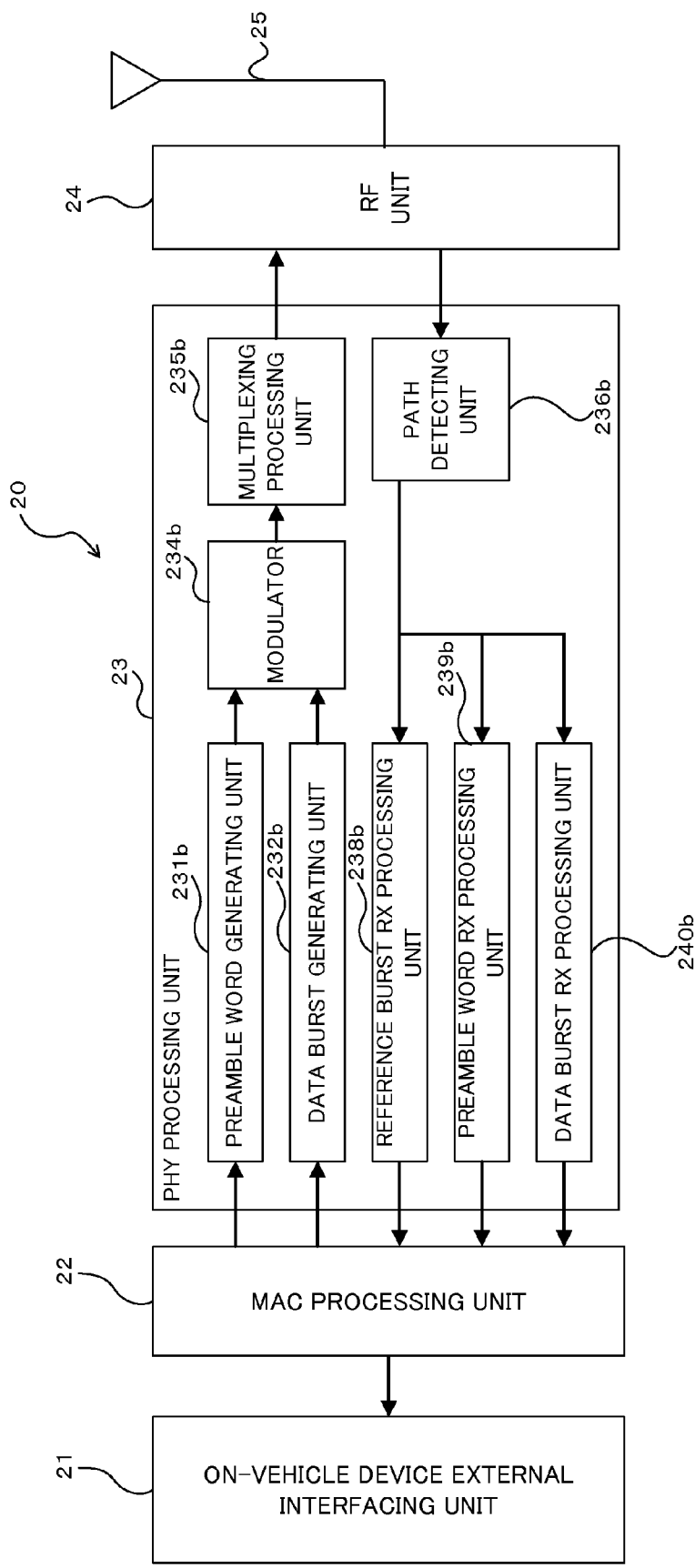
FIG. 33 is a block diagram illustrating a detailed configuration of the on-vehicle device when the wireless frame depicted in FIG. 31 is used.

The configurations of the main portion of the roadside device 10 and the on-vehicle device 20 of this example are depicted in FIGS. 32 and 33, respectively.

Configuration of Roadside Device

The roadside device 10 depicted in FIG. 32 also includes, for example, an on-vehicle device managing unit 11, a MAC processing unit 12, a physical layer processing unit 13, an RF unit 14, and an antenna 15. A GPS antenna 16 and a GPS receiver 17 are again omitted from the illustration in FIG. 32.

Here, the on-vehicle device managing unit 11 of this example includes a connection interface function with an upper network, a function that tracks the presence of on-vehicle devices 20, and a function that determines the time slot (TS #i) to be used by the on-vehicle device 20 for inter-vehicle communication and notifies the MAC processing unit 12 of it.

The MAC processing unit 12 includes a signal processing function in a MAC layer compliant with the TDMA standard, and includes, for example, a function that identifies an on-vehicle device based on a preamble word signal in the data burst #i, and notifies the on-vehicle device processing unit 11 of the on-vehicle device 20, and a function that executes MAC processing compliant with the TDMA standard on the information from the on-vehicle device processing unit 11.

More specifically, the on-vehicle device managing unit 11 and the MAC processing unit 12 functions as wireless resource allocating means that allocates a roadside-vehicle communication domain (TS) with an on-vehicle device 20 and an inter-vehicle communication domain (TS) to the on-vehicle device 20 in response to receiving an allocation request (preamble word signal) of wireless resource (TS) from the on-vehicle device 20.

The physical layer processing unit 13 includes a signal processing function in a physical layer compliant with the TDMA standard, and includes, as transmission functions, for example, a reference burst generating unit 131b, a data burst generating unit 132b, a modulating unit 134b, and a multiplexing processing unit 135b, and includes, as reception functions, for example, a path detecting unit 136b, a preamble word reception processing unit 138b, and a data burst reception processing unit 139b.

Here, in the transmission function, the reference burst generating unit 131b generates a synchronization signal and a reference burst signal used to notify the TS #i or the like indicated by the MAC processing unit 12. The data burst generating unit 132b generates data burst #i including transmission data that is MAC-processed by the MAC processing unit 12.

The modulating unit 134b includes a function that modulates (IQ mapping) the signals generated by the above-described generating unit 131b or 132b using a predetermined modulation scheme, such as QPSK or 16QAM according to the direction by the MAC processing unit 12. The multiplexing processing unit 135b includes a function that multiplexes the modulated signal from the modulating unit 134b into the wireless frame format depicted in FIG. 31 (time-division multiplexing).

On the other hand, in the reception functions, the path detecting unit 136b includes a function that detects path timing (i.e., path searching) by correlation computation with the reference burst pattern on signals received from the RF unit 14 (baseband signal).

The preamble word reception processing unit 138b includes a function that executes synchronization establishing processing and detection of an allocation request for a time slot (request signal) by detecting a preamble word from the received signal (data burst #i) according to the path timing. The data burst reception processing unit 139b includes a function that executes reception processing of the TS #i that is a dedicated physical channel from the received signal (data burst #i) after establishing synchronization.

The RF unit 14 includes a function that executes predetermined radio frequency transmission processing on a signal (digital baseband signal) from the physical layer processing unit 13 (multiplexing processing unit 135b), including D/A conversion, frequency conversion to an RF signal (upconversion), and amplification to the required transmission power and sends the signal to an on-vehicle devices 20 from the antenna 15. Furthermore, the RF unit 14 includes a function that executes predetermined radio frequency reception processing on an RF signal from an on-vehicle device 20 received at the antenna 15, including low-noise amplification, frequency conversion to a baseband signal (downconversion), A/D conversion, and outputs the signal to the physical layer processing unit 13 (path detecting unit 136b).

More specifically, the physical layer processing unit 13 and the RF unit 14 described above functions as transmission means that sends allocation information of the wireless resources (TS for roadside-vehicle communication and TS for inter-vehicle communication) allocated by the on-vehicle device managing unit 11 and the MAC processing unit 12 to the on-vehicle devices 20 using a reference burst signal.

Configuration of On-Vehicle Device

On the other hand, the roadside device depicted in FIG. 33 includes, for example, an on-vehicle device external interfacing unit 21, a MAC processing unit 22, a physical layer processing unit 23, an RF unit 24, and an antenna 25.

More specifically, the on-vehicle device external interfacing unit 11 includes a function that receives vehicle information, such as speed information, in the case of vehicle (on-vehicle device), but the information may vary dependent on where the mobile terminal is mounted, such as a pedestrian or a vehicle, from the outside of the on-vehicle device or the like, and provides it to the MAC processing unit 22, and a function that notifies the outside of the on-vehicle device (i.e., on-vehicle appliances such as a car-navigation system) of the vehicle information on the other on-vehicle devices 20 notified by the MAC processing unit 22.

Furthermore, the MAC processing unit 22 of this example includes a signal processing function in a MAC layer compliant with the TDMA standard, and includes a function that identifies a TS #i of the local on-vehicle device 20, and TSs #j of other on-vehicle devices 20 (j=1 to n and i≠j) and notifies the physical layer processing unit 23 of the TSs.

The physical layer processing unit 23 includes a signal processing function in a physical layer compliant with the TDMA standard, and includes, as transmission functions, for example, a preamble word generating unit 231b, a data burst generating unit 232b, a modulating unit 234b, and a multiplexing processing unit 235b, and includes, as reception functions, for example, a path detecting unit 236b, a reference burst reception processing unit 238b, a preamble word reception processing unit 239b, and a data burst reception processing unit 240b.

Here, in the transmission functions, the preamble word generating unit 231b generates a preamble word signal including a TS allocation request signal. The data burst generating unit 232b generates signals on the dedicated physical channels that are MAC-processed for each of roadside-vehicle communication and inter-vehicle communication.

The modulating unit 234b includes a function that modulates (IQ mapping) the signals generated by the above-described generating unit 231b or 232b using a predetermined modulation scheme, such as QPSK or 16QAM, specified by the MAC processing unit 22. The multiplexing processing unit 235b includes a function that multiplexes the modulated signal from the modulating unit 234b into the wireless frame format depicted in FIG. 31 (time-division multiplexing).

On the other hand, in the reception functions, the path detecting unit 236b includes a function that detects path timing (i.e., path searching) by correlation computation with the reference burst pattern on signals received from the RF unit 24 (baseband signal).

The reference burst reception processing unit 238b includes a function that executes synchronization establishing processing on a wireless frame by identifying a reference burst from the received signal according to the path timing. The preamble word reception processing unit 239b includes a function that executes synchronization establishing processing on a TS #i by identifying a preamble word signal from the received signal (data burst #i) after establishing frame synchronization. The data burst reception processing unit 240b includes a function that execute reception processing on the TS #i within a received data burst #k that corresponds to a dedicated physical channel after establishing TS synchronization.

The RF unit 24 includes a transmission function that performs predetermined radio frequency transmission processing on a signal (digital baseband signal) from the physical layer processing unit 23 (the multiplexing processing unit 235b), including D/A conversion or frequency conversion into an RF signal (upconversion), amplification to a desired transmission power, and sends the processed signal to the roadside device 10 or other on-vehicle devices 20 from the antenna 25, and a function that executes predetermined radio frequency reception processing on an RF signal from the roadside device 10 or other on-vehicle devices 20 received at that antenna 25, including low-noise amplification, frequency conversion into a baseband signal (downconversion), and A/D conversion, and outputs the processed signal to the physical layer processing unit 23 (the path detecting unit 236b).

That is, the RF unit 24 and the physical layer processing unit 23 described above functions as allocation information reception means that receives a reference burst signal containing allocation information on a wireless resource (TS) for roadside-vehicle communication and a wireless resource (TS) for inter-vehicle communication that have been allocated at the roadside device 10 in response to the allocation request (preamble word signal). The MAC processing unit 22 includes, a function as communication control means that carries out roadside-vehicle communication with the roadside device 10 using the TS for roadside-vehicle communication recognized with the allocation information and carries out inter-vehicle communications with other on-vehicle devices 20 using the TSs for inter-vehicle communication recognized with the allocation information.

Operations of Roadside-Vehicle Communication and Inter-Vehicle Communication

Figure 34:
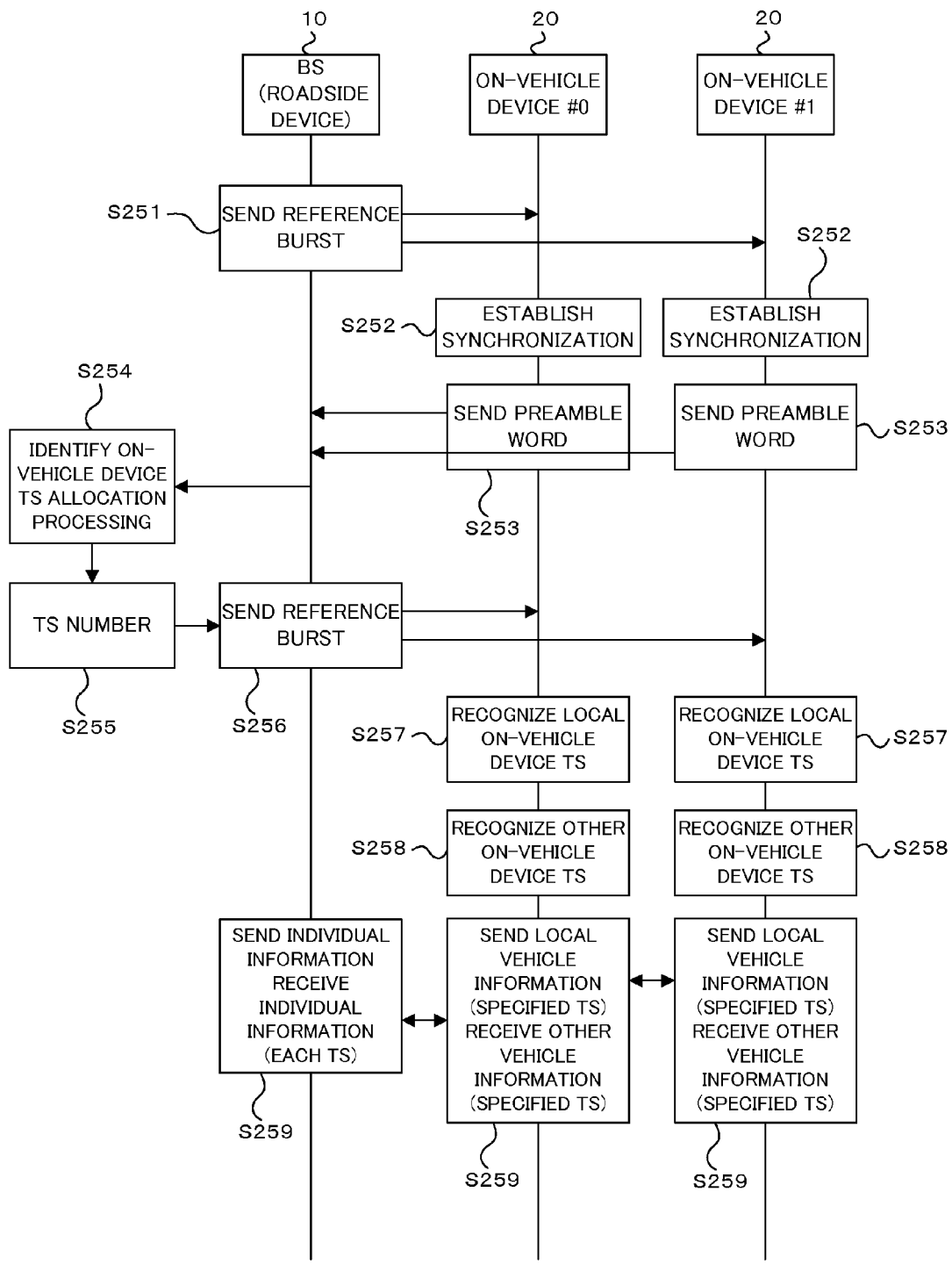
FIG. 34 is a sequence diagram illustrating roadside-vehicle communication and inter-vehicle communication in the ITS that uses the wireless frame depicted in FIG. 31.

Hereinafter, operations of roadside-vehicle communication and inter-vehicle communication in the wireless communication system of this embodiment that is configured as described above will be described with reference to the sequence diagram depicted in FIG. 34.

More specifically, the roadside device 10 sends a reference burst at regular time intervals (Step S251). The on-vehicle devices 20 receive the reference burst and establish synchronization of a wireless frame at the timing of the reception (Step S252). Once synchronization is established, the on-vehicle devices 20 send a preamble word signal (TS allocation request) to the roadside device 10 (Step S253).

The roadside device 10 identifies the on-vehicle devices 20 by receiving the preamble word signal, executes allocation processing of TSs for roadside-vehicle communication and inter-vehicle communication (Step S254), and notifies the allocated TSs #i in the reference burst (Steps S255 and S256).

Each on-vehicle device 20 can identify both the TS #i for the local on-vehicle device 20 and the TSs #j for the on-vehicle devices 20 by receiving the reference burst (Steps S257 and S258).

After identifying the TSs #i and #j, each on-vehicle device 20 sends a response signal to the roadside device 10 using the TS #i for data burst #k for roadside-vehicle communication, and sends local vehicle information to other on-vehicle devices 20 using the TS #i specified for the local on-vehicle device 20. The on-vehicle device 20 also receives other vehicles information via the TSs #j specified for the other on-vehicle devices 20. Furthermore, the on-vehicle device 20 communicates with the roadside device 10 via the TS #i for the data burst #k for roadside-vehicle communication (Step S259).

As described above, according to this example, since the roadside device 10 manages in the centralized manner wireless resources (TSs) for roadside-vehicle communication and wireless resources (TSs) for inter-vehicle communication based on the TDMA scheme, and on-vehicle devices 20, in turn, communicate with the roadside device 10 and other on-vehicle devices 20 according to the allocation, reliability of each communication is improved and the network size can be reduced. Furthermore, since it is possible to effectively utilize existing facilities for cellular system of the TDMA scheme, such as those for the PHS, the system cost can be reduced.

(B4) FDMA Scheme-Based

Figure 35:
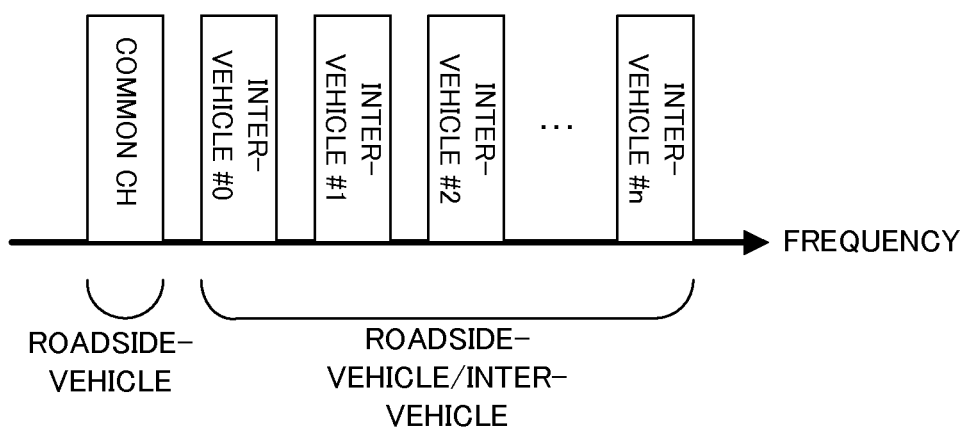
FIG. 35 is a diagram illustrating one example of a wireless frame format used in roadside-vehicle communication and inter-vehicle communication when the ITS depicted in FIG. 21 is embodied by an FDMA system.

The above-described wireless communication system can be embodied based on the FDMA scheme. In this case, allocation of wireless resources for roadside-vehicle communication and inter-vehicle communication is carried out according to frequency-division multiplexing compliant with the FDMA standard, for example, as depicted in FIG. 35. More specifically, as depicted in FIG. 35, a wireless frame is constructed by frequency-division multiplexing the frequency of the common channel for roadside-vehicle communication and a plurality of channel frequencies, each corresponding to dedicated physical channels for roadside-vehicle communications and/or inter-vehicle communication.

Figure 36:
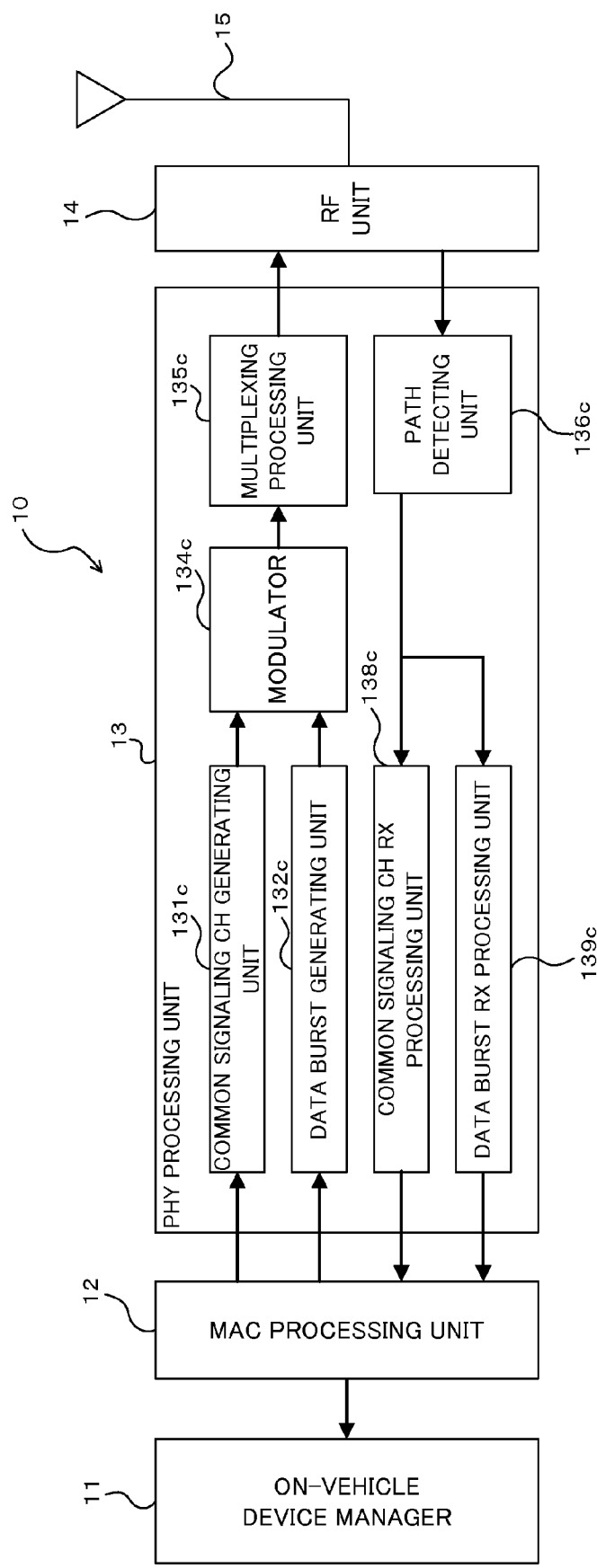
FIG. 36 is a block diagram illustrating a detailed configuration of the roadside device when the wireless frame depicted in FIG. 35 is used.
Figure 37:
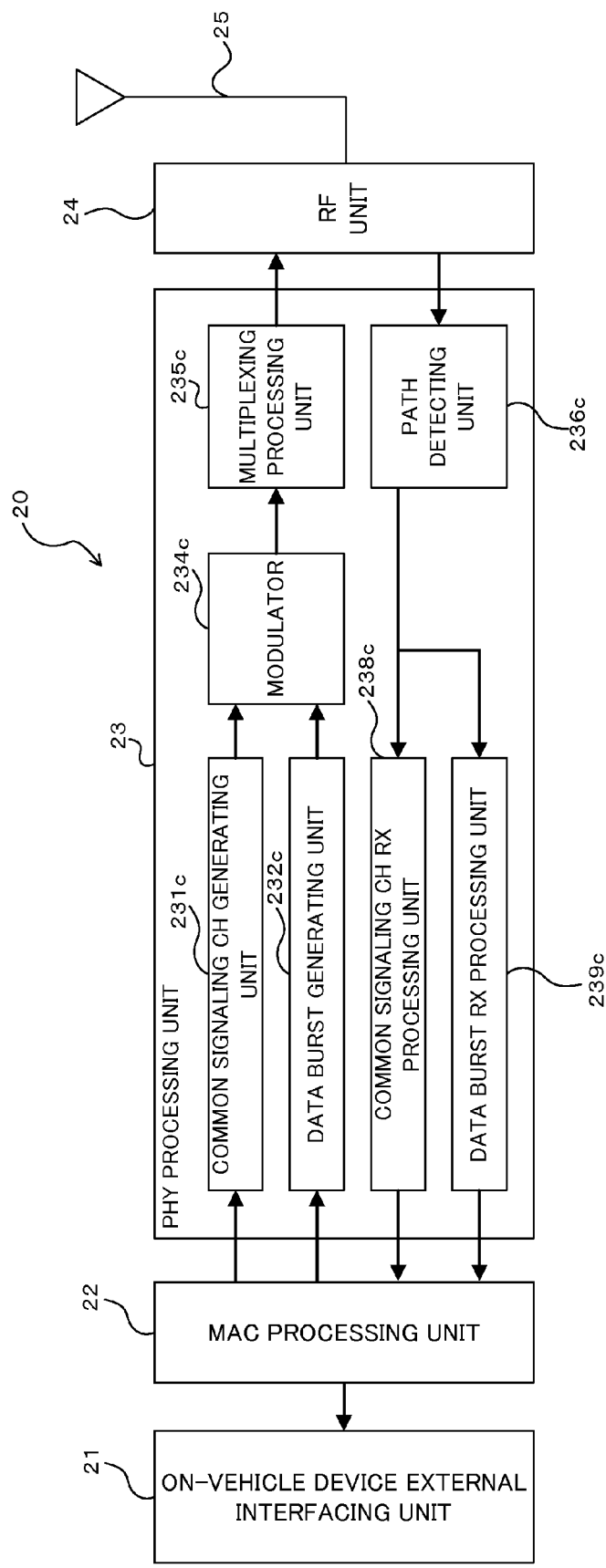
FIG. 37 is a block diagram illustrating a detailed configuration of the on-vehicle device when the wireless frame depicted in FIG. 35 is used.

The configurations of the main portion of the roadside device 10 and the on-vehicle device 20 of this example are depicted in FIGS. 36 and 37, respectively.

Configuration of Roadside Device

The roadside device 10 depicted in FIG. 36 also includes, for example, an on-vehicle device managing unit 11, a MAC processing unit 12, a physical layer processing unit 13, an RF unit 14, and an antenna 15.

Here, the on-vehicle device managing unit 11 of this example includes a connection interface function with an upper network, a function that tracks the presence of on-vehicle devices 20, and a function that determines the frequency to be used (allocated) by the on-vehicle device 20 for roadside-vehicle communication and inter-vehicle communication and notifies the MAC processing unit 12 of it.

The MAC processing unit 12 includes a signal processing function in a MAC layer compliant with the FDMA standard, and includes, for example, a function that identifies an on-vehicle device based on a signal on the common channel (common signaling channel), and notifies the on-vehicle device processing unit 11 of the on-vehicle device 20, and a function that executes MAC processing compliant with the FDMA standard on the information from the on-vehicle device processing unit 11.

More specifically, the on-vehicle device managing unit 11 and MAC processing unit 12 functions as wireless resource allocating means that allocates a wireless resource (frequency) for roadside-vehicle communication and a wireless resource (frequency) for inter-vehicle communication with an on-vehicle device 20 in response to receiving an allocation request (signal on the common signaling channel) of wireless resource (frequency) from the on-vehicle device 20.

The physical layer processing unit 13 includes, in this example, a signal processing function of a physical layer compliant with the FDMA standard, and includes, as transmission functions, for example, a common signaling channel generating unit 131*c*, a data burst generating unit 132*c*, a modulating unit 134*c*, and the multiplexing processing unit 135*c*, and includes, as reception functions, for example, a path detecting unit 136*c*, a common signaling channel reception processing unit 138*c*, and the data burst reception processing unit 139*c*.

Here, in the transmission functions, the common signaling channel generating unit 131*c* includes a function that generates a signal on the common signaling channel that is used for notifying on-vehicle device 20*s* of frequencies or the like directed by the MAC processing unit 12. The data burst generating unit 132*c* generates data burst including transmission data that is MAC-processed by the MAC processing unit 12.

The modulating unit 134*c* includes a function that modulates (IQ mapping) the signals generated by the above-described generating unit 131*c* or 132*c* using a modulation scheme, such as QPSK or 16QAM, specified by the MAC processing unit 12. The multiplexing processing unit 135*c* includes a function that multiplexes the modulated signal from the modulating unit 134*c* (frequency-division multiplexing).

On the other hand, in the reception functions, the path detecting unit 136*c* includes a function that detects path timing (path searching) by identifying signal components of a plurality of frequencies allocated for each of roadside-vehicle and inter-vehicle communications from a signal (baseband signal) received from the RF unit 14. The common signaling channel reception processing unit 138*c* includes a function that identifies a signal on the common signaling channel (frequency component) from the received signal according to the path timing thereby detecting a synchronization signal and a request signal. The data burst reception processing unit 139*c* includes a function that receives a frequency component of the data burst corresponding to the dedicated physical channel from a received signal after establishing synchronization by receiving and detecting the synchronization signal.

The RF unit 14 includes a function that executes predetermined radio frequency transmission processing on a signal (digital baseband signal) from the physical layer processing unit 13 (multiplexing processing unit 135*c*), including D/A conversion, frequency conversion to an RF signal (upconversion), and amplification to the required transmission power and sends the signal to an on-vehicle devices 20 from the antenna 15. Furthermore, the RF unit 14 includes a function that executes predetermined radio frequency reception processing on an RF signal from an on-vehicle device 20 received at the antenna 15, including low-noise amplification, frequency conversion to a baseband signal (downconversion), A/D conversion, and outputs the signal to the physical layer processing unit 13 (path detecting unit 136*c*).

More specifically, the physical layer processing unit 13 and the RF unit 14 described above functions as transmission means that sends allocation information of the wireless resources (frequency for roadside-vehicle communication and frequencies for inter-vehicle communication) allocated by the on-vehicle device managing unit 11 and the MAC processing unit 12 to the on-vehicle devices 20 using a signal on the common signaling channel.

Configuration of On-Vehicle Device

On the other hand, the roadside device depicted in FIG. 37 includes, for example, an on-vehicle device external interfacing unit 21, a MAC processing unit 22, a physical layer processing unit 23, an RF unit 24, and an antenna 25.

More specifically, the on-vehicle device external interface 21 includes a function that receives vehicle information, such as speed information, in the case of vehicle (on-vehicle device), but the information may vary dependent on where the mobile terminal is mounted, such as a pedestrian or a vehicle, from the outside of the on-vehicle device or the like, and provides it to the MAC processing unit 22, and a function that notifies the outside of the on-vehicle device (i.e., on-vehicle appliances such as a car-navigation system) of the vehicle information on the other on-vehicle devices 20 notified by the MAC processing unit 22.

The MAC processing unit 22 includes a signal processing function in a MAC layer compliant with the FDMA standard, and includes, for example, a function that identifies the frequency allocated for the local on-vehicle device 20 and the frequencies allocated for other on-vehicle devices 20 from the signal on the common signaling channel, and notifies the physical layer processing unit 23 of the frequencies.

The physical layer processing unit 23 includes a signal processing function in a physical layer compliant with the FDMA standard, and includes, as transmission functions, for example, a common signaling channel generating unit 231c, a data burst generating unit 232c, a modulating unit 234c, and the multiplexing processing unit 235c, and includes, as reception functions, for example, a path detecting unit 236c, a common signaling channel reception processing unit 238c, and the data burst reception processing unit 239c.

Here, in the transmission functions, the common signaling channel generating unit 231c includes a function that generates a signal on the common signaling channel including a request signal requesting allocation of frequencies used for roadside-vehicle communication and inter-vehicle communication. The data burst generating unit 232c generates signals on the dedicated physical channels that are MAC-processed for each of roadside-vehicle communication and inter-vehicle communication by the MAC processing unit 22.

The modulating unit 234c includes a function that modulates (IQ mapping) the signals generated by the above-described generating unit 231c or 232c using a modulation scheme, such as QPSK or 16QAM, specified by the MAC processing unit 22. The multiplexing processing unit 235c includes a function that multiplexes the modulated signal from the modulating unit 234c (frequency-division multiplexing).

On the other hand, in the reception functions, the path detecting unit 236c includes a function that detects path timing (path searching) by identifying frequency components of the common signaling channel from a received signal (baseband signal) from the RF unit 24. The common signaling channel reception processing unit 238c includes a function that executes reception processing on common signaling channel according to the path timing, thereby establishing synchronization and setting allocated frequencies. The data burst reception processing unit 239c includes a function that identifies a data burst corresponding to the dedicated physical channel from a signal demodulated from a plurality of frequency bands (signal components in the frequency that is set) and executes reception processing.

The RF unit 24 includes a transmission function that performs predetermined radio frequency transmission processing on a signal (digital baseband signal) from the physical layer processing unit 23 (the multiplexing processing unit 235c), including D/A conversion or frequency conversion into an RF signal (upconversion), amplification to a desired transmission power, and sends the processed signal to the roadside device 10 or other on-vehicle devices 20 from the antenna 25, and a function that executes predetermined radio frequency reception processing on an RF signal from the roadside device 10 or other on-vehicle devices 20 received at that antenna 25, including low-noise amplification, frequency conversion into a baseband signal (downconversion), and A/D conversion, and outputs the processed signal to the physical layer processing unit 23 (the path detecting unit 236c).

That is, the RF unit 24 and the physical layer processing unit 23 described above functions as allocation information reception means that receives signals on the common signaling channel containing allocation information on a wireless resource (frequency) for roadside-vehicle communication and a wireless resource (frequency) for inter-vehicle communication that have been allocated at the roadside device 10 in response to the allocation request (signal on the common signaling channel). The MAC processing unit 22 includes, a function as communication control means that carries out roadside-vehicle communication with the roadside device 10 using the frequency for the roadside-vehicle communication recognized with the allocation information and carries out inter-vehicle communications with other on-vehicle devices 20 using the frequencies for the inter-vehicle communications recognized with the allocation information.

Operations of Roadside-Vehicle Communication and Inter-Vehicle Communication

Figure 38:
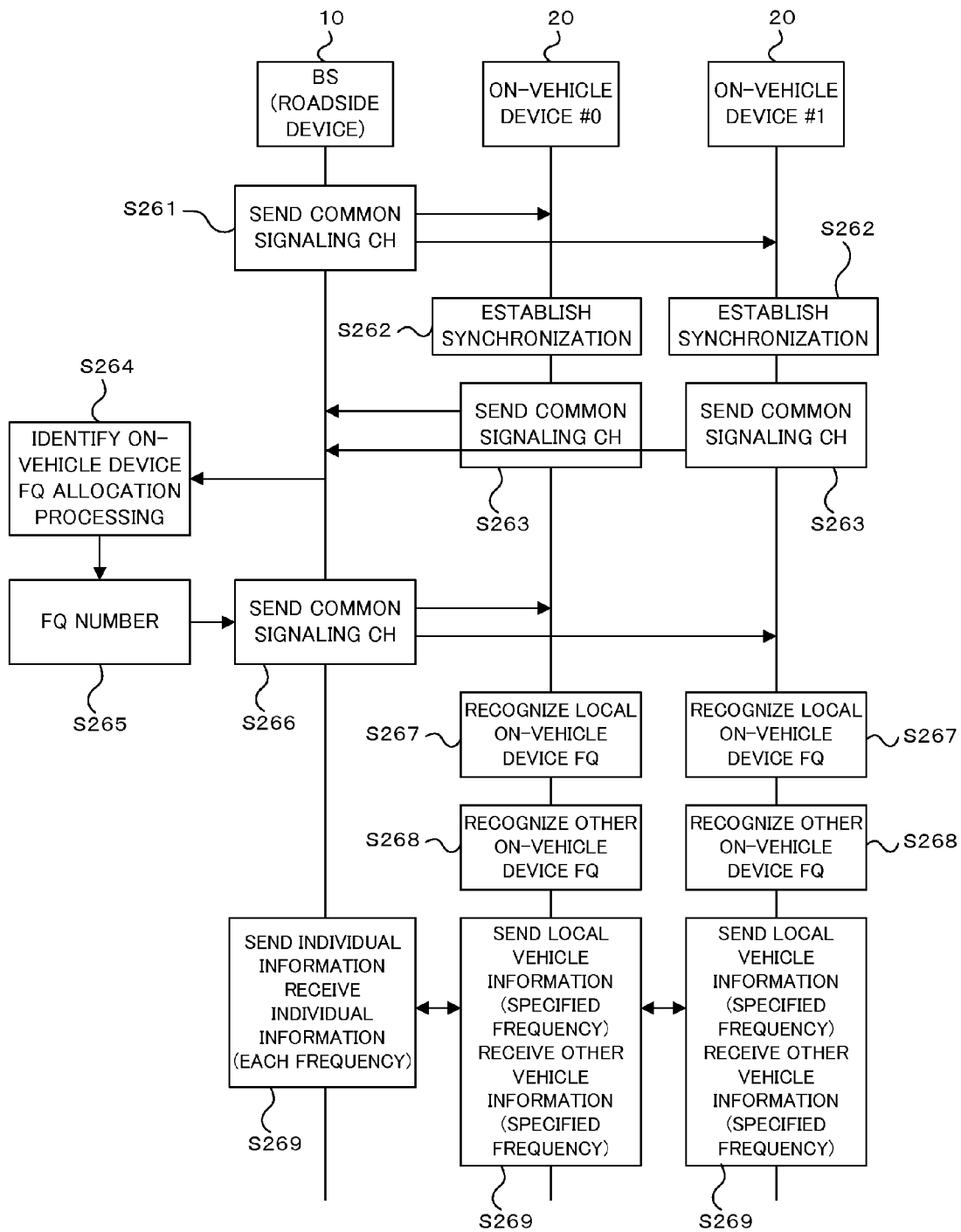
FIG. 38 is a sequence diagram illustrating roadside-vehicle communication and inter-vehicle communication in the ITS that uses the wireless frame depicted in FIG. 35.

Hereinafter, operations of roadside-vehicle communication and inter-vehicle communication in the wireless communication system of this embodiment that is configured as described above will be described with reference to the sequence diagram depicted in FIG. 38.

More specifically, the roadside device 10 sends a signal on the common signaling channel at regular time intervals (Step S261). The on-vehicle devices 20 receive the signal on the common signaling channel and establish synchronization of a wireless frame at the timing of the reception (Step S262). Once synchronization is established, each on-vehicle device 20 sends a signal on the common signaling channel containing a request for allocation of frequencies used for roadside-vehicle communication and inter-vehicle communication to the roadside device 10 (Step S263).

The roadside device 10 identifies the on-vehicle devices 20 by receiving the signal on the common signaling channel, executes allocation processing of frequencies for roadside-vehicle communication and inter-vehicle communication (Step S264), and notifies the on-vehicle device 20 of the allocated frequencies in a signal on the common signaling channel (Steps S265 and S266).

Each on-vehicle device 20 can identify the frequencies allocated for roadside-vehicle communication and inter-vehicle communication by the local on-vehicle device 20 and the frequencies allocated for the roadside-vehicle communication and inter-vehicle communication by other on-vehicle devices 20 by receiving that signal on common signaling channel (Steps S267 and S268).

After identifying the allocated frequencies, each on-vehicle device 20 sends a response signal to the roadside device 10 using a signal at the frequency for the roadside-vehicle communication, and sends local vehicle information at the frequency allocated as the dedicated physical channel for inter-vehicle communication for the local on-vehicle device 20. The on-vehicle device 20 receives other vehicles information using the frequencies allocated as the dedicated physical channels for inter-vehicle communications for other on-vehicle devices 20. Furthermore, the on-vehicle device 20 communicates with the roadside device 10 using the frequency allocated for roadside-vehicle communication (Step S269).

As described above, according to this example, since the roadside device 10 manages in the centralized manner wireless resources (frequencies) for roadside-vehicle communication and wireless resources (frequencies) for inter-vehicle communication based on the FDMA scheme, and on-vehicle devices 20, in turn, communicate with the roadside device 10 and other on-vehicle devices 20 according to the allocation, it is possible to effectively utilize existing facilities for cellular system of the FDMA scheme and the system cost can be reduced.

(B5) Hybrid System

As being appreciated by the above-described embodiments and various variations, roadside-vehicle communication may be executed using a division multiplexing scheme, such as frequency, time, code, or the like, thereby avoiding transmission collisions with other on-vehicle devices while the same division multiplexing scheme is used for inter-vehicle communication in order for on-vehicle devices to convey their information each other. However, different division multiplexing schemes may be applied for roadside-vehicle communication and inter-vehicle communication. More specifically, one of the OFDMA, CDMA, TDMA, or FDMA schemes may be used for roadside-vehicle communication, and a different scheme than the one used for the roadside-vehicle communication may be used for inter-vehicle communication.

Figure 39:
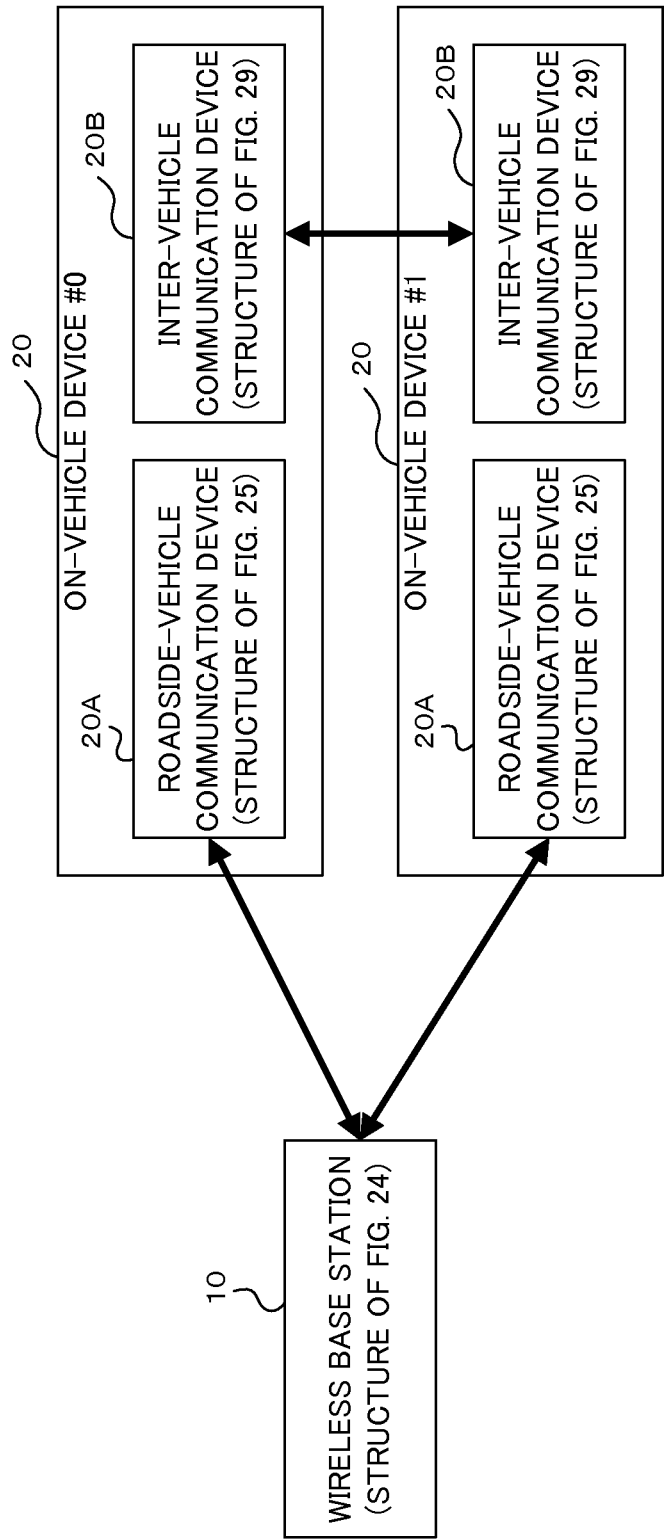
FIG. 39 is a block diagram illustrating a configuration of a roadside device and an on-vehicle device when the ITS depicted in FIG. 21 is achieved by a hybrid system of the OFDMA and the CDMA.

For example, as depicted in FIG. 39, the roadside device 10 may be configured as illustrated in FIG. 24, the on-vehicle device 20 may be configured as the roadside-vehicle communication device 20A illustrated in FIG. 25, and the inter-vehicle communication device 20B illustrated in FIG. 29, wherein roadside-vehicle communication may be based on the communication sequence described above and depicted in FIG. 26 according to the OFDMA scheme, and inter-vehicle communication may be based on the communication sequence described above and depicted in FIG. 30 according to the CDMA scheme.

Figure 40:
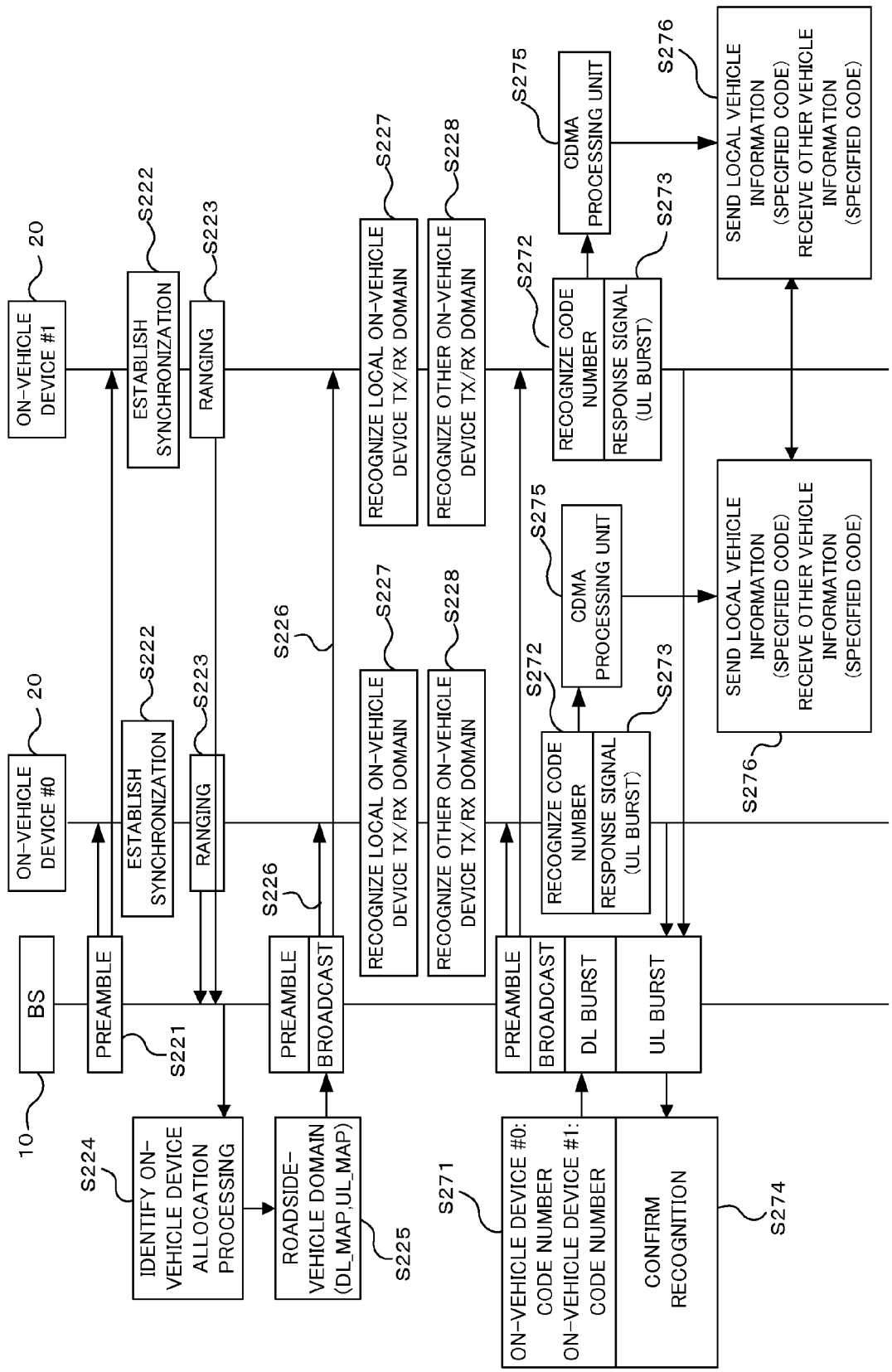
FIG. 40 is a sequence diagram illustrating roadside-vehicle communication and inter-vehicle communication in the hybrid system depicted in FIG. 39.

More specifically, roadside-vehicle communication and inter-vehicle communication may be carried out according to the sequence diagram depicted in FIG. 40.

More specifically, the roadside device 10 sends a preamble signal in the wireless frame format depicted in FIGS. 4 and 23 at regular time intervals (Step S221). In response to receiving this preamble signal, the on-vehicle devices 20 establish synchronization of a wireless frame at the timing of the reception (Step S222). Once synchronization is established, the on-vehicle devices 20 send ranging signals to the roadside device 10 (Step S223).

The roadside device recognizes the on-vehicle devices 20 by receiving the ranging signals, and executes allocation processing of UL and DL communication domains (roadside-vehicle communication domains) for roadside-vehicle communication and communication domains (TSs) for inter-vehicle communications (Step S224), and notifies each of the allocated communication domains in a broadcast signal (a DL_MAP and a UL_MAP for the roadside-vehicle communication domains, and a DL_MAP for the inter-vehicle communication domains) (Steps S225 and S226).

Each on-vehicle device 20 can identify the roadside-vehicle communication domain, the inter-vehicle communication domain allocated for that on-vehicle device 20 (local on-vehicle device transmission domain), and the inter-vehicle communication domains allocated for other on-vehicle devices 20 (other on-vehicle device transmission regions) upon receiving the broadcast signal (Steps S227 and S228).

The roadside device 10 then notifies the on-vehicle devices 20 of the codes #i for inter-vehicle communication in a DL burst allocated for roadside-vehicle communication (Step S271). The on-vehicle device 20 identifies the codes #i and #j allocated for the local on-vehicle device 20 and other on-vehicle devices 20 by receiving this DL burst (Step S272), and sends a response signal to the roadside device 10 in a UL burst allocated for roadside-vehicle communication (Step S273).

The roadside device 10 can confirm that the allocation of a domain (burst) and the allocation of a code are successfully done by receiving this UL burst (Step S274).

Since synchronization of timing with the roadside device 10 has been established, each of the on-vehicle devices 20 executes spreading processing on local vehicle information and sends the information using the code #i allocated to the local on-vehicle device 20 using the timing, and receives vehicle information on other on-vehicle devices 20 by executes de-spreading processing on the information using the codes #j allocated to the other on-vehicle devices 20 (Steps S275 and S276).

As described above, by allowing different communication schemes to be used for roadside-vehicle communication and inter-vehicle communication, optimum communication schemes may be used for roadside-vehicle communication and inter-vehicle communication according to the usage of frequencies and propagation environment, and existing facilities for a cellular system can be appropriately utilized to construct a flexible system.

(C) Others

Note that although the above-described embodiments assumes the ITS wherein mobile base stations 10 are installed in or on traffic lights on roads and mobile terminals 20 are installed on or in vehicles on the roads, the mobile base stations 10 and the mobile terminals 20 may be installed on or in any locations.

For example, a railway network is considered as one of the traffic systems, mobile base stations 10s may be installed in or on traffic lights on crossing gates and mobile terminals 20 may be installed in or on trains, thereby realizing a service in which information on each of the crossing gates or information on the vicinity thereof may be provided or train information, such as traveling speed may be exchanged between trains.

As described above, according to the embodiments, since a roadside device (wireless base station) manages in the centralized manner wireless resources for roadside-vehicle communication and wireless resources for inter-vehicle communication, and on-vehicle devices communicate with the roadside device and other on-vehicle devices according to the allocation, roadside-vehicle communication and inter-vehicle communication with a high utilization of wireless resources can be achieved while avoiding the hidden terminal problem. Therefore, the embodiments may be considered as a promising in the field of wireless communication technology, especially as a technique for achieving the ITS.

The embodiments may provide at least one of effects or advantages listed below:

(1) since a roadside device (wireless base station) manages in the centralized manner wireless resources for roadside-vehicle communication (roadside-vehicle resources) and wireless resource for inter-vehicle communication (inter-vehicle resources), and on-vehicle devices communicate with the roadside device and other on-vehicle devices according to the allocation, roadside-vehicle communication and inter-vehicle communication with higher utilization of wireless resources can be achieved while avoiding the hidden terminal problem.

(2) Especially by allocating communication domains defined by frequency and time as exemplified by the OFDMA scheme, it enables allocation of wide-band and flexible wireless resources.

(3) As a result, whether communication areas of roadside devices are present in a hierarchy, it is possible to allocate roadside-vehicle communication domains to a plurality of roadside devices having overlapped communication areas that are frequency-division multiplexed or time-division multiplexed communication. Thus, it is possible to easily prevent crosstalk in roadside-vehicle communication and inter-vehicle communication and improve the reliability of communication.

(4) Besides, the wireless resource is one of a channelization code in CDMA scheme, a time slot in the TDMA scheme, and a channel frequency in the FDMA scheme. Thereby it is possible to effectively utilize existing facilities for cellular system of the CDMA scheme.

Note that it is one of other effects or advantages of the embodiments to providing advantages and effects that can be obtained by best modes to implement the embodiments described below but cannot be obtained with conventional techniques.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wireless communication method in a traffic system comprising a wireless base station as a roadside device and a plurality of wireless terminals as on-vehicle devices, the wireless communication method comprising:

the plurality of on-vehicle devices respectively sending a plurality of allocation requests for a wireless resource to the roadside device;

the roadside device, in response to receiving the plurality of allocation requests, allocating a roadside-vehicle resource that is a wireless resource for roadside-vehicle communication between the roadside device and each of the plurality of on-vehicle devices and an inter-vehicle resource that is a wireless resource for inter-vehicle communication between on-vehicle devices of the plurality of on-vehicle devices, and sending allocation information identifying the allocated roadside-vehicle resource and the allocated inter-vehicle resource to the plurality of on-vehicle devices; and each of the plurality of on-vehicle devices carrying out the roadside-vehicle communication with the roadside device using the roadside-vehicle resource identified with the allocation information received from the roadside device, and carrying out the inter-vehicle communication with other on-vehicle device using the inter-vehicle resource identified with the allocation information, wherein the wireless resource is a communication domain defined by frequency and time, a downlink roadside-vehicle communication domain from the roadside device to the on-vehicle device, an inter-vehicle communication domain for the inter-vehicle communication, and an uplink roadside-vehicle communication domain from the on-vehicle device to the roadside device are time-division multiplexed such that the downlink roadside-vehicle communication domain, the inter-vehicle communication domain, and the uplink roadside-vehicle communication domain are arranged in the wireless resource along a time axis in the order of the downlink roadside-vehicle communication domain, the inter-vehicle communication domain and the uplink roadside-vehicle communication domain, and the wireless communication method further comprises:

each of the plurality of on-vehicle devices sending information on a local vehicle using a local on-vehicle device transmission domain allocated to a local on-vehicle device among a plurality of on-vehicle device transmission domains, and receiving information sent by another on-vehicle device using another on-vehicle device transmission domain among the plurality of on-vehicle device transmission domains except for the local on-vehicle device transmission domain, the plurality of on-vehicle device transmission domains being obtained by time division on the inter-vehicle communication domain.

2. The wireless communication method in a traffic system according to claim 1, wherein downlink roadside-vehicle communication domains allocated to a plurality of roadside devices having overlapped communication areas are frequency-division multiplexed or time-division multiplexed.

3. The wireless communication method in a traffic system according to claim 1, wherein downlink roadside vehicle communication domains and uplink roadside vehicle communication domains allocated to a plurality of roadside devices having overlapped sectors, into which communication areas are divided, are frequency-division multiplexed.

4. The wireless communication method in a traffic system according to claim 3, wherein downlink roadside-vehicle communication domains are further frequency-division multiplexed or time-division multiplexed for a plurality of roadside devices that are located in the communication area of the roadside device and having overlapped communication areas.

5. The wireless communication method in a traffic system according to claim 1, wherein at least one of the roadside-vehicle resource and the inter-vehicle resource includes one of a channelization code in CDMA scheme, a time slot in the TDMA scheme, and a channel frequency in the FDMA scheme.

6. The wireless communication method in a traffic system according to claim 1, wherein the wireless resource allocated as the roadside-vehicle resource includes one of a communication domain defined by frequency and time of the OFDMA scheme, a channelization code of the CDMA scheme, a time slot of the TDMA scheme, and a channel frequency of the FDMA scheme, and the inter-vehicle resource is a wireless resource of a scheme other than the scheme used for the roadside-vehicle resource.

7. A wireless base station in a traffic system comprising the wireless base station as a roadside device and a plurality of mobile terminals as on-vehicle devices, the wireless base station comprising:

a wireless resource allocation unit which allocates, in response to receiving a plurality of allocation requests for a wireless resource from the plurality of on-vehicle devices, a roadside-vehicle resource that is a wireless resource for roadside-vehicle communication between the roadside device and each of the plurality of on-vehicle devices and an inter-vehicle resource that is a wireless resource for inter-vehicle communication between on-vehicle devices of the plurality of on-vehicle devices; and a transmitter which sends allocation information identifying the allocated roadside-vehicle resource and the allocated inter-vehicle resource to the plurality of on-vehicle devices, wherein the wireless resource is a communication domain defined by frequency and time, a downlink roadside-vehicle communication domain from the roadside device to the on-vehicle device, an inter-vehicle communication domain for the inter-vehicle communication, and an uplink roadside-vehicle communication domain from the on-vehicle device to the roadside device are time-division multiplexed such that the downlink roadside-vehicle communication domain, the inter-vehicle communication domain, and the uplink roadside-vehicle communication domain are arranged in the wireless resource along a time axis in the order of the downlink roadside-vehicle communication domain, the inter-vehicle communication domain and the uplink roadside-vehicle communication domain, and each of the plurality of on-vehicle devices sends information on a local vehicle using a local on-vehicle device transmission domain allocated to a local on-vehicle device among a plurality of on-vehicle device transmission domains, and receives information sent by another on-vehicle device using another on-vehicle device transmission domain among the plurality of on-vehicle device transmission domains except for the local on-vehicle device transmission domain, the plurality of on-vehicle device transmission domains being obtained by time division on the inter-vehicle communication domain.

8. The wireless base station in the traffic system according to claim 7, wherein the wireless resource allocation unit allocates, as the downlink roadside-vehicle communication domain, a communication domain that is frequency-division multiplexed or time-division multiplexed to a plurality of roadside devices having overlapped communication areas.

9. The wireless base station in the traffic system according to claim 7, wherein the wireless resource allocation unit allocates, downlink roadside vehicle communication domains and uplink roadside vehicle communication domains to a plurality of roadside devices having overlapped sectors, into which communication areas are divided, which are frequency-division multiplexed.

10. The wireless base station in the traffic system according to claim 9, wherein the wireless resource allocation unit allocates, as the downlink roadside-vehicle communication domain, a frequency-division multiplexed or time-division multiplexed communication domain for a plurality of roadside devices that are located in the communication area of the roadside device and having overlapped communication areas.

11. The wireless base station in the traffic system according to claim 7, wherein at least one of the roadside-vehicle resource and the inter-vehicle resource includes one of a channelization code of the CDMA scheme, a time slot of the TDMA scheme, and a channel frequency of the FDMA scheme.

12. The wireless base station in the traffic system according to claim 7, wherein the wireless resource allocated as the roadside-vehicle resource includes one of a communication domain defined by frequency and time of the OFDMA scheme, a channelization code of the CDMA scheme, a time slot of the TDMA scheme, and a channel frequency of the FDMA scheme, and the inter-vehicle resource is a wireless resource of a scheme other than the scheme used for the roadside-vehicle resource.

13. A mobile terminal in a traffic system comprising a wireless base station as a roadside device and a plurality of mobile terminals as on-vehicle devices, the mobile terminal comprising:

a transmitter which sends an allocation request for wireless resource to the roadside device;

a receiver which receives allocation information identifying a roadside-vehicle resource and an inter-vehicle resource, the roadside-vehicle resource that is a wireless resource for roadside-vehicle communication between the roadside device and each of the plurality of on-vehicle devices, the inter-vehicle resource that is a wireless resource for inter-vehicle communication between on-vehicle devices of the plurality of on-vehicle devices, the allocation information determined by the roadside device in response to the allocation request; and a controller which executes the roadside-vehicle communication with the roadside device using the roadside-vehicle resource identified with the allocation information, and executes the inter-vehicle communication with other on-vehicle device using the inter-vehicle resource identified with the allocation information, wherein the wireless resource is a communication domain defined by frequency and time, a downlink roadside-vehicle communication domain from the roadside device to the on-vehicle device, an inter-vehicle communication domain for the inter-vehicle communication, and an uplink roadside-vehicle communication domain from the on-vehicle device to the roadside device are time-division multiplexed such that the downlink roadside-vehicle communication domain, the inter-vehicle communication domain, and the uplink roadside-vehicle communication domain are arranged in the wireless resource along a time axis in the order of the downlink roadside-vehicle communication domain, the inter-vehicle communication domain and the uplink roadside-vehicle communication domain, and the controller sends information on a local vehicle using a local on-vehicle device transmission domain allocated to a local on-vehicle device among a plurality of on-vehicle device transmission domains, and receives information sent by another on-vehicle device using another on-vehicle device transmission domain among the plurality of on-vehicle device transmission domains except for the local on-vehicle device transmission domain, the plurality of on-vehicle device transmission domains being obtained by time division on the inter-vehicle communication domain.

14. The mobile terminal in the traffic system according to claim 13, wherein the controller identifies, based on the allocation information, the local on-vehicle device transmission domain and the other on-vehicle device transmission domain.

* * * * *